United States Patent [19]

Tsutsumi et al.

[11] Patent Number: 5,175,687
[45] Date of Patent: Dec. 29, 1992

[54] SUSPENSION CONTROL SYSTEM

[75] Inventors: Yasuhiro Tsutsumi, Susono; Yuji Yokoya, Toyota; Yoshimichi Hara, Kuwana; Eiju Matsunaga, Anjou; Hiroyuki Kawata, Chiryu; Akira Fukami, Okazaki; Yutaka Suzuki, Nishio, all of Japan

[73] Assignees: Toyota Jidosha Kaisha; Nippondenso Co., Ltd., both of Aichi, Japan

[21] Appl. No.: 580,388

[22] Filed: Sep. 11, 1990

[30] Foreign Application Priority Data

| Sep. 11, 1989 | [JP] | Japan | 1-235233 |
| Oct. 16, 1989 | [JP] | Japan | 1-269827 |
| Nov. 2, 1989 | [JP] | Japan | 1-286859 |

[51] Int. Cl.$^5$ .................................. B60G 17/00
[52] U.S. Cl. ...................... 364/424.05; 280/707
[58] Field of Search .............. 364/424.05; 280/707, 280/708

[56] References Cited

U.S. PATENT DOCUMENTS

| 4,520,289 | 5/1985 | Sato et al. | 310/316 |
| 4,664,409 | 5/1987 | Nakashima et al. | 280/707 |
| 4,717,172 | 1/1988 | Asami et al. | 280/707 |
| 4,717,173 | 1/1988 | Sugasawa et al. | 280/707 |
| 4,729,580 | 3/1988 | Buma et al. | 280/707 |
| 4,765,648 | 8/1988 | Mander et al. | 280/707 |
| 4,770,438 | 9/1988 | Sugasawa et al. | 280/707 |
| 4,787,650 | 11/1988 | Doi et al. | 280/707 |
| 4,797,823 | 1/1989 | Ikemoto et al. | 364/424.05 |
| 4,853,860 | 8/1989 | Achenbach | 364/424.05 |
| 4,861,068 | 8/1989 | McCabe | 280/714 |
| 4,882,693 | 11/1989 | Yopp | 364/424.01 |
| 4,907,154 | 3/1990 | Yasuda et al. | 364/424.05 |
| 4,909,536 | 3/1990 | Hale | 280/707 |
| 4,989,148 | 1/1991 | Gürke et al. | 364/424.05 |
| 5,044,660 | 9/1991 | Yamamura et al. | 280/707 |
| 5,072,965 | 12/1991 | Wada et al. | 280/707 |

FOREIGN PATENT DOCUMENTS

| 0311114 | 4/1989 | European Pat. Off. . |
| 227515 | 10/1984 | Japan . |
| 151108 | 4/1985 | Japan . |
| 18513 | 2/1986 | Japan . |
| 62-80111 | 4/1987 | Japan . |
| 63-6238 | 1/1988 | Japan . |
| 64-67407 | 3/1989 | Japan . |
| 1-202176 | 8/1989 | Japan . |
| 1-202177 | 8/1989 | Japan . |

Primary Examiner—Thomas G. Black
Attorney, Agent, or Firm—Cushman, Darby & Cushman

[57] ABSTRACT

A suspension control system for controlling a suspension having a shock absorber provided for a wheel of a vehicle includes a damping force detector which generates a damping force detection signal which indicates a change of a damping force of the shock absorber based on a condition of a road surface on which the vehicle is running. The system also includes a sprung resonance component extraction unit which extracts a sprung resonance component signal from the damping force detection signal. The sprung resonance component signal includes components having frequencies around a sprung resonance frequency of the shock absorber. Further, the system includes a determining part which determines whether or not the sprung resonance component signal exceeds a first level range provided for detecting a sign of the occurrence of a long-term vehicle vibration and which outputs a determination result. Moreover, the system includes a damping force controller which controls the shock absorber so that when the determining part determines that the sprung resonance component signal exceeds the first level range, the damping force of the shock absorber is altered to and maintained at an increased level and thus the suspension is maintained at a state which corresponds to the increased level and which is harder than before.

35 Claims, 36 Drawing Sheets

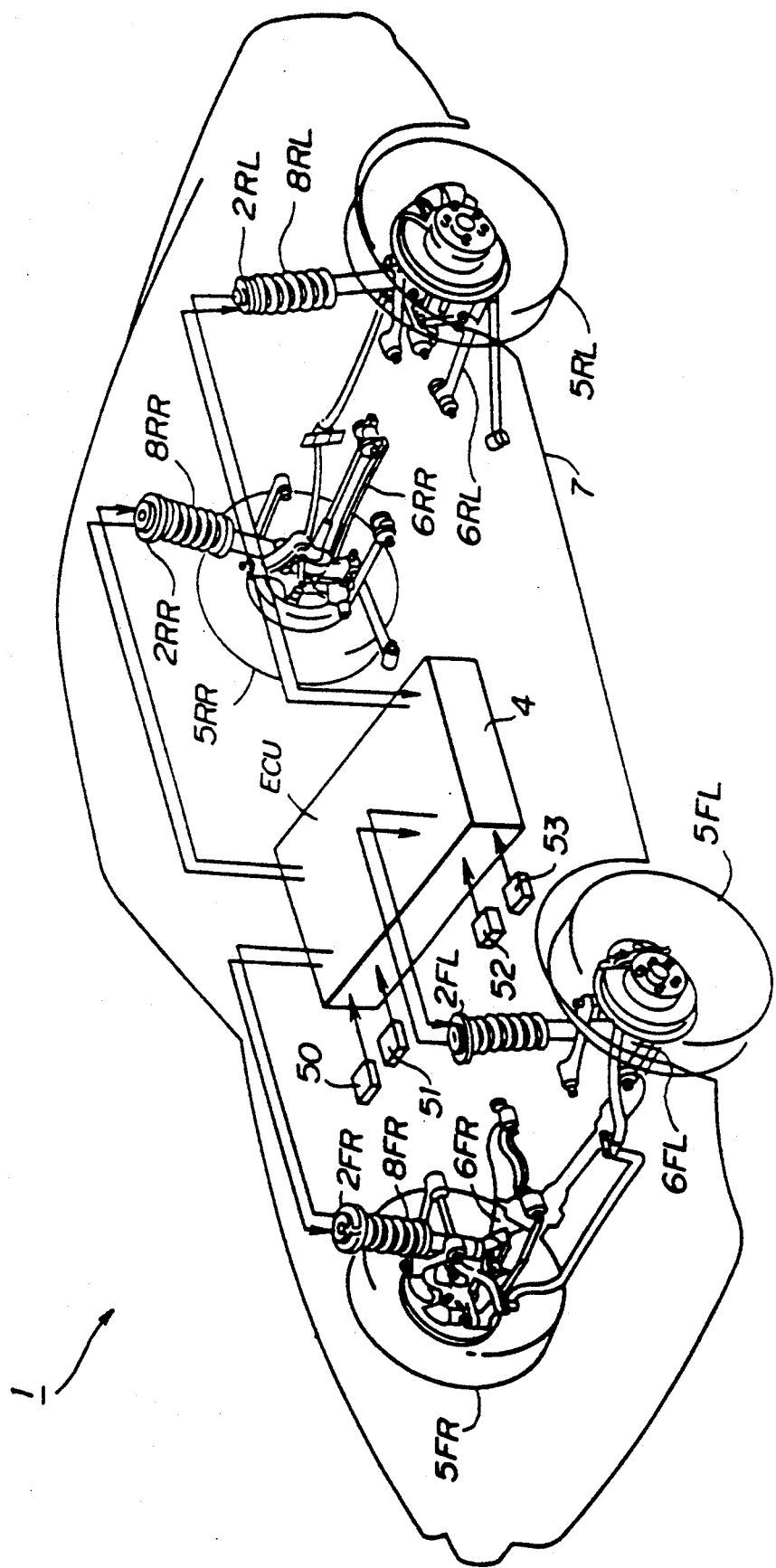

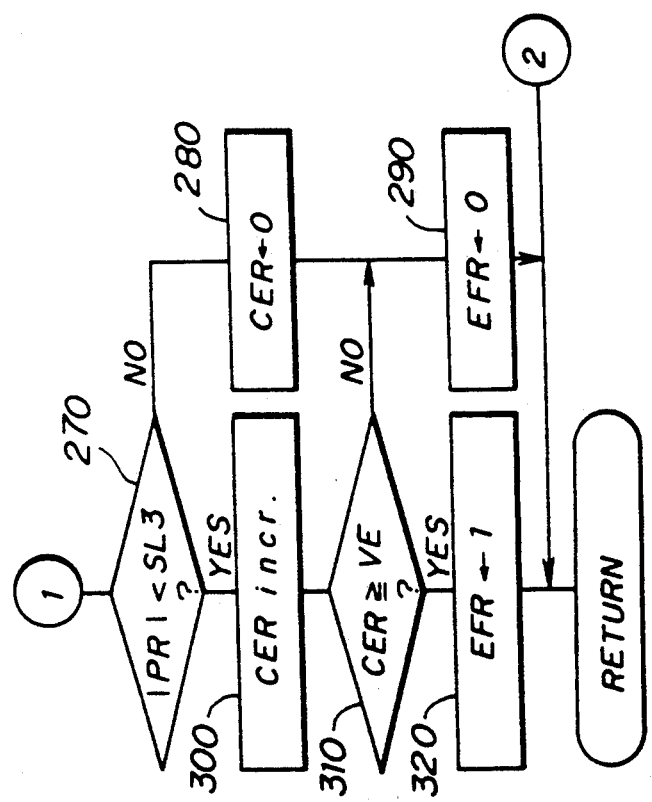

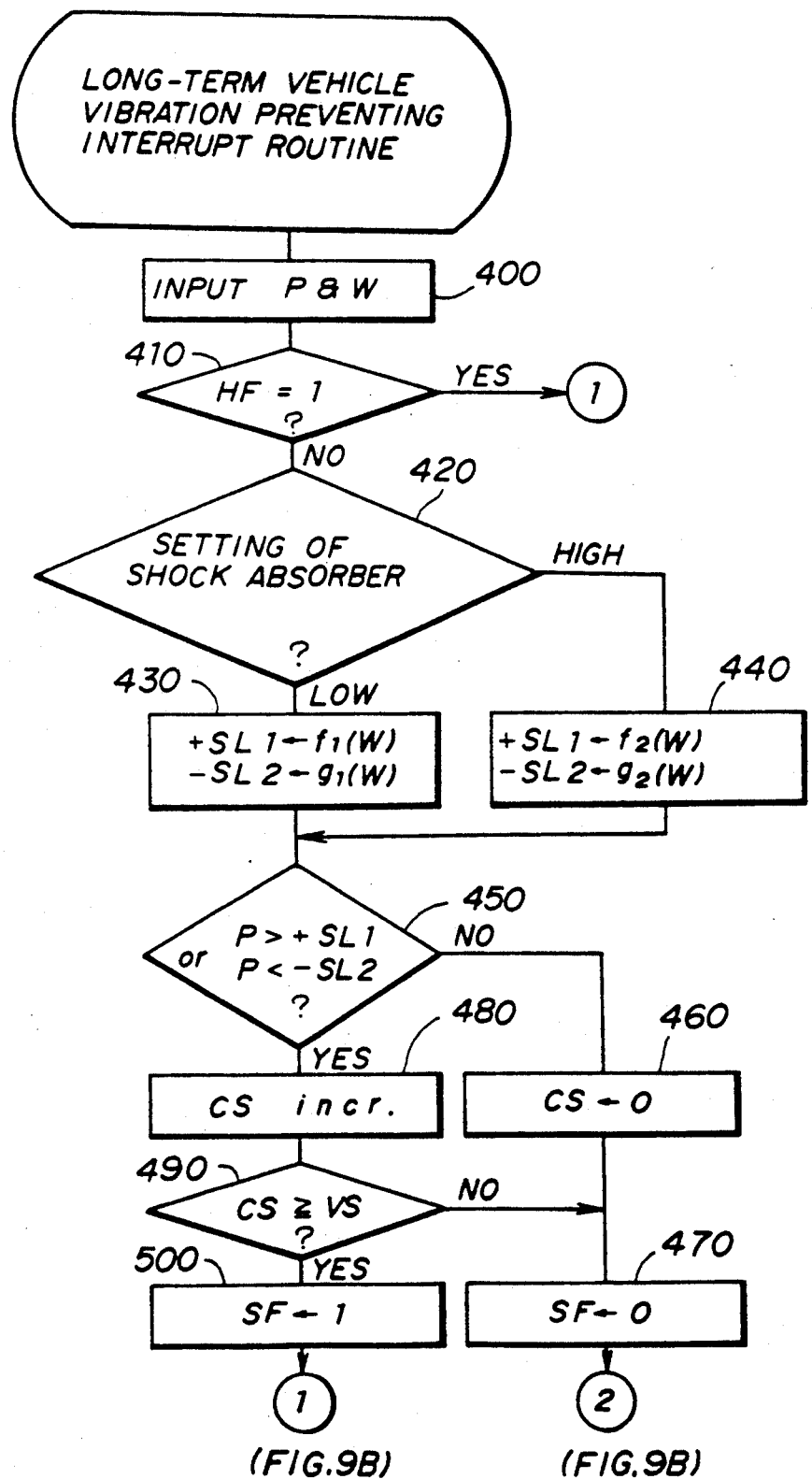

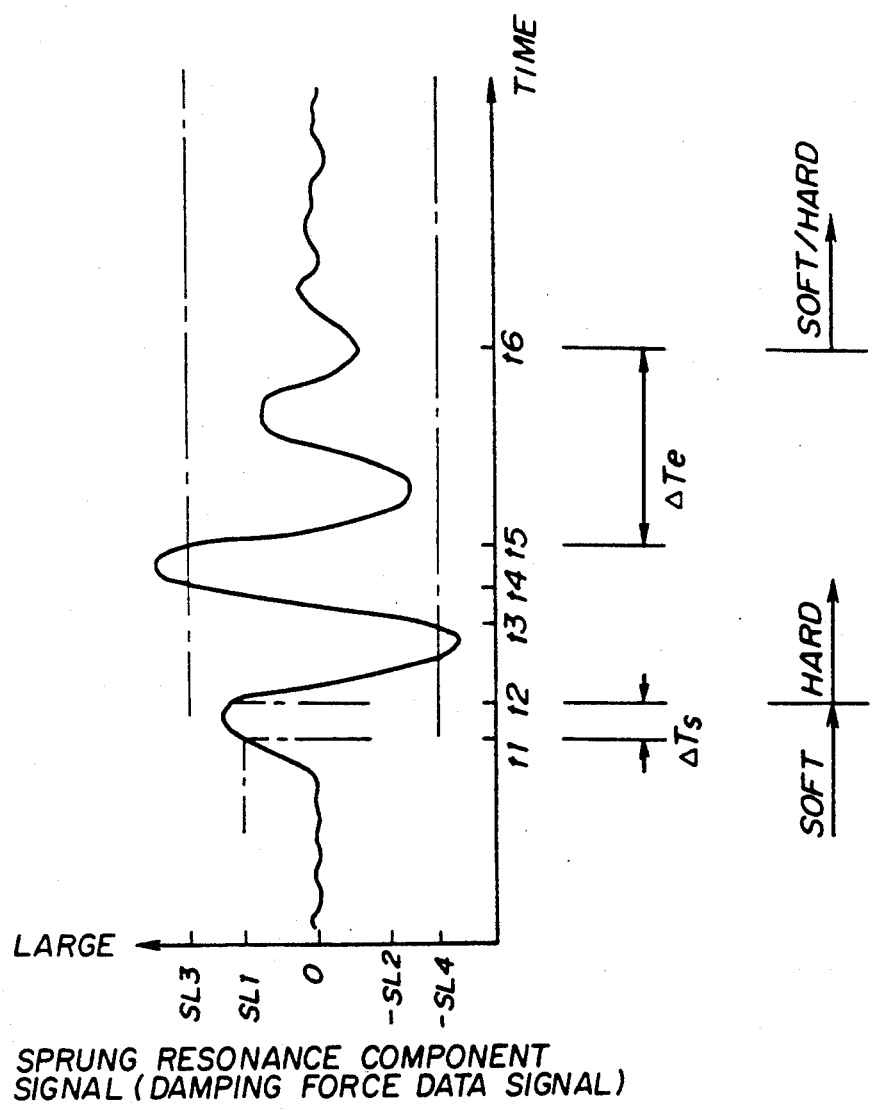

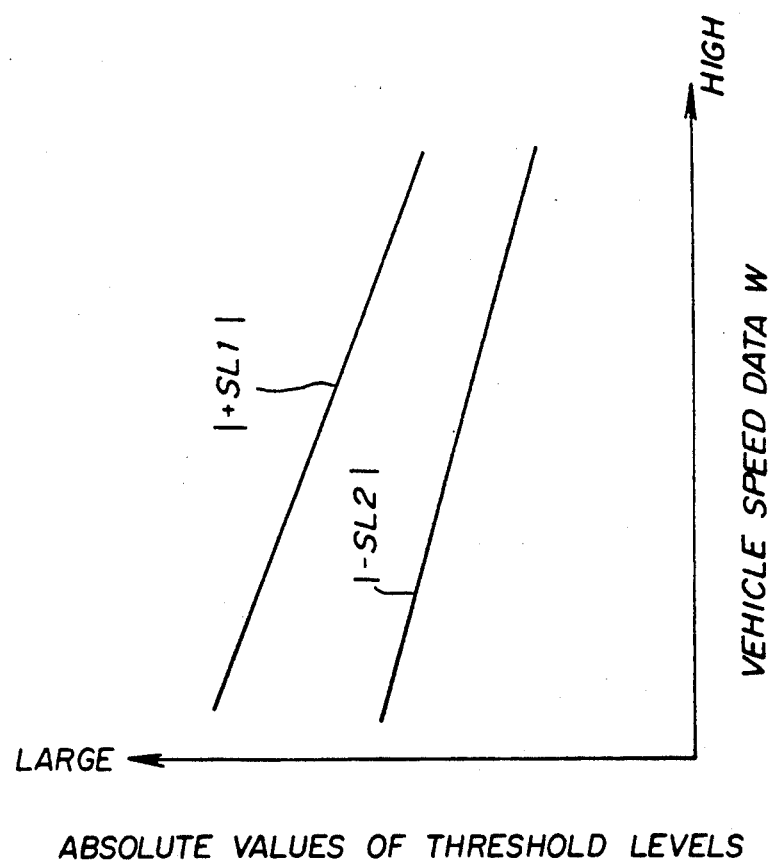

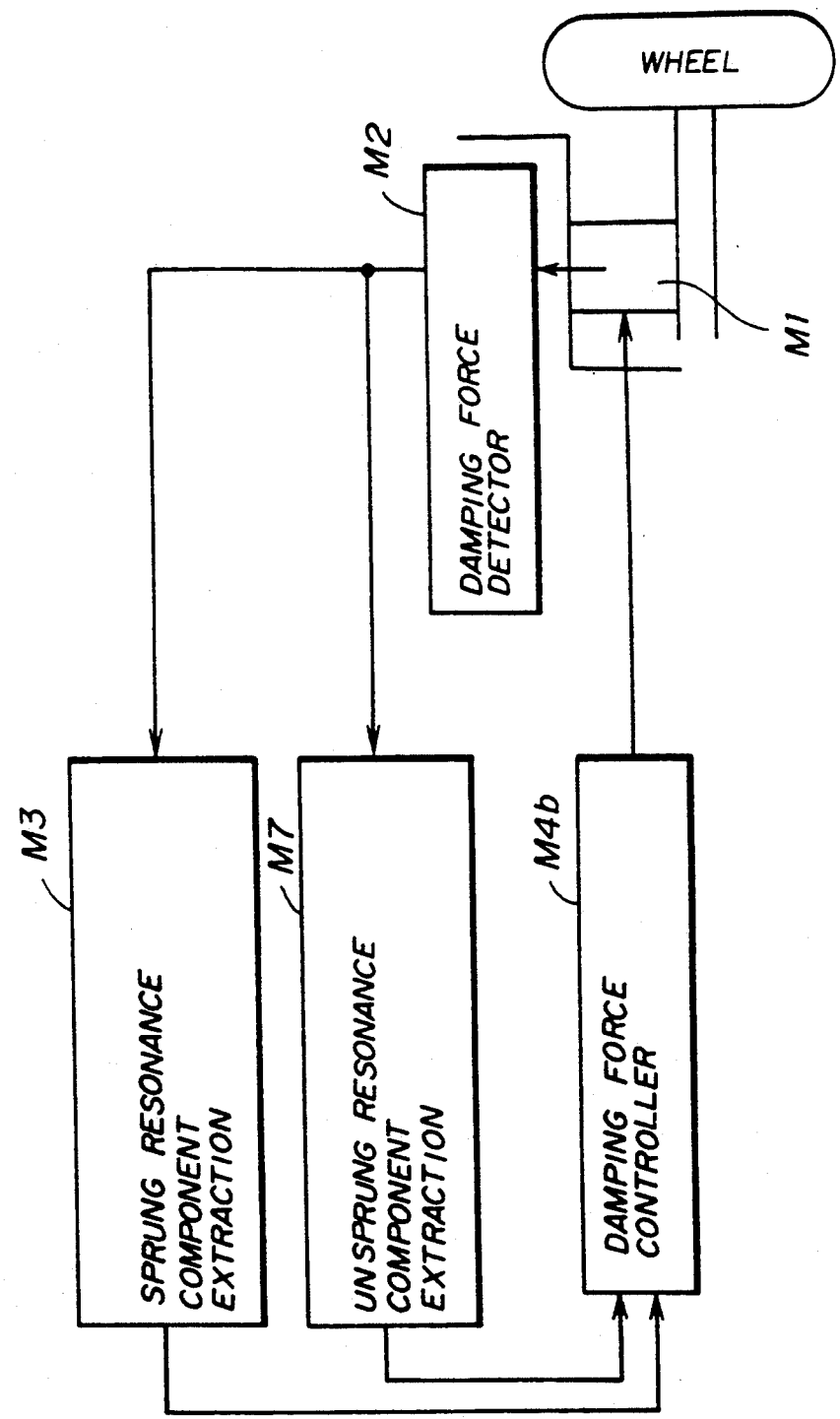

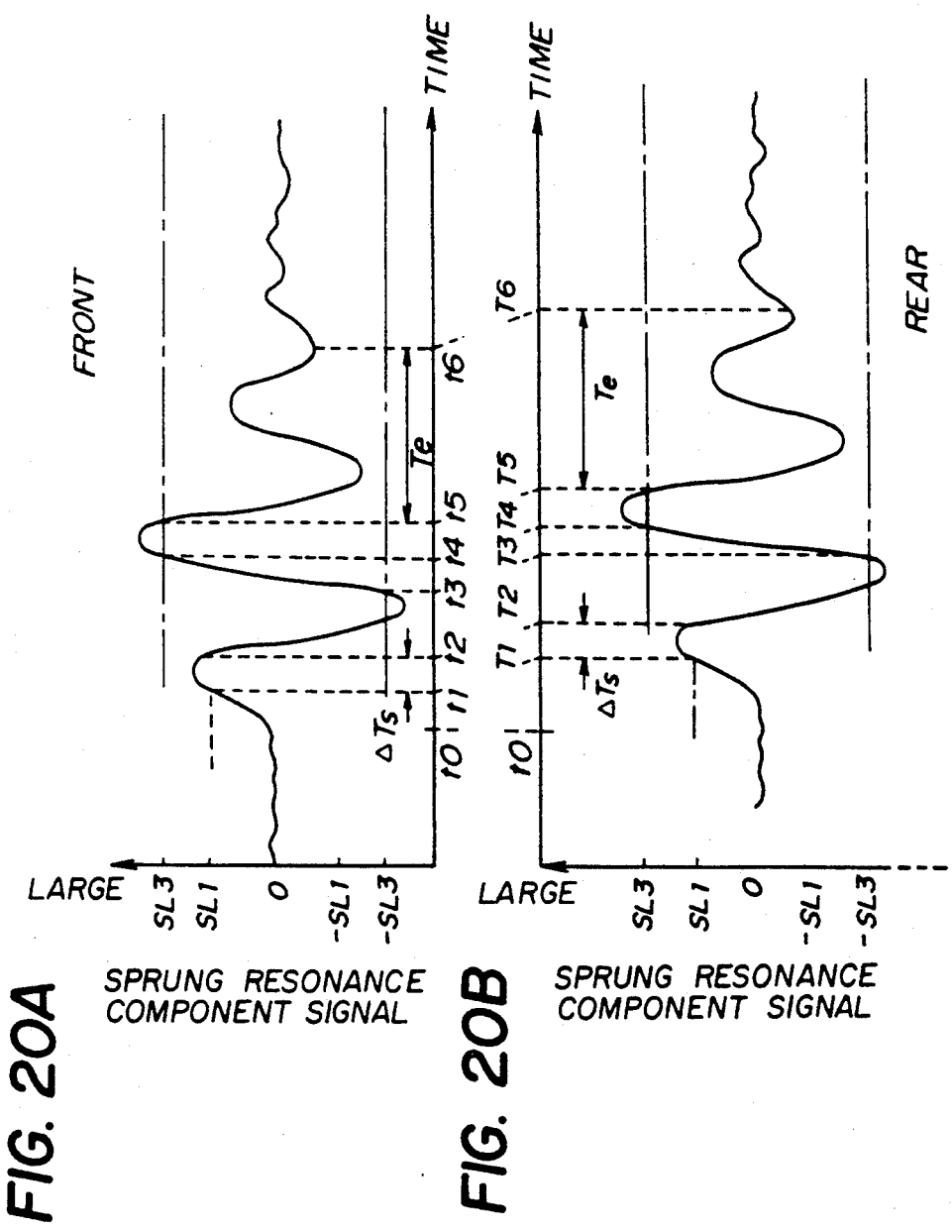

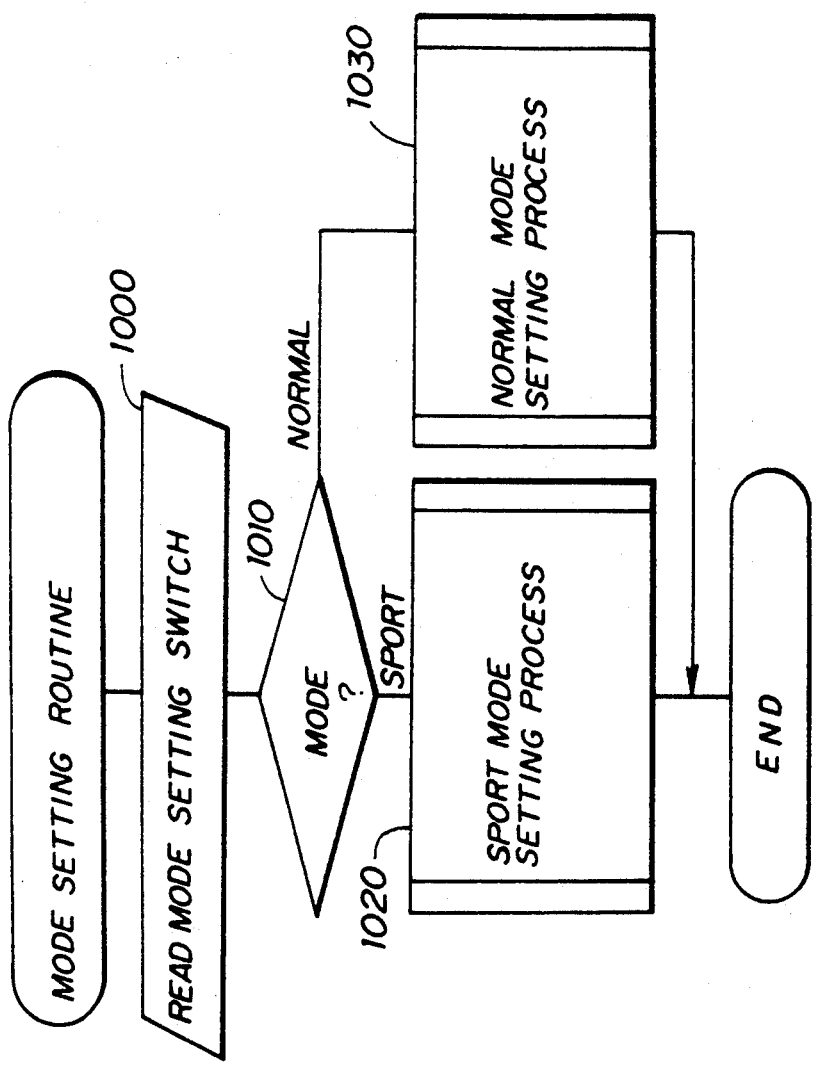

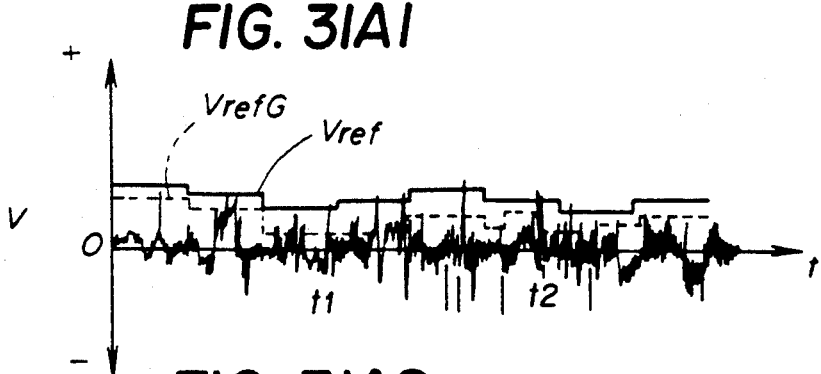
FIG. 31A1
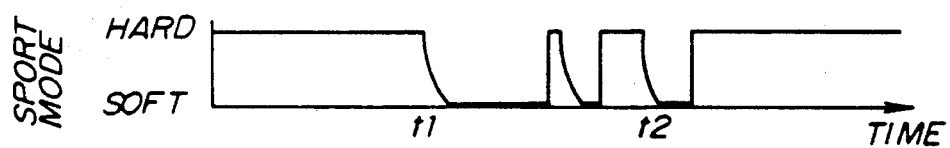
FIG. 31A2
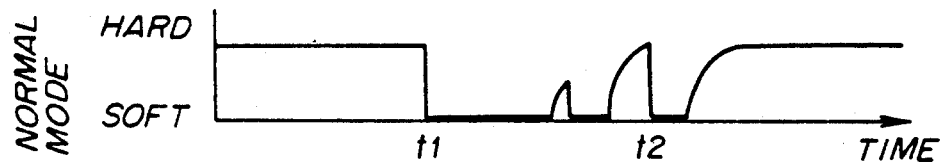
FIG. 31A3
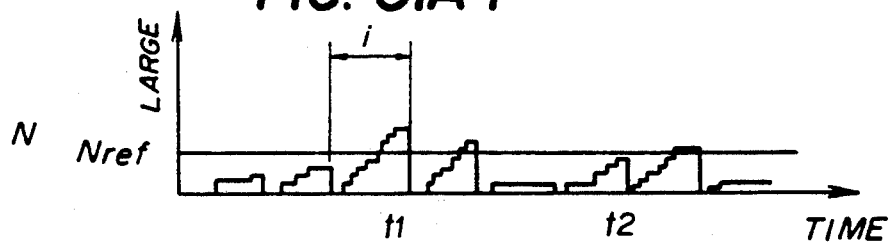
FIG. 31A4

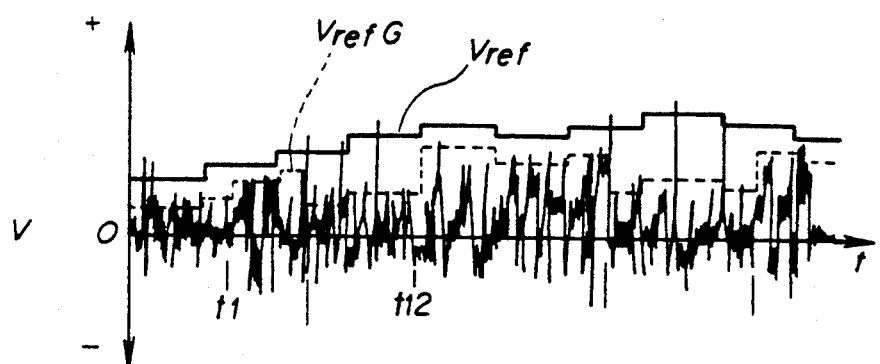
FIG. 31B1
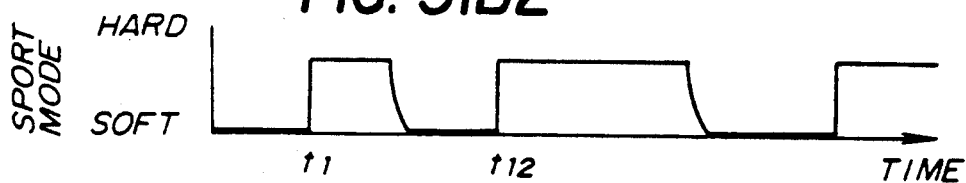
FIG. 31B2
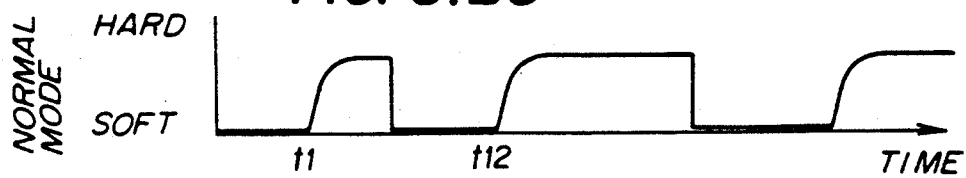
FIG. 31B3
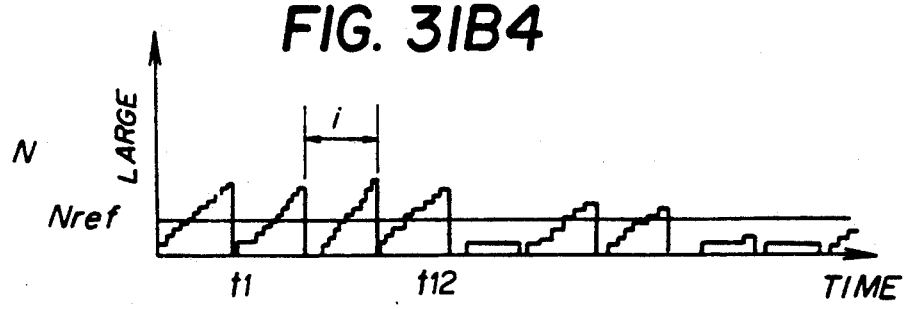
FIG. 31B4

SUSPENSION CONTROL SYSTEM

BACKGROUND OF THE INVENTION

(1) Field of the Invention

The present invention generally relates to a suspension control system for controlling a suspension of an automotive vehicle, and more particularly to a suspension control system in which a change of vibration of the vehicle due to the road surface condition is detected and the damping force characteristic of a shock absorber provided in the suspension is altered so that the vehicle vibration is suppressed.

(2) Description of the Related Art

There is known a suspension control apparatus directed to suppressing a vibration of the automotive vehicle which has a long term approximately equal to one second and causes a car sickness (see Japanese Laid-Open Patent Application No. 62-80111). In the proposed apparatus, a long-term vehicle vibration is detected on the basis of a change of height of the vehicle. When a long-term vehicle vibration is detected, the damping force of a shock absorber is increased so that a suspension is set to a hard state. In order to detect a long-term vehicle vibration, changes of the vehicle heights with respect to front and rear wheels are detected. Then, a situation is detected where a signal showing a change of the vehicle height with respect to the front wheel has a phase opposite to that for the rear wheel and the signals with respect to the front and rear wheels have frequencies of vibrations in the signals approximately equal to a sprung resonance frequency (about 1.0 [Hz]) and where the amplitudes of the vibrations are greater than a predetermined vibration level. When the above-mentioned situation is detected, it is concluded that the vehicle has a long-term vehicle vibration. The frequencies of the vibrations are calculated by measuring a half of one period of each vibration.

However, there is room for improvement in the proposed suspension control system. That is, the procedure for suppressing a long-term vehicle vibration is started after such a vibration is actually detected. Thus, a driver and/or a passenger will feel a delay of the suppression of long-term vehicle vibrations, particularly in a specific vehicle, such as a sport-type vehicle or having vehicle vibration characteristics. Further, the conventional suspension control system cannot sufficiently suppress the long-term vehicle vibrations in some vehicle running conditions. For example, long-term vehicle vibrations alter depending on the vehicle speed or the road surface condition.

SUMMARY OF THE INVENTION

It is a general object of the present invention to provide an improved suspension control system in which the above-mentioned disadvantages are eliminated.

A specific object of the present invention is to provide a suspension control system in which the occurrence of long-term vehicle vibrations is predicted so that it is prevented before taking place.

Another object of the present invention is to provide a suspension control system in which long-term vehicle vibrations are dynamically suppressed on the basis of the vehicle running condition.

The above-mentioned objects of the present invention are achieved by a suspension control system for controlling a suspension having a shock absorber provided for a wheel of a vehicle, comprising: damping force detecting means for generating a damping force detection signal which indicates a change of a damping force of the shock absorber based on a condition of a road surface on which the vehicle is running; sprung resonance component extracting means, coupled to the damping force detecting means, for extracting a sprung resonance component signal from the damping force detection signal, the sprung resonance component signal including components having frequencies around a sprung resonance frequency of the shock absorber; determining means, coupled to the sprung resonance component extracting means, for determining whether or not the sprung resonance component signal exceeds a first level range provided for detecting a sign of the occurrence of a long-term vehicle vibration and for outputting a determination result; and damping force controlling means, coupled to the determining means, for controlling the shock absorber so that when the determining means determines that the sprung resonance component signal exceeds the first level range, the damping force of the shock absorber is altered to and maintained at an increased level and thus the suspension is maintained at a state which corresponds to the increased level and which is harder than before.

BRIEF DESCRIPTION OF THE DRAWINGS

Other objects, features and advantages of the present invention will become more apparent from the following detailed description when read in conjunction with the accompanying drawings, in which:

FIG. 2 is a perspective view illustrating an automotive vehicle in which a suspension control system according to the present invention is installed;

FIGS. 6, 7A and 7B are flowcharts illustrating the operation of the suspension control system according to the first embodiment of the present invention;

FIGS. 9A and 9B are flowcharts illustrating an essential part of the operation of the suspension control system shown in FIG. 8;

FIG. 10 is a graph illustrating how to control the suspension according to the second embodiment of the present invention;

FIG. 11 is a graph illustrating the relationship between the threshold values and the vehicle speed;

FIG. 12 is a block diagram illustrating the principle of a suspension control system according to a third embodiment of the present invention;

FIG. 20A and 20B are graphs illustrating how to control the suspension;

FIGS. 25 through 28 are flowcharts illustrating the operation of the suspension control system shown in FIG. 18;

FIGS. 31A and 31B are diagrams illustrating how the suspensions are controlled by the procedure shown in FIGS. 25 through 28.

DESCRIPTION OF THE PREFERRED EMBODIMENTS

Figure 1:
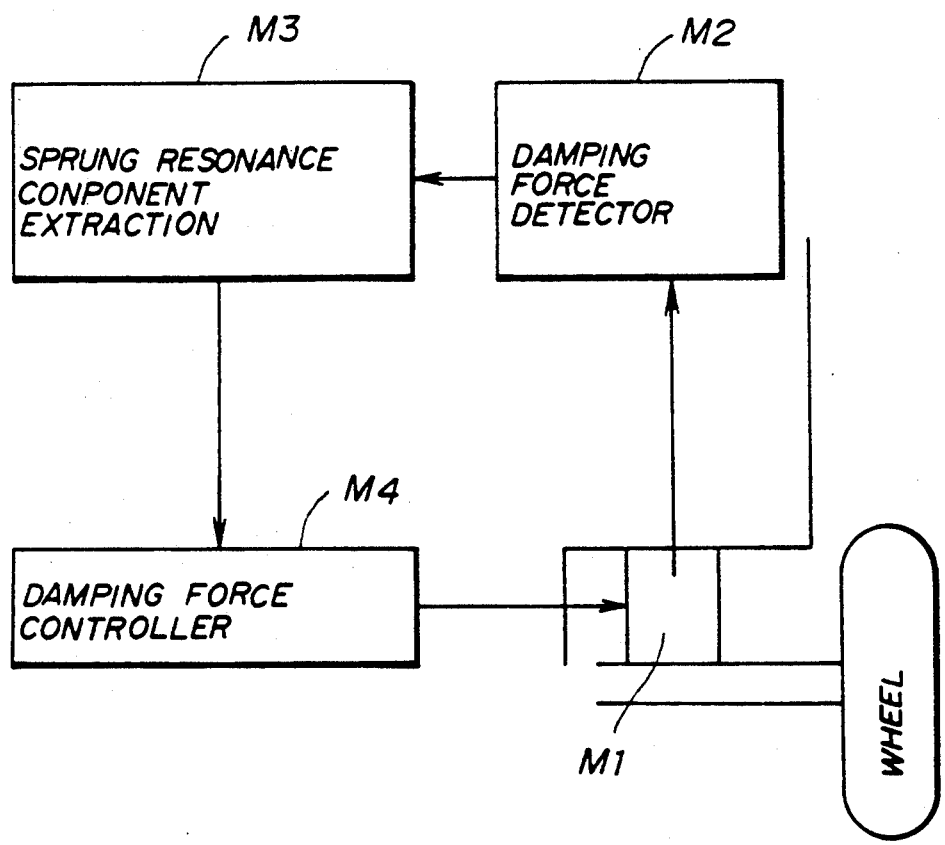
FIG. 1 is a block diagram illustrating the principle of a suspension control system according to a first preferred embodiment of the present invention.

Referring to FIG. 1, there is illustrated the principle of a suspension control system according to a first preferred embodiment of the present invention. A shock absorber M1 of a suspension is controlled by the suspension control system which is composed of a damping force detector M2, a sprung resonance component extraction unit M3 and a damping force controller M4. The damping force detector M2 detects a change of the damping force of the shock absorber M1 and outputs a damping force detection signal which reflects the change of the damping force. The sprung resonance component extraction unit M3 extracts only frequency components around a sprung resonance frequency from the damping force detection signal. Hereafter, the frequency components extracted by the sprung resonance component extraction unit M3 are referred to as a sprung resonance component signal. That is, the sprung resonance component signal generated from the damping force detection signal is used for predicting the occurrence of a long-term vehicle vibration. The damping force controller M4 determines whether or not the (amplitude) level of the sprung resonance component signal falls in a predetermined allowable range. If the damping force controller M4 judges that the level of the sprung resonance component signal is outside of the predetermined allowable range, the damping force controller M4 controls the shock absorber M1 so that the damping force thereof increases. Normally, the damping force controller M4 controls the shock absorber M1 by a conventional procedure, for example, by comparing a damping force change rate with a predetermined reference value. It will be noted that the damping force change rate shows the rate of change of the damping force. When the damping force change rate exceeds the reference value, the damping force controller M4 controls the shock absorber M1 so that it is altered to a soft state from a hard state. During the above-mentioned operation, if the damping force controller M4 determines that the level of the sprung resonance component signal is outside of the predetermined allowable range, the damping force controller M4 increases the reference value so that it becomes difficult for the shock absorber M1 to be altered to the soft state. Thus, the characteristic of the shock absorber M1 becomes harder.

A description will now be given of a detailed structure of the first embodiment of the present invention with reference to FIG. 2, which shows that the suspension control system according to the first preferred embodiment of the present invention is applied to variable damping force type shock absorbers 2FL, 2FR, 2RL, 2RR which are parts of suspensions provided in a vehicle 1. The damping force of each of the shock absorbers 2FL, 2FR, 2RL and 2RR is switchable between a first level (soft state) and a second level (hard state). The shock absorber 2FL is provided between a vehicle body 7 and a suspension lower arm 6FL for a left front wheel 5FL. The shock absorber 2FR is provided between the vehicle body 7 and a suspension lower arm 6FR for a right front wheel 5FR. The shock absorber 2RL is provided between the vehicle body 7 and a suspension lower arm 6RL for a left rear wheel 5RL. The shock absorber 2RR is provided between the vehicle body 7 and a suspension lower arm 6RR for a right rear wheel 5RR. Each of the shock absorbers 2FL, 2FR, 2RL and 2RR includes a built-in piezoelectric load sensor and a piezoelectric actuator pair. The piezoelectric load sensors in the shock absorbers 2FL, 2FR, 2RL and 2RR detect force exerted on the shock absorbers 2FL, 2FR, 2RL and 2RR, respectively. The piezoelectric actuators in the shock absorbers 2FL, 2FR, 2RL and 2RR function to switch the damping forces thereof between the first level and the second level.

A description will now be given of the shock absorbers 2FL, 2FR, 2RL and 2RR. Since all the shock absorbers 2FL, 2FR, 2RL and 2RR are of the same structure in the present embodiment, only the shock absorber 2FL provided for the left front wheel 5FL is described for the sake of convenience. It will be noted that when there is no difference among the four shock absorbers, suffixes such as FL, FR, RL and RR are omitted.

Figure 3A:
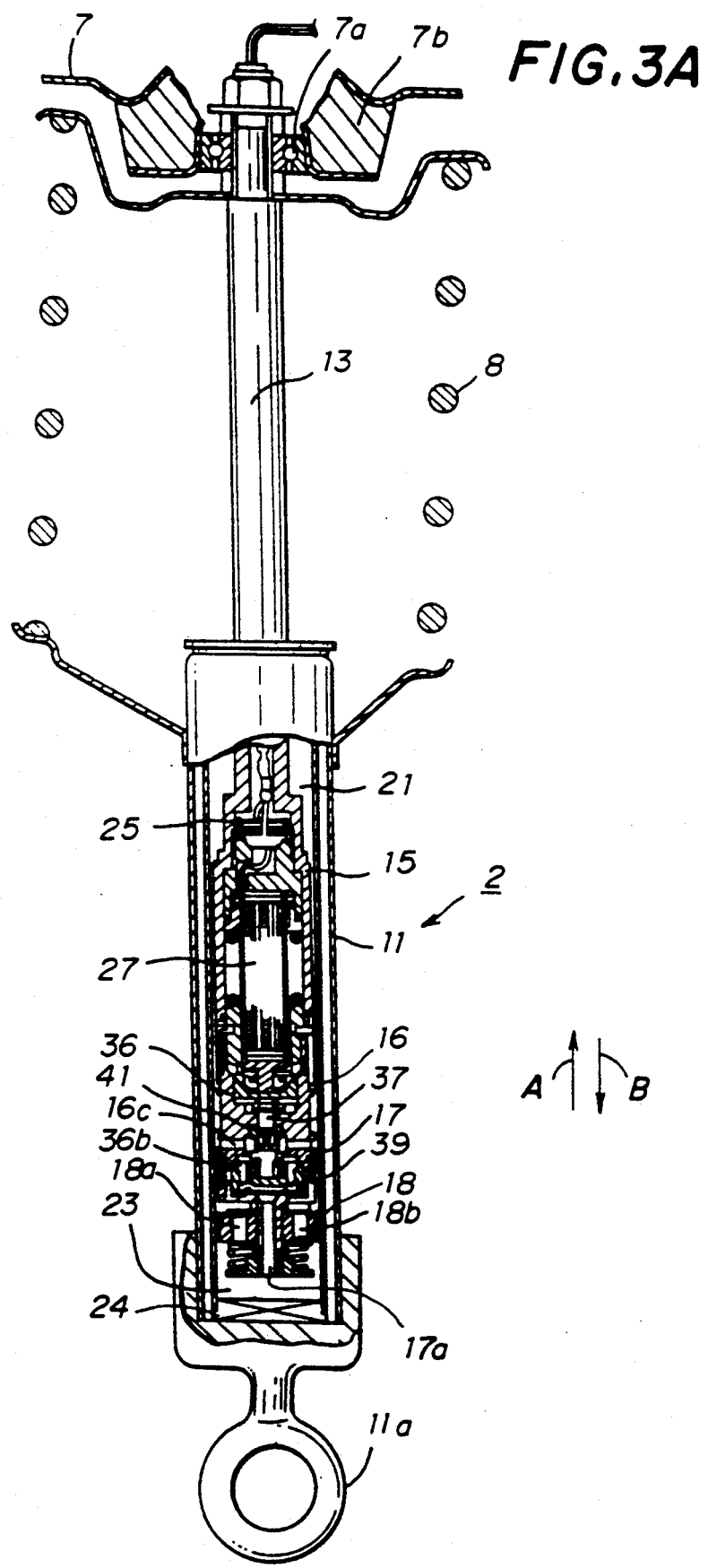
FIG. 3A is a partially sectional view of a shock absorber used in the vehicle shown in FIG. 2.

As shown in FIG. 3A, the shock absorber 2 is fixed to a suspension lower arm 6 through a wheel-shaft-side member 11a at a lower end of a cylinder 11. On the other hand, the shock absorber 2 is fixed, together with a coil spring 8, to the vehicle body 7 through a bearing 7a and a rubber element 7b at an upper end of a rod 13 which penetrates into the cylinder 11. Inside the cylinder 11, there are provided an internal cylinder 15, a connecting member 16 and a cylindrical member 17 which are coupled to the lower end of the rod 13, as well as a main piston 18 which is slidable along an inner surface of the internal cylinder 15. A piezoelectric load sensor 25 and a piezoelectric actuator 27 are accommodated in the internal cylinder 15 connected to the rod 13 of the shock absorber 2.

The main piston 18 is provided outside of the cylindrical member 17 and engages therewith. A seal member 19 is provided between a circumferential outer surface of the main piston 18 and the inner surface of the internal cylinder 15. An internal area of the cylinder 11 is separated into a first fluid room 21 and a second fluid room 23 by the main piston 18. A backup member 28 is provided on the leading end of the cylindrical member 17. The backup member 28 presses a spacer 29 and a leaf valve 30 against the cylindrical member 17 together with the main piston 18. In this state, the spacer 29 and the leaf valve 30 are fixed. A leaf valve 31 and a collar 32 are provided between the backup member 28 and the main piston 18. The leaf valve 31 and the collar 32 are pressed against the backup member 28 and fixed thereto in this state. A main valve 34 and a spring 35 are interposed between the leaf valve 31 and the backup member 28. The main valve 34 and the spring 35 urge the leaf valve 31 toward the main piston 18. A valve 24 selectively connecting a reserver room provided between the internal cylinder 15 and the cylinder 11 is provided on the bottom of the internal cylinder 15.

In a state where the main piston 18 is in a stationary state, the leaf valves 30 and 31 close a expansion-side path 18a and a contraction-side path 18b provided in the main piston 18 on a single side of both the expansion-side path 18a and the contraction-side path 18b. The paths 18a and 18b are opened on respective single sides thereof in accordance with a movement of the main piston 18 indicated by the arrow A or B. Thus, fluid filled in the first and second fluid rooms 21 and 23 passes through one of the paths 18a and 18b so that it moves between the first fluid room 21 and the second fluid room 23. In a state where the movement of the fluid between the first fluid room 21 and the second fluid room 23 is limited to the movement between the paths 18a and 18b, a damping force generated with respect to the movement of the rod 13 is great so that the characteristic of the suspension is "HARD".

Figure 3B:
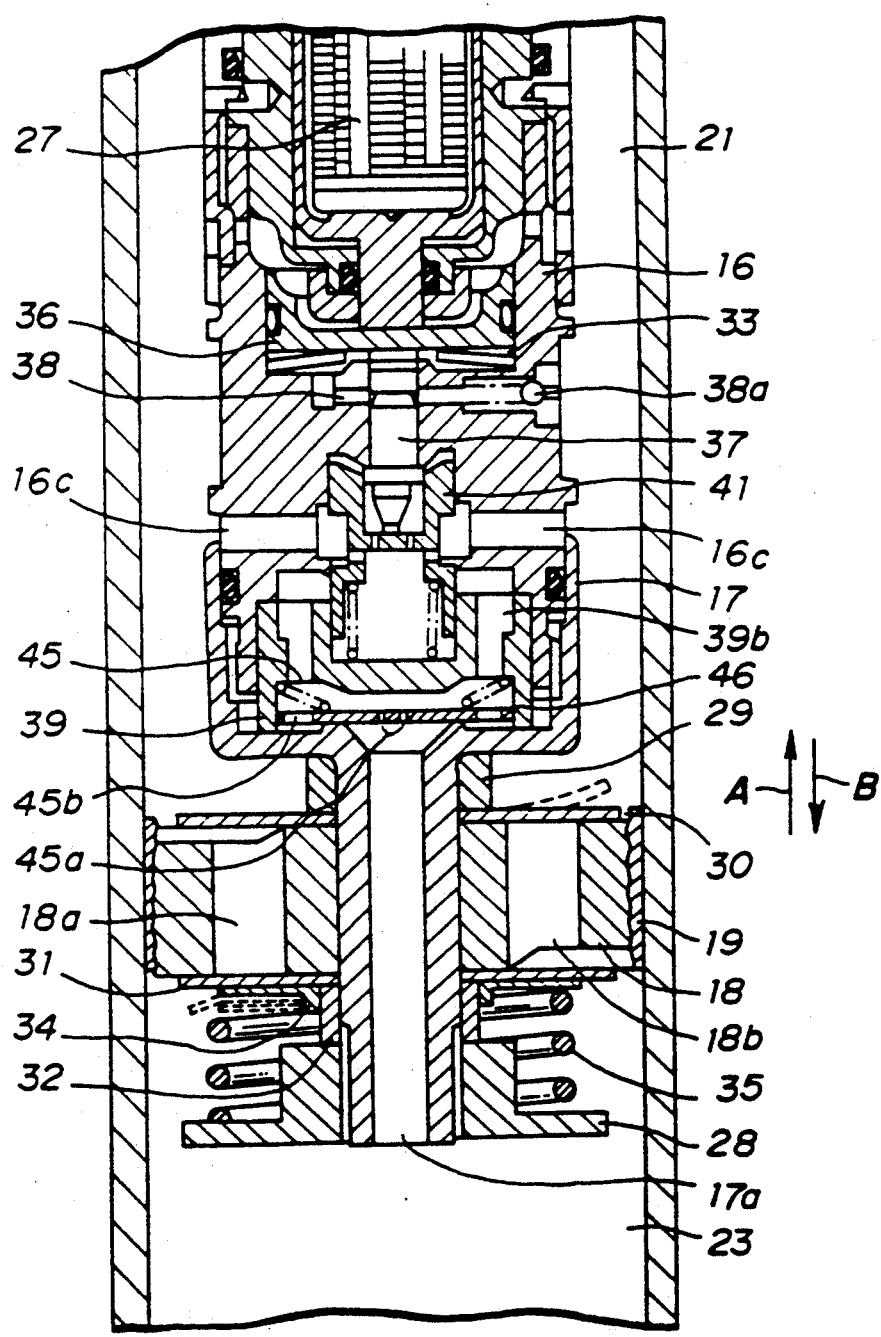
FIG. 3B is an enlarged sectional view of an essential part of the shock absorber shown in FIG. 3A.

As shown in FIGS. 3A and 3B, both the piezoelectric load sensor 25 and the piezoelectric actuator 27 provided inside the connecting member 16 are electrostriction element laminated members in which thin plates formed of piezoelectric ceramics are laminated through electrodes. In other words, one electrode is elevationally sandwiched between two adjacent thin plates. Each of the piezoelectric thin plates in the piezoelectric load sensor 25 is polarized due to a force generated in the shock absorber 2, that is, a damping force. An electrical output signal from each of the piezoelectric thin films in the piezoelectric load sensor 25 is supplied to an impedance circuit, which generates a voltage signal. Thus, it is possible to obtain the rate of change in the damping force from the voltage signal related to each of the piezoelectric thin films.

The piezoelectric actuator 27 has laminated electrostriction elements, each of which expands or contracts with a high response characteristic when a high voltage is applied thereto. The piezoelectric actuator 27 directly drives the piston 36. When the piston 36 is moved in the direction indicated by the arrow B shown in FIG. 3B, a plunger 37 and a spool 41 having a substantially H-shaped cross section are moved in the same direction through the movement of oil in an oiltight room 33. When the spool 41 is moved from the position shown in FIG. 3B (original position) in the direction of the arrow B, a sub fluid path 16c connected to the first fluid room 21 and a sub fluid path 39b of a bush 39 connected to the second fluid room 23 become connected to each other. The sub fluid path 39b further becomes connected to a fluid path 17a in the cylindrical member 17 through an oil hole 45a formed in a plate valve 45. Thus, the movement of the spool 41 in the direction of the arrow B causes an increase in the amount of fluid which is transferred between the first fluid room 21 and the second fluid room 23. That is, when the piezoelectric actuator 27 expands with the high-voltage applied thereto, the shock absorber 2 is altered from the hard state to the soft state. When the piezoelectric actuator 27 is discharged so that no charge is stored therein, the piezoelectric actuator 27 is returned to "HARD".

The degree of movement of the leaf valve 31 provided on the lower surface of the main piston 18 is controlled by the spring 35. An oil hole 45b having a diameter greater than that of the oil hole 45a is formed in the plate valve 45 at a position farther from the center of the plate valve 45 than the oil hole 45a. When the plate valve 45 moves toward the bush 39 against the force by the spring 46, the oil is allowed to move through the oil hole 45b. Thus, the amount of oil obtained when the main piston 18 moves in the direction of the arrow B is greater than that obtained when the main piston 18 moves in the direction of the arrow A, irrespective of the position of the spool 41. That is, the damping force is altered due to the movement direction of the main piston 18 so that improved characteristics of the shock absorber can be obtained. An oil refilling path 38 is provided together with a check valve 38a between the oiltight room 33 and the first fluid room 21 so that the amount of oil in the oiltight room 33 is fixed. The shock absorber 2 shown in FIGS. 3A and 3B is disclosed in, for example, "AUTOMOBILE ENGINEERING MANUAL, FIFTH EDITION", JIDOSHA GIJUTSUKAI, 1983, pp. 4-27 or "TOYOTA CARINA FF NEW MODEL MANUAL", TOYOTA JIDOSHA KABUSHIKI KAISHA, 1985, pp. 4-87.

A description will now be given of an electronic control unit (hereafter simply referred to as ECU) 4 for switching the damping force of each of the shock absorbers 2 between the first level (soft state) and the second level (hard state) with reference to FIG. 4. In order to detect the driving condition of the vehicle 1, the following sensors are provided in addition to the piezoelectric load sensors 25FL, 25FR, 25RL and 25RR. A steering sensor 50 detects an steering angle of a steering direction (not shown for the sake of simplicity) and generates a detection signal which indicates the current steering angle. A vehicle speed sensor 51 outputs a series of pulses having a number proportional to the current vehicle speed. A shift position sensor 52 detects the current shift position of a change gear (not shown) and generates a detection signal which indicates the current shift position. A stop lamp switch 53 generates a detection signal when a brake pedal is stepped on. The output signals from the above-mentioned sensors are input to the ECU 4. The ECU 4 generates output signals individually supplied to high-voltage application circuits 75FL, 75FR, 75RL and 75RR, which drive the piezoelectric actuators 27FL, 27FR, 27RL and 27RR, respectively.

The ECU 4 includes a central processing unit (hereafter simply referred to as a CPU) 61, a read only memory (ROM) 62 and a random access memory (RAM) 64, all of which are connected to a common bus 65. An input interface circuit 67 and an output interface circuit 68 are connected to the common bus 65.

The ECU 4 further includes a damping force detection circuit 70, a waveform-shaping circuit 73, high-voltage application circuits 75FL, 75FR, 75RL and 75RR, an ignition switch 76, a battery 77, a high-voltage power supply circuit 79 and a constant-voltage power supply circuit 80.

The damping force detection circuit 70 has four detection circuits (not shown) individually provided for the piezoelectric load sensors 25FL, 25FR, 25RL and 25RR. Each of the detection circuits receives the detection signal (a voltage signal V) supplied from the corresponding piezoelectric load sensor 25, and generates an output signal which corresponds to the voltage signal V and which indicates the damping force change rate. As has been described previously, the detection signal from each of the piezoelectric sensors 25FL, 25FR, 25RL and 25RR varies in accordance with an amount of a charge which is charged into or discharged from each of the piezoelectric thin films. Further, each of the detection circuits of the damping force detection circuit 70 outputs a damping force detection signal which is obtained by integrating the voltage signal of the corresponding piezoelectric load sensor 25. The damping force detection signal output by each of the detection circuits of the damping force detection circuit 70 is sent to the input interface circuit 67. The input interface circuit 67 includes an analog-to-digital converter (not shown), which converts the damping force detection signal in analog form into a digital signal. The waveform shaping circuit 73 shapes the waveforms of the detection signals from the steering sensor 50 and the vehicle speed sensor 51 into waveforms appropriate to signal processing executed by the CPU 61, such as a pulse waveform. The detection signals output by the shift position sensor 52 and the stop lamp switch 53 are input directly to the input interface circuit 67.

The high-voltage application circuits 75FL, 75FR, 75RL and 75RR are connected to the piezoelectric actuators 27FL, 27FR, 27RL and 27RR (FIG. 4), respectively. The high-voltage power supply circuit 79 is of a switching regulator type, and generates high voltages, +500 volts and −100 volts. Each of the high-voltage application circuits 75FL, 75FR, 75RL and 75RR applies a voltage of +500 volts or −100 volts to the corresponding piezoelectric actuator 27 in accordance with a control signal from the CPU 61. When a voltage of +500 volts is applied to the corresponding piezoelectric actuator, it expands. On the other hand, when a voltage of −100 volts is applied to the corresponding piezoelectric actuator, it contracts. Thereby, the oil amount is switched so that the shock absorber 2 is altered to the soft state or the hard state. That is, when the piezoelectric actuator 27 is expanded by the application of a voltage of +500 volts, an increased amount of fluid passes between the first fluid room 21 and the second fluid room 23 in the shock absorber 2 so that the damping force is decreased. On the other hand, when the piezoelectric actuator 27 is contracted by the application of a voltage of −100 volts, a decreased amount of fluid passes between the first fluid room 21 and the second fluid room 23 so that the damping force is increased. The constant voltage power supply circuit 80 converts the voltage of the battery 77 into an operating voltage (5 volts for example).

The ECU 4 has a lowpass filter 55 and a high pass filer 56. The lowpass filter 55 is supplied with the damping force detection signals which are output by the damping force detection circuit 70 and which are related to the shock absorbers 2RL and 2RR provided for the left and right rear wheels 5RL and 5RR, respectively. Signal components of the damping force detection signals passing through the lowpass filter 55 are output to the highpass filter 56. The output signals which are respectively output from the highpass filter 56 are output, as sprung resonance component signals, to the CPU 61 through the input interface circuit 67.

The lowpass filter 55 is designed to pass signal components having frequencies equal to or lower than about 1.3 [Hz]. On the other hand, the highpass filter 56 is designed to pass signal components having frequencies higher than about 1.0 [Hz]. Thus, the highpass filter 56 outputs the sprung resonance component signals, each of which has frequency components higher than about 1.0 [Hz] and lower than about 1.3 [Hz]. An example of the sprung resonance component signal is illustrate in FIG. 5.

The CPU 61 makes a decision on the road surface condition and the vehicle running status on the basis of the damping force change rate signals, the damping force detection signals, the sprung resonance component signals and the detection signals output from the steering sensor 50, the vehicle speed sensor 51, the shift position sensor 52 and the stop lamp switch 53. It will be noted that all of the above signals are always not needed to detect the road surface condition and the vehicle running status, but some of them may be selectively used. The CPU 61 outputs control signals from the above-mentioned signals to the high-voltage application circuits 75 so that the damping forces of the shock absorbers 2 are controlled, as will be described below.

A description will now be given a suspension control procedure which includes a procedure for preventing the occurrence of a long-term vehicle vibration and which is executed by the ECU 4. The suspension control executed by the ECU 4 is composed of a damping force control procedure (routine) shown in FIG. 6 and a long-term vehicle vibration preventing control interrupt procedure (routine) shown in FIGS. 7A and 7B, which is a sub-routine of the damping force control routine shown in FIG. 6. Each of the two procedures are carried out by interrupts which occur at predetermined intervals.

Figure 6:
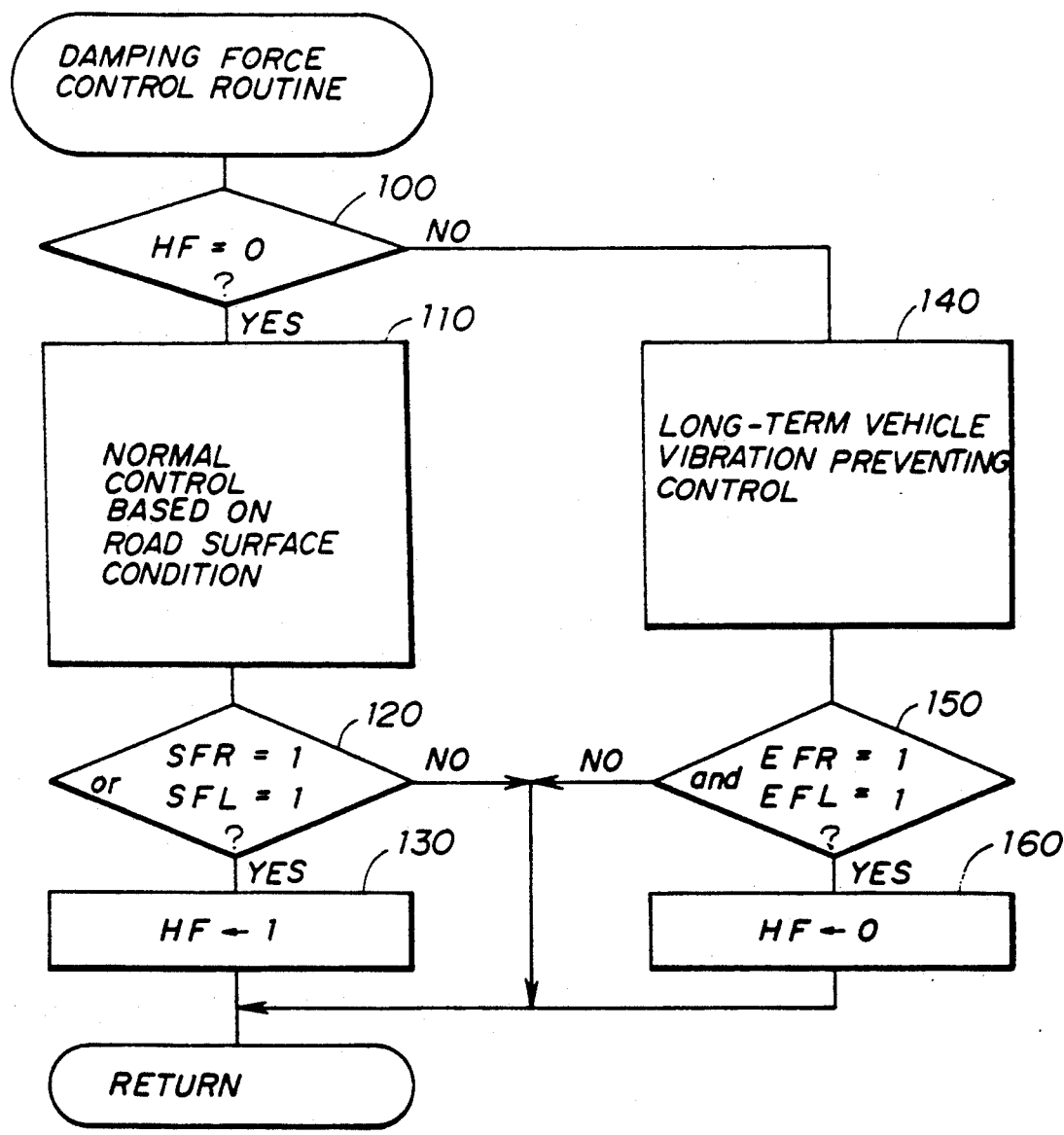
Figure 7A:
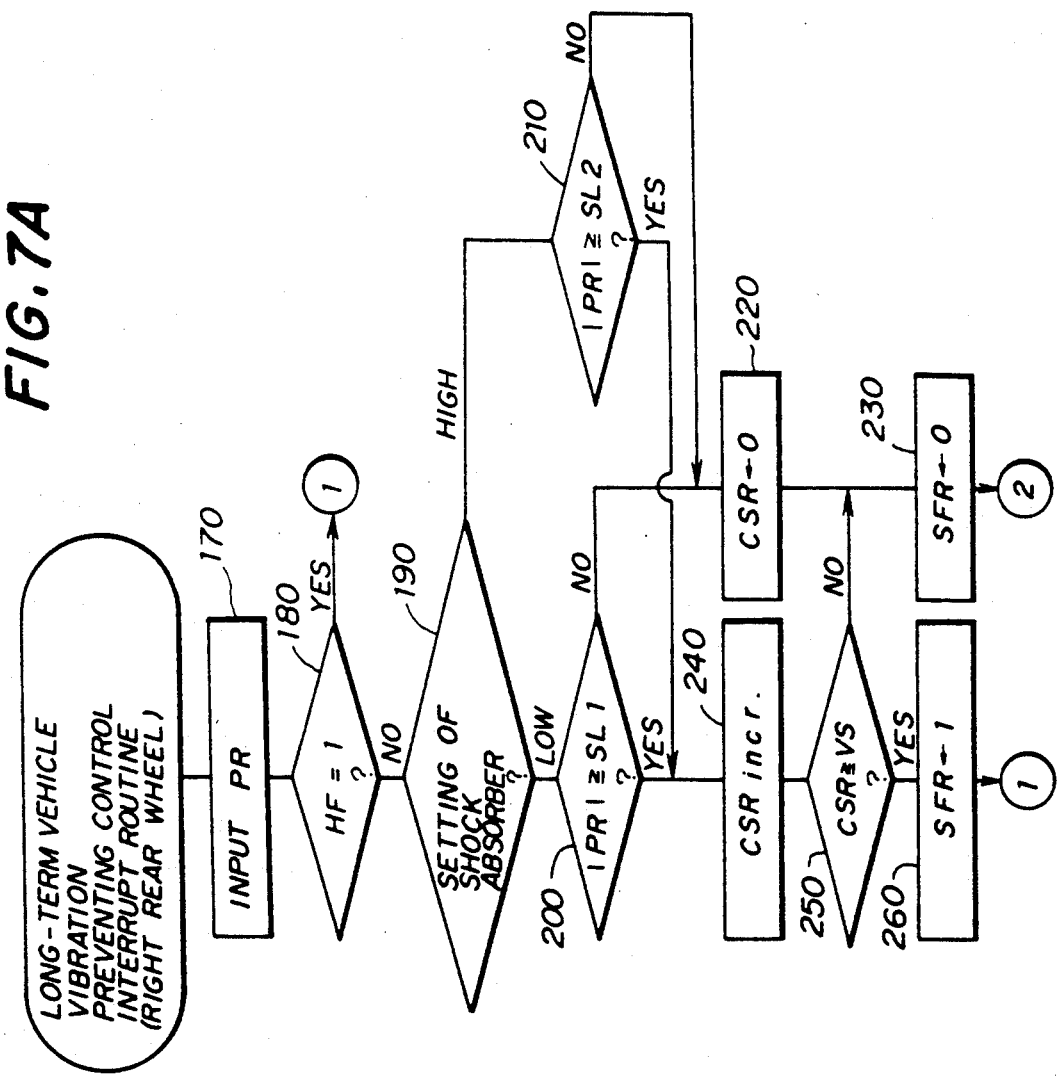

The damping force control procedure shown in FIG. 6 has a step to alter the characteristics of the shock absorbers 2 in accordance with the road surface condition. The damping force control based on the road surface condition is a normal damping force control. When a control starting condition to start the long-term vehicle vibration preventing control shown in FIGS. 7A and 7B is satisfied, the long-term vehicle vibration preventing control is carried out in place of the normal damping force control and sets all of the four the shock absorbers 4 to a hard state. When a control ending condition to end the long-term vehicle vibration preventing control is satisfied, this is ended.

The long-term vehicle vibration preventing control interrupt procedure shown in FIGS. 7A and 7B detects a sign of the occurrence of a long-term vehicle vibration and determines whether or not the above-mentioned control starting condition is satisfied. During the long-term vehicle vibration preventing control, it is determined whether or not the above-mentioned control ending condition is satisfied. The long-term vehicle vibration preventing control interrupt procedure shown in FIGS. 7A and 7B are separately carried out for the shock absorbers 2RL and 2RR on the basis of the sprung vibration component signals which are output from the highpass filter 56 and which are related to the left and right rear wheels 5RL and 5RR, respectively.

The damping force control routine shown in FIG. 6 will now be described in more detail. This routine commences with step 100, at which step the CPU 61 determines whether or not a HARD priority alteration flag HF is equal to 0. The HARD priority alternation flag HF is set to 1 when the control start condition to start the long-term vehicle vibration preventing control is satisfied. When the HARD priority alteration flag HF is not equal to 1 and thus the result at step 100 is YES, the normal damping force control based on the road surface condition is carried out at step 110. As has been described and will be described in more detail later, the damping force change rate obtained by the damping force detection circuit 70 shown in FIG. 4 is compared with a reference value, and the damping force of the corresponding shock absorber 2 is controlled in accordance with the comparison result. When the damping force change rate exceeds the reference value, the damping force of the shock absorber 2 is set to a low level so that the shock absorber 2 is altered to a soft state from a hard state. Normally, when the road surface is rough, the shock absorber 2 is set to the soft state and, on the other hand, when the road surface is flat, the shock absorber 2 is set to the hard state.

After step 110 is executed, step 120 is carried out. At step 120, two long-term vehicle vibration control starting flags (hereafter simply referred to as control starting flags) SFR and SFL are referred to. The flags SFR and SFL are set/reset during the procedure shown in FIGS. 7A and 7B which is carried out individually for the rear wheels 5RR and 5RL. At step 120, it is discerned whether or not at least one of the flags SFR and SRL is equal to 1. When the result at step 120 is YES, it is concluded that the control starting condition to start the long-term vehicle vibration preventing control is satisfied. Thus, the HARD priority alteration flag HF is set to 1 at step 130. Then, the CPU 61 ends the control shown in FIG. 6.

On the other hand, if the HARD priority alteration flag HF is equal to 1 and thus the result at step 100 is NO, the CPU 61 executes step 140, at which step the long-term vehicle vibration preventing control is executed. The long-term vehicle vibration preventing control is given priority to the normal damping force control executed at step 110, and sets all the shock absorbers 2 to the hard state. If some of the shock absorbers 2 are in the hard state, they are maintained in the hard state.

After step 140 is executed, step 150 is executed at which two long-term vehicle vibration preventing control ending flags (hereafter simply referred to as control ending flags) EFR and EFL are referred to. The control ending flags EFR and EFL are set/reset by the procedure shown in FIGS. 7A and 7B. At step 150, the CPU 61 judges whether or not both the control ending flags EFR and EFL are equal to 1. When the result at step 150 is YES, the CPU 61 resets the HARD priority alteration flag HF to zero at step 160. On the other hand, when the result at step 150 is NO, the CPU 61 ends the control shown in FIG. 6. When the HARD priority alteration flag HF is reset to zero, step 110 is carried out in the next execution of the routine shown in FIG. 6.

A description will now be given of the long-term vehicle vibration preventing control interrupt procedure by which the control starting flags SFR and SFL and the control ending flags EFR and EFL are set/reset. The procedure shown in FIGS. 7A and 7B is separately carried out for the left rear wheel 5RL and the right real wheel 5RR in the same way. The following description and the flowcharts shown in FIGS. 7A and 7B are related to the right rear wheel 5RR.

The procedure shown in FIG. 7A commences with step 170, at which step the CPU 61 inputs damping force data PR which forms the aforementioned sprung resonance component signal related to the shock absorber 2RR provided for the right rear wheel 5RR.

At step 180, the CPU 61 judges whether or not the HARD priority alteration flag HF is equal to 1. When it is determined that the flag HF is not equal to 1, a procedure for judging whether or not the control starting condition to start the long-term vehicle vibration preventing control is satisfied is carried out. This judgment procedure starts from step 190. On the other hand, if it is determined, at step 180, that the HARD priority alteration flag HF is equal to 1, the control proceeds to step 270 shown in FIG. 7B. The procedure shown in FIG. 7B judges whether or not the control ending condition to end the long-term vehicle vibration preventing control is satisfied.

The judgment procedure for judging whether or not the control starting condition is satisfied is carried out in such a way that the damping force data signal PR related to the shock absorber 2RR is monitored and the control starting flag SFR is set when a condition indicative of a sign of the occurrence of a long-term vehicle vibration is satisfied. By setting the control starting flag SFR to 1, the HARD priority alteration flag HF is set to 1 at step 130 (FIG. 6) so that the damping force of the shock absorber 2RR is increased to the high level and thus the shock absorber 2RR becomes hard.

Figure 5:
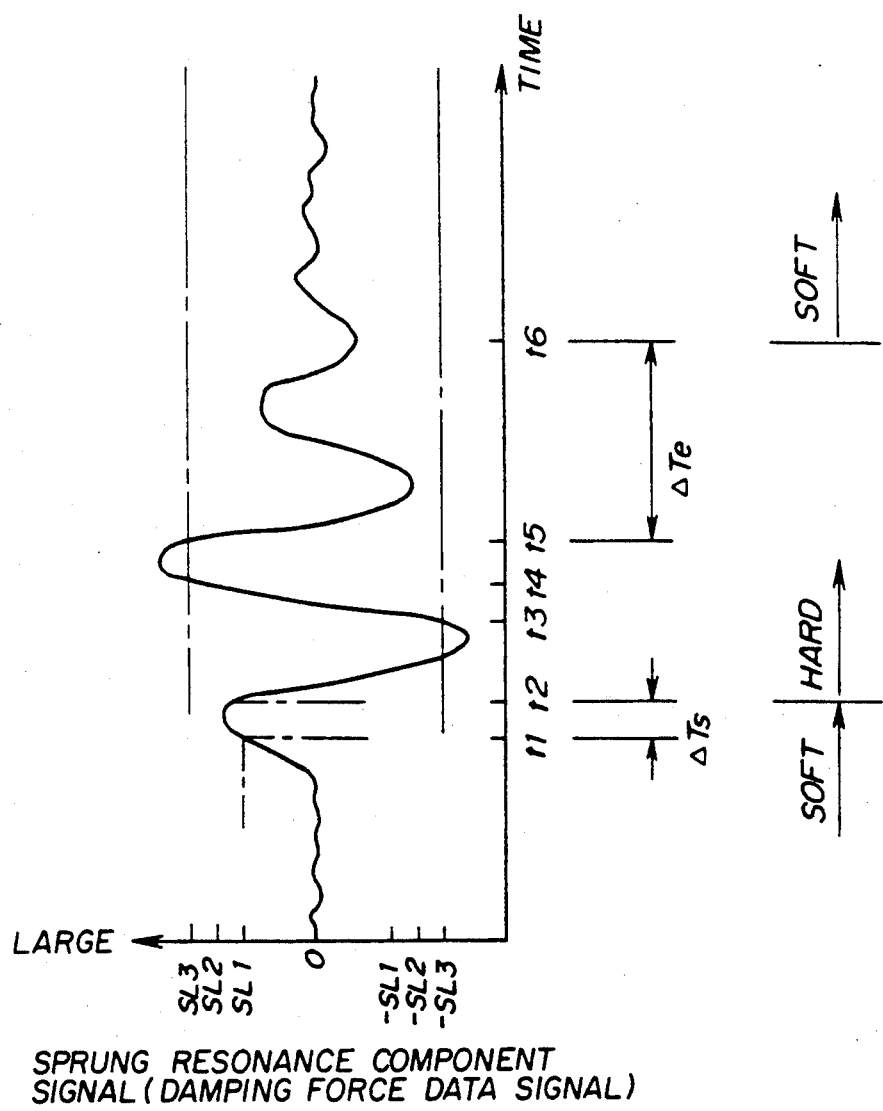
FIG. 5 is a graph illustrating how to control the suspension according to the first preferred embodiment of the present invention.

At step 190 shown in FIG. 7A, the CPU 61 determines whether the setting of the shock absorber 2RR is soft or hard. It is determined that the shock absorber 2RR is in the soft state, the CPU 61 determines, at step 200, whether or not the absolute value of the damping force data PR (sprung resonance component signal), that is $|PR|$ is equal to or greater than a low threshold level SL1. As shown in FIG. 5, positive and negative threshold levels SLI and −SLl are provided. In other words, at step 200, it is determined whether or not the damping force data signal PR is within the range between −SLI and SLl. In FIG. 5, the damping force data signal PR becomes equal to the low threshold level SLI at time $t_1$. On the other hand, when it is determined, at step 190, that the setting of the shock absorber 2RR is hard, the CPU 61 determines, at step 210, whether or not the absolute value $|PR|$ of the damping force data signal PR is equal to or greater than a high threshold level SL2. The high threshold level SL2 is greater than the low threshold level SLI, for example. The two threshold levels SLI and SL2 are provided for compensating for a situation where the damping force data signal PR obtained when the shock absorber 2RR is in the hard state is greater than that obtained when it is in the soft state.

When it is determined, at step 200, that $|PR| < SLI$ or determined, at step 210, that $|PR| < SL2$, it is concluded that there is no sign of the occurrence of a long-term vehicle vibration. Then, the CPU 61 executes a procedure (step 220) for clearing a counter CSR for measuring a judgment period ΔTs necessary to judge the control starting condition and then a procedure (step 230) for resetting the control starting flag SFR. After that, the CPU 61 ends the procedure shown in FIG. 7A.

On the other hand, it is determined, at step 200, that |PR| ≦ SL1 or determined, at step 210, that |PR| ≦ SL2, it is concluded that there is a sign of the occurrence of a long-term vehicle vibration. Thus, the CPU 61 executes a procedure (step 240) for incrementing the counter CSR and then a procedure of step 250. At step 250, the CPU 61 discerns whether or not CSR ≦ VS where VS is a predetermined judgment value. That is, at step 250, it is determined that the counter CSR completes the counting of the judgment period ΔTs.

For example, as shown in FIG. 5 where the shock absorber 2RR is initially in the soft state, when the damping force (sprung resonance component signal) is continuously in excess of the low threshold level SL1, the result at step 200 shown in FIG. 7A is continuously YES. Thus, the counter CSR is continuously incremented at step 240 without being reset and becomes equal to the judgment value VS. As a result, at time $t_2$, the judgment period ΔTs from time $t_1$ elapses.

When the result at step 250 is YES, it is concluded that a sign of the occurrence of a long-term vehicle vibration is detected. At step 260, the CPU 61 sets the control starting flag SFR related to the right rear wheel 5RR to 1. On the other hand, when CSR <VS, it is determined that there is no sign of the occurrence of a long-term vehicle vibration resulting from the right rear wheel, and thus the CPU 61 ends the control.

At step 260, when the flag SFR is set to 1, as has been described previously, the HARD priority alteration flag HF is set at step 130 shown in FIG. 6, and all the shock absorbers 2 are forced to be altered to the hard state at step 140. In the case shown in FIG. 5, all the suspensions are maintained in the hard state from time $t_2$. If the control starting flag SFL 5 related to the right rear wheel 5RL is set to 1 at a step corresponding to step 260 shown in FIG. 7A, step 140 is executed in the same way.

The judgment period ΔTs used for determining whether or not the absolute value of the damping force data signal PR is continuously in excess of SL1 or SL2 is provided for compensating for an error of the lowpass filter 55 and improving precision of the judgment. In actuality, some frequency components having frequencies slightly higher than 1.3 [Hz]pass through the lowpass filter 55. Such frequency components is less related to the occurrence of long-term vehicle vibrations. Thus, even when the levels of these frequency components exceed the threshold level SL1 or SL2, they become less than SL1 or SL2 soon. By providing the judgment period ΔTs, it is possible to eliminate the above-mentioned unnecessary frequency components. In addition, the employment of the judgment period ΔTs slightly causes a delay of timing at which the shock absorber 2 is altered to the hard state, so that the driver or passenger will perceive a good feeling of alteration. If there is no delay time, the shock absorber 2 is altered to the hard state before it actually occurs. This does not provide the driver or passenger with a good alteration feeling. It will be noted that the judgment period ΔTs is much less than the periods of long-term vehicle vibrations approximately equal to one second.

A description will now be given of the procedure for judging the control ending condition to end the long-term vehicle vibration preventing control with reference to FIG. 7B. The procedure shown in FIG. 7B is carried out in the case where it is determined that the HARD priority alteration flag HF is equal to 1 at step 180 (FIG. 7A) or it is determined that CSR ≧ VS at step 250. The procedure shown in FIG. 7B monitors the damping force data signal PR related to the shock absorber 2RR provided for the right rear wheel 5RR, and discerns whether or not a condition is satisfied where no long-term vehicle vibration will occur even if the long-term vehicle vibration preventing control is terminated. If such a condition is satisfied, the control ending flag EFR related to the right rear wheel 5RR is set to 1.

At step 270 shown in FIG. 7B, the CPU 61 determines whether or not the absolute value of the damping force data signal PR, |PR|, is less than a threshold level SL3. For example, the threshold level SL3 is greater than the threshold level SL1 and SL2, as shown in FIG. 5. The threshold level SL3 may be greater than, equal to or less than the threshold level SL1. The magnitude relationship among the threshold levels SL1, SL2 and SL3 can be arbitrarily selected on various conditions. At step 270, when it is determined |PR| ≧ SL3, the damping force of the shock absorber 2RR is still maintained at the high level. That is, if the long-term vehicle vibration preventing procedure is terminated, a long-term vehicle vibration will take place. Thus, the CPU 61 clears a counter CER for measuring a judgment period ΔTe at step 280 and resets the end flag EFR to zero at step 290. Then, the CPU 290 ends the control.

On the other hand, it is determined, at step 270, that the damping force data signal PR is within the range between −SL3 and SL3, the damping force of the shock absorber 2RR is small (a time after $t_3$ or $t_5$ in FIG. 5) so that there is a possibility that the control ending condition with respect to the right rear wheel 5RR is satisfied. For this reason, the CPU 61 increments the counter CER at step 300, and then determines whether or not CER ≧ VE where VE is a judgment value corresponding to the judgment period ΔTe. When the result at step 310 is YES, the measurement of ΔTe is completed.

The counter CER is incremented at step 300 each time the control interrupt routine shown in FIGS. 7A and 7B is executed and it is determined that |PR| <SL3 at step 270. When the count value in the counter CER becomes equal to VE, the result at step 310 becomes YES. For example, as shown in FIG. 5, it is continuously determined that the damping force data signal PR is within the range between −SL3 and SL3 after time $t_3$. Thus, the counter CER is continuously incremented and gets out of the range at time $t_4$. Thus, the counter CER is reset to zero at step 280 before it has been increased to VE. In such a case, it is concluded that there is a possibility that a long-term vehicle vibration will occur if the control is ended. Thus, the end flag EFR is reset to zero at step 290 and the damping control routine shown in FIG. 6 continues to execute the long-term vehicle vibration preventing control.

On the other hand, the procedure which is repeatedly carried out after time $t_5$ increases the counter CER, and the count value of which becomes equal to the judgment value VE because the damping force data signal PR is within the range between the threshold levels −SL3 and SL3. Thus, at time $t_6$ when the counter value in the counter CER has been increased to the judgment value VE, step 310 determines that the count value in the counter CER is equal to or greater than the judgment value VE. It is thus concluded that there is no possibility that long-term vehicle vibrations arising from the right rear wheel 5RR occur even if the long-term vehicle vibration preventing control is terminated. Thus, the CPU 61 sets the control ending flag EFR related to the right rear wheel 5RR at step 320.

In the above-mentioned way, the long-term vehicle vibration preventing control is carried out on the basis of the damping force data signals PR and PL related to the shock absorbers 2RL and 2RR. When the control ending flag EFL related to the left rear wheel 5RL is set to 1, the HARD priority alteration flag HF is reset to zero at step 160 of the damping force control procedure shown in FIG. 6. Then, at step 110, the normal damping force control is carried out on the basis of the road surface condition. If the road surface is rough, each shock absorber 2 is individually altered to the soft state and, on the other hand, if the road surface is flat, each shock absorber 2 is individually is altered to the hard state. In the case shown in FIG. 5, when the judgment period $\Delta$Te elapses at time $t_6$, the shock absorber 2 is altered to the soft state.

The judgment period $\Delta$Te is provided for preventing the control ending condition from being satisfied in a case where the damping force data signal PR falls in the range between $-$SL3 and SL3 after time $t_3$ and becomes out of the range soon after. As a result, the judgment period $\Delta$Te is selected so that it is longer than the periods of vibrations about the sprung resonance frequency.

The above-mentioned control is individually carried out for the left and right rear wheels 5RL and 5RR at predetermined intervals. When a sign of the occurrence of a long-term vehicle vibration is detected, the corresponding control starting flag SFR or SFL is set to 1. When one of the control starting flags SFR and SFL is set to 1, the HARD priority alteration flag HF is set to 1 at step 130 so that the shock absorbers 2 are forced to be set to the hard state so that the occurrence of long-term vehicle vibrations is prevented. During the long-term vehicle vibration preventing control carried out for each of the left and right rear wheels 5RL and 5RR, the control ending flags EFR and EFL are respectively set to 1 when it is determined that no long-term vehicle vibration will occur even when the control is terminated. When both the control ending flags EFR and EFL are set to 1, the HARD priority alteration flag HF is reset to zero at step 160 shown in FIG. 6, and then the long-term vehicle vibration control is ended.

According to the suspension control system according to the first preferred embodiment of the present invention, the following advantages are obtained. Signs of the occurrence of long-term vehicle vibrations are detected on the basis of the damping force data signals PR and PL, and all the suspensions are set to the hard state irrespective of the road surface condition when the signs are detected. With this arrangement, it becomes possible to prevent the occurrence of long-term vehicle vibrations.

The control starting condition is satisfied when one of the control starting flags SFL and SFR related to the left and right rear wheels 5RL and 5RR is set to 1, and the control ending condition is satisfied when both the control ending flags EFL and EFR are set to 1. Thus, even if the right rear wheel 5RL is running on a road surface different from a road surface on which the left rear wheel 5RR is running and thus the damping force data signal related to one of the rear wheels does not have information necessary to detect a sign of the occurrence of long-term vehicle vibrations, it is possible to detect the sign from the damping force data signal related to the other rear wheel. Further, it becomes possible to definitely terminate the long-term vehicle vibration control since it is determined, on the basis of the damping force data signals related to both the rear wheels 5RL and 5RR, that there is no sign of the occurrence of long-term vehicle vibrations.

Since the judgment period $\Delta$Ts is provided, it is possible to eliminate unnecessary frequency components having frequencies slightly higher than the cutoff frequency of the lowpass filter 55 and thus obtain an improved precision of the judgment. As a result, it becomes possible to prevent the occurrence of an erroneous judgment.

By selecting the judgment period $\Delta$Ts in accordance with the type of automobile vehicle, it becomes possible to alter the damping force of each shock absorber 2 to the hard state at an appropriate time when the occurrence of long-term vehicle vibrations is predicted. For example, by slightly delaying the execution of altering the damping force of each shock absorber 2 by the judgment period $\Delta$Ts, the driver or passenger can recognize why the suspensions are altered to the hard state. As a result, the driver or passenger will be able to accept the alteration of the damping force comfortably. In addition, by using the damping force data signals related to the rear wheels 5RL and 5RR for the purpose of detecting a sign of long-term vehicle vibrations, it is possible to obtain good riding comfort such that the suspensions are not altered to the hard state until a sign of the occurrence of a long-term vehicle vibration resulting from at least one of the rear wheels 5RL and 5RR is detected after the front wheel 5FL and 5FR are running on the same road surface.

Various variations of the first embodiment of the present invention may be made. It is possible to use damping force data signals related to, in place of the rear wheels 5RL and 5RR, the front wheels 5FL and 5FR, two diagonally wheels, three wheels or all the wheels. The long-term vehicle vibration control is started when the damping force data signal related to one of the wheels in each of the above-mentioned wheel combinations satisfies the control starting condition, and terminated when the damping force data signals related to all the wheels in each of the wheel combinations satisfy the control ending condition. Alternatively, it is possible to judge both the control starting and ending conditions on the basis of the damping force data signal related to one of the wheels. The shock absorbers 2 can be of a type which provides two or more discrete damping force levels or of a type which continuously varies the damping force level.

Figure 8:
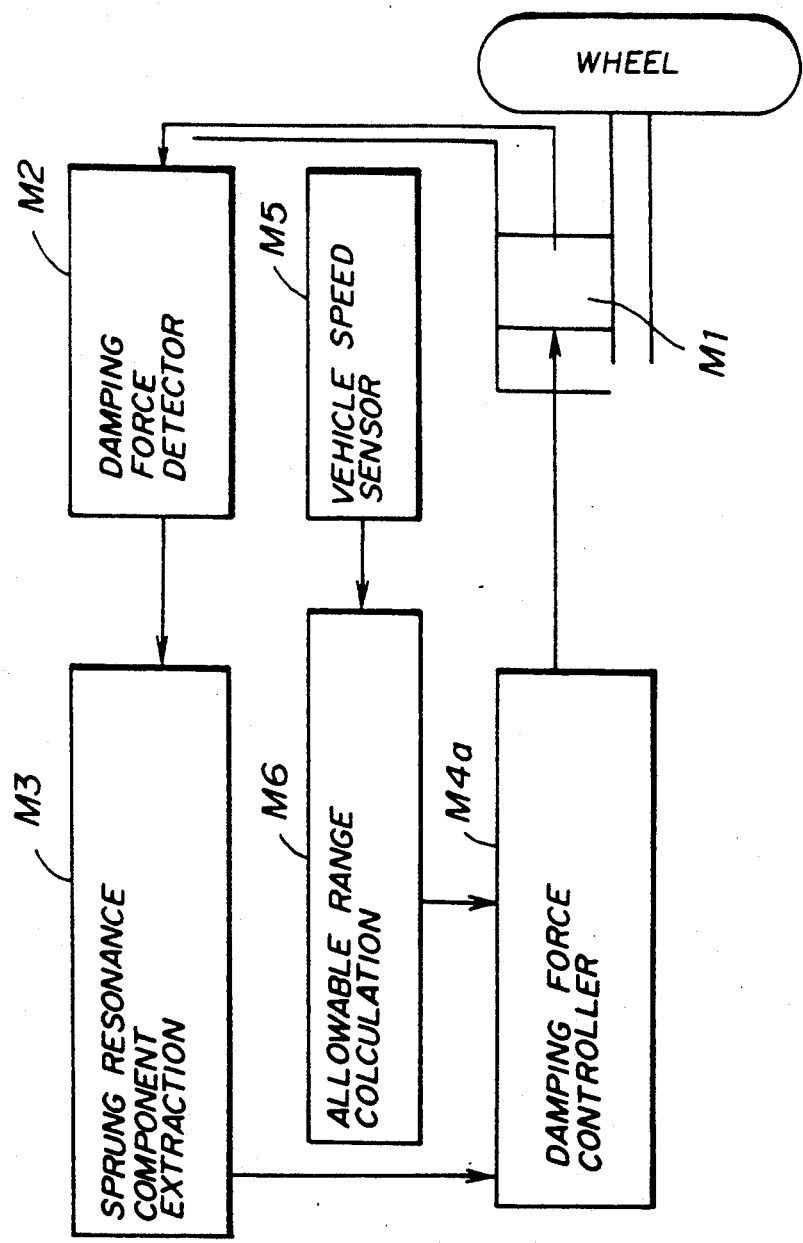
FIG. 8 is a block diagram illustrating the principle of a suspension control system according to a second preferred embodiment of the present invention.

A description will now be given of a suspension control system according to a second preferred embodiment of the present invention. Referring to FIG. 8, there is illustrated the principle of the suspension control system according to the second embodiment of the present invention. In FIG. 8, those parts which are the same as those shown in FIG. 1 are given the same reference numerals. The suspension control system shown in FIG. 8 is configured by adding a vehicle speed sensor M5 and an allowable range calculation unit M6 in addition to the configuration shown in FIG. 1. A damping force controller M4a is obtained by slightly modifying the damping force controller M4 shown in FIG. 1. The vehicle speed sensor M5 measures the vehicle speed. The allowable range calculation unit M6 calculates an allowable range of the sprung resonance component signal which varies in accordance with the vehicle speed. It will be noted that in the first embodiment of the present invention, the allowable ranges defined by the threshold levels SL1 and SL2 are fixed irrespective of the vehicle speed. The damping force controller M4a receives the sprung resonance component signal (damping force data signal) generated and output by the sprung resonance extraction unit M3 and a signal showing the allowable range of the sprung resonance component signal generated and output by the allowable range calculation unit M6, and controls the shock absorber M1 on the basis of the received signals, as will be described in detail below.

The arrangement shown in FIG. 8 is achieved by modifying the procedures shown in FIGS. 7A and 7B, as will be described in detail below. The other structure of the second embodiment of the present invention is the same as that of the first embodiment of the present invention.

Figure 9B:
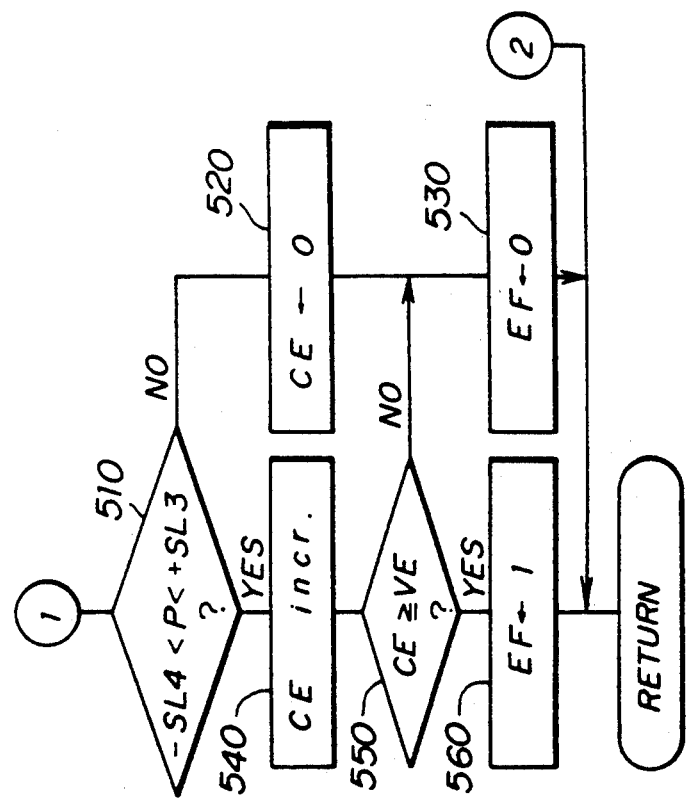

FIGS. 9A and 9B are flowcharts of a long-term vehicle vibration preventing control interrupt procedure (routine) for setting or resetting the control starting flags SFR and SFL as well as the control ending flags EFR and EFL. Although the procedures shown in FIGS. 9A and 9B are separately carried out for the left and right rear wheels 5RL and 5RR, they are illustrated without specifically distinguishing the left and right rear wheels 5RL and 5RR from each other.

Figure 4:
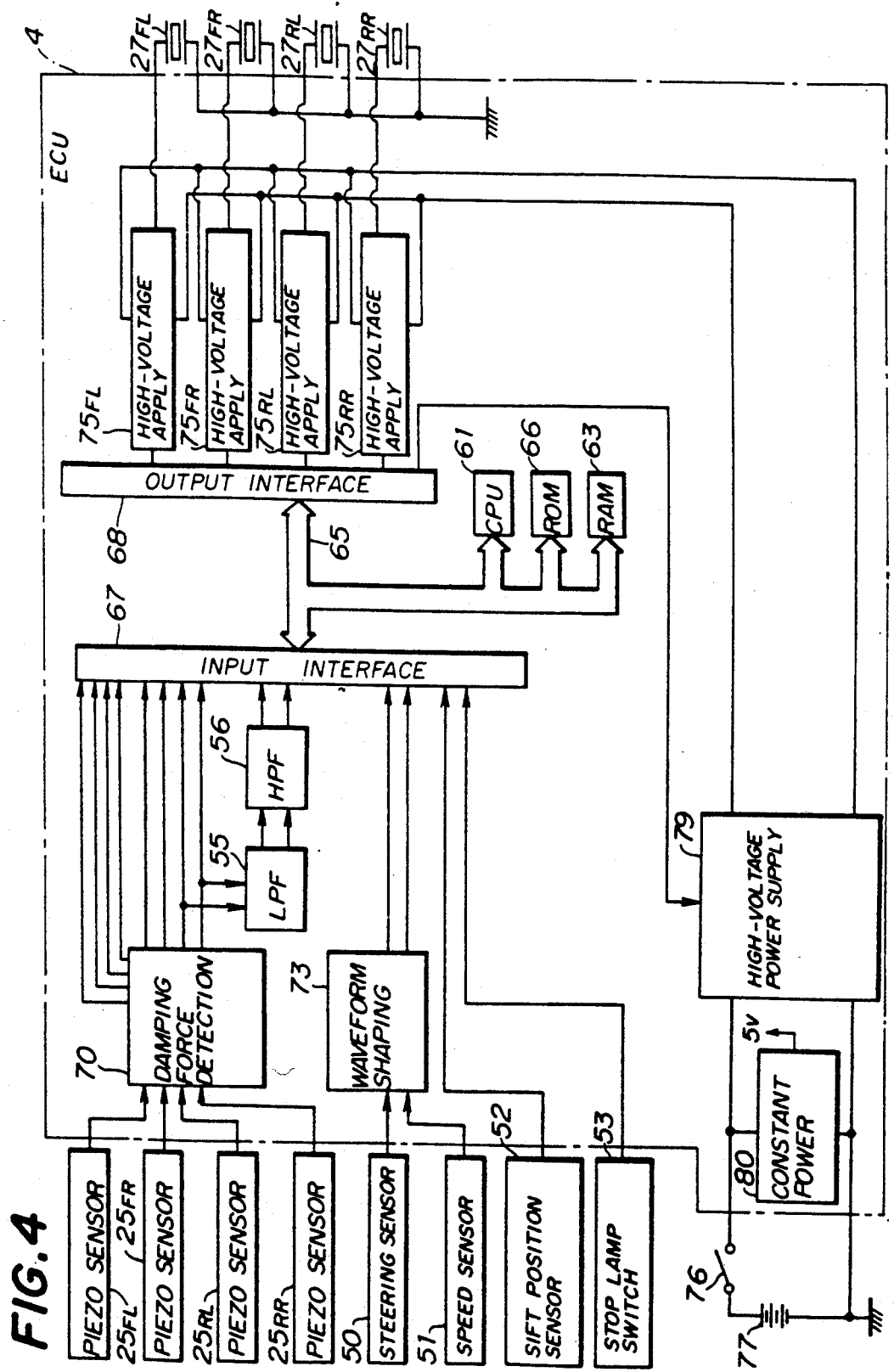
FIG. 4 is a block diagram illustrating a detailed structure of the suspension control system shown in FIG. 2.

The procedure shown in FIG. 9A commences with step 400, at which step the CPU 61 inputs the damping force data signal P (sprung resonance component signal) and a vehicle speed data signal W output by the vehicle speed sensor 51 shown in FIG. 4. At step 410, the CPU 61 judges whether or not the HARD priority alteration flag HF is equal to 1. When the result at step 410 is NO, a procedure is executed which is directed to judging whether or not a control starting condition to start the long-term vehicle vibration preventing control is satisfied. On the other hand, when the result at step 410 is YES (HF=1), the control proceeds to step 510 shown in FIG. 9B. The procedure shown in FIG. 9B judges whether or not a control ending condition to tend the long-term vehicle vibration preventing control is satisfied.

The judgment procedure for judging whether or not the control starting condition is satisfied is carried out in such a way that the damping force data signal P and the vehicle speed data signal W are monitored and that it is concluded that the control starting condition is satisfied when the damping force data signal P becomes out of an allowable range based on the vehicle speed. Then, a control starting flag SF (SFR or SFL) is set to 1.

At the commencement of the procedure for judging the control starting condition, the CPU 61 determines, at step 420, whether the setting of the damping is soft or hard. When it is determined that the setting of the damping force is soft, the control proceeds to step 430. On the other hand, when it is determined that the setting of the damping force is hard, the control proceeds to step 440. At step 430, threshold levels +SL1 and −SL2 are calculated from the vehicle speed data signal W. FIG. 10 is a graph illustrating a waveform of the damping force data signal P (sprung resonance component signal). The threshold levels +SL1 and −SL2 used when the setting of the shock absorber 2 is soft are the functions of the vehicle speed W, and now represented as $f_1(W)$ and $g_1(W)$, respectively. Likewise, the threshold levels +SL1 and −SL2 used when the setting of the shock absorber 2 is hard are the functions of the vehicle speed W, and now represented as $f_2(W)$ and $g_2(W)$, respectively.

Referring to FIG. 11, there is illustrated the relationship between the absolute values of the threshold levels +SL1 and −SL2 and the vehicle speed data W. The absolute values of the threshold levels SL1 and −SL2 decrease with an increase in the vehicle speed W. The absolute value of the threshold level +SL1 related to expansion of the shock absorber 2 is greater than the absolute value of the threshold level −SL2 related to contraction thereof. This is directed to compensating for the fact that the absolute value of the damping force on the expansion side is greater than the absolute value thereof on the contraction side. Further, the absolute values of the threshold levels $f_2(W)$ and $g_2(W)$ are determined so that they are respectively greater than the absolute values of the threshold levels $f_1(W)$ and $g_1(W)$. This is directed to compensating for the fact that the level of the damping force obtained when the setting of the shock absorber is in the high state is higher than that obtained when the setting of the shock absorber is in the low state when the vehicle is running on the same road surface condition.

Turning now to FIG. 9A, at step 450 subsequent to steps 430 and 440, the CPU 61 determines whether or not the damping force data signal P is greater than the threshold level +SL1 or less than the threshold level −SL2. When the damping force data signal P has a level within the allowable range between −SL2 and +SL1 and thus the result at step 450 is NO, it is concluded that there is no sign of the occurrence of a long-term vehicle vibration. Thus, a counter CS for measuring the judgment period ΔTs is cleared at step 460, and the control starting flag SF is reset to zero at step 470. Then, the CPU 61 ends the procedure shown in FIG. 9A.

On the other hand, when the damping force data signal P is out of the allowable range between −SL2 and SL1 and thus the result at step 450 is YES, it is concluded that there is a sign of the occurrence of a long-term vehicle vibration. At step 480, the CPU 61 increments the counter CS, and determines whether or not the count value in the counter CS is equal to or greater than the judgment value VS. When the damping force data signal P is continuously out of the allowable range between −SL2 and +SL1 during the judgment time ΔTs, the result at step 490 becomes YES.

For example, as shown in FIG. 10 where the shock absorber 2 is initially in the soft state, when the damping force (sprung resonance component signal) is continuously in excess of the low threshold level +SL1, the result at step 450 shown in FIG. 9A is continuously YES. Thus, the counter CS is incremented at step 480 without being reset. When this procedure is repeatedly carried out, the count value in the counter CS becomes equal to the judgment value VS. As a result, at time $t_2$, the judgment period ΔTs from time $t_1$ elapses.

When the result at step 490 is YES, the CPU 61 sets the control starting flag SF to 1 at step 500. Then, the CPU 61 ends the procedure shown in FIG. 9A. On the other hand, when the result at step 490 is NO, the CPU 61 resets the control starting flag SF to zero at step 470. Then, the CPU 61 ends the procedure shown in FIG. 9A.

When the control starting flag SF is set to 1 at step 500, the HARD priority alteration flag HF is set to 1 at step 130 shown in FIG. 6. Thus, all the four shock absorbers 2 are set to the hard state at step 140.

The following long-term vehicle vibration control is realized by the procedure for judging the control starting condition. The allowable range between −SL2 and +SL1 decreases with an increase in the vehicle speed W. Thus, a small long-term vehicle vibration which is not needed to be suppressed when the vehicle is running at a low speed will be detected when the vehicle is running at a high speed. Such a small long-term vehicle vibration is prevented by the long-term vehicle vibration control. In other words, the allowable range between −SL2 and +SL1 which is set when the vehicle is running at a low speed is wider than that which is set when the vehicle is running at a high speed. Thus, the long-term vehicle vibration preventing control is not carried out for a small long-term vehicle vibration when the vehicle is running at a low speed.

The procedure for judging the control ending condition will now be explained with reference to FIG. 9B. This procedure is directed to setting the controlled ending flag EF provided for each of the rear wheels to 1 when a condition showing that there is no possibility that a long-term vehicle vibration occurs even if the control is terminated. Step 510 shown in FIG. 9B is substituted for step 270 shown in FIG. 7B. The remaining steps 520-560 shown in FIG. 9B are the same as those shown in FIG. 7B.

At step 510, the CPU 61 judges whether or not the damping force data signal P has a level within a range between −SL4 and +SL3 as shown in FIG. 10. When the level of the damping force data signal P is out of the range between −SL4 and +SL3 and thus the result at step 510 is NO, it is concluded that a long-term vehicle vibration will take place if the long-term vehicle vibration preventing control is terminated. Thus, the counter CE is reset to zero at step 520, and the control ending flag EF is reset to zero at step 530. Then, the CPU 61 ends the procedure shown in FIG. 9B.

On the other hand, when the level of the damping force data signal P is within the range between −SL4 and +SL3 and thus the result at step 510 is YES, the counter CE for measuring the judgment period ΔTe is incremented at step 540. At step 550, it is determined whether or not CE ≧ VE. When the result at step 550 is YES, the control ending condition is set to 1 at step 560, and then the CPU 61 ends the procedure. On the other hand, when the result at step 550 is NO, the control ending flag EF is reset to zero at step 530, and the CPU 61 ends the procedure.

For example, as shown in FIG. 10, it is continuously determined that the damping force data signal P is within the range between −SL4 and +SL3 after time $t_3$. Thus, the counter CE is continuously incremented and gets out of the range at time $t_4$. Thus, the counter CE is reset to zero at step 520 before it has been increased to VE. In such a case, it is concluded that there is a possibility that a long-term vehicle vibration will occur if the control is ended. Thus, the end flag EF is reset to zero at step 530 and the damping control routine shown in FIG. 6 continues to execute the long-term vehicle vibration preventing control at step 140.

On the other hand, the procedure which is repeatedly carried out after time $t_5$ increases the counter CE, the count value of which becomes equal to the judgment value VE because the damping force data signal P is continuously within the range between −SL4 and +SL3. Thus, at time $t_6$ when the counter value in the counter CER has been increased to the judgment value VE, step 550 determines that the count value in the counter CE is equal to or greater than the judgment value VE. It is thus concluded that there is no possibility that long-term vehicle vibrations even if the long-term vehicle vibration preventing control is ended. Thus, the CPU 61 sets the control ending flag EF at step 560.

In the above-mentioned way, the long-term vehicle vibration preventing control is carried out on the basis of the damping force data signals P related to the rear wheels 5RL and 5RR. When the control ending flag EFL related to the left rear wheel 5RL is set to 1, the HARD priority alteration flag HF is reset to zero at step 100 of the damping force control procedure shown in FIG. 6. Then, at step 110 (FIG. 6), the normal damping force control is carried out on the basis of the road surface condition. If the road surface is rough, the shock absorbers 2 are individually altered to the soft state and, on the other hand, if the road surface is flat, the shock absorbers 2 are individually altered to the hard state. In the case shown in FIG. 10, when the judgment period ΔTe elapses at time $t_6$, the shock absorbers 2 are altered to the soft state.

According to the second preferred embodiment of the present invention, the following advantages are obtained in addition to the advantages presented by the first embodiment of the present invention. The, allowable range between −SL2 and +SL1 becomes narrow with an increase in the vehicle speed W. Thus, the occurrence of a small long-term vehicle vibration is prevented when the vehicle is running at a high speed, although it is not controlled when the vehicle is running at a low speed. As a result, it is also possible to prevent the suspensions from being unnecessarily altered to the hard state.

The threshold levels +SLI and −SL2 as the functions of the vehicle speed W are separately provided for the different settings of damping force (hard and soft). Thus, it is possible to compensate for the level differences of the damping force data signals.

Several variations of the second embodiment of the present invention may be made. For example, the relationship between the absolute value of each of the threshold levels +SLI and −SL2 and the vehicle speed W may be non-linear. Such a relationship can be determined by experiments, for example. It is also possible to change the judgment period ΔTs in accordance with the vehicle speed W. For example, the judgment period ΔTs is reduced as the vehicle speed W increases. It is also possible to make the range between −SL4 and +SL3 narrow as the vehicle speed W increases. It is also possible to lengthen the judgment period ΔTe as the vehicle speed W increases. With these arrangements, it becomes possible to carry out the long-term vehicle vibration preventing control which is based on the vehicle speed W. It is also possible to select the absolute values of the threshold levels +SL3 and −SL4 so as to be equal to the threshold levels +SLI and −SL2, respectively.

A description will now be given of a suspension control system according to a third preferred embodiment of the present invention. Referring to FIG. 12, there is illustrated the principle of the suspension control system according to the third embodiment of the present invention. In FIG. 12, those parts which are the same as those shown in FIG. 1 are given the same reference numerals. The suspension control system shown in FIG. 12 is configured by adding an unsprung resonance component extraction unit M7 in addition to the structure shown in FIG. 1. The unsprung resonance component extraction unit M7 extracts only frequency components around an unsprung resonance frequency from the damping force detection signal output by the damping force detector M2. Hereafter, the frequency components extracted by the unsprung resonance component extraction unit M7 is referred to as an unsprung resonance component signal. The unsprung resonance component signal shows a change of the damping force of the shock absorber M1 which results from a change of the vehicle height around the unsprung resonance frequency. Thus, it is possible to detect a sign of the occurrence of a long-term vehicle vibration around the unsprung resonance frequency.

A damping force controller M4b is obtained by modifying the damping force controller M4 shown in FIG. 4 as follows. The damping force controller M4b controls the shock absorber M1 so that the setting of the shock absorber M1 is altered to the hard state when the sprung resonance component signal generated and output by the sprung resonance component extraction unit M3 is out of a predetermined allowable range of the sprung resonance component signal and the unsprung component signal falls in a predetermined allowable range of the unsprung resonance component signal. Thus, it becomes possible to prevent the occurrence of long-term vehicle vibrations. On the other hand, even if the sprung resonance component signal is out of the predetermined allowable range, when the unsprung resonance component signal is out of the predetermined allowable range, the shock absorber M1 is not set to the hard state. If, in this case, the suspension is altered to the hard state, the vehicle will vibrate. In the above-mentioned way, the long-term vehicle vibration preventing control is carried out on the basis of not only the sprung resonance component signal but also the unsprung resonance component signal. Thus, the occurrence of long-term vehicle vibrations is more definitely prevented.

Figure 13:
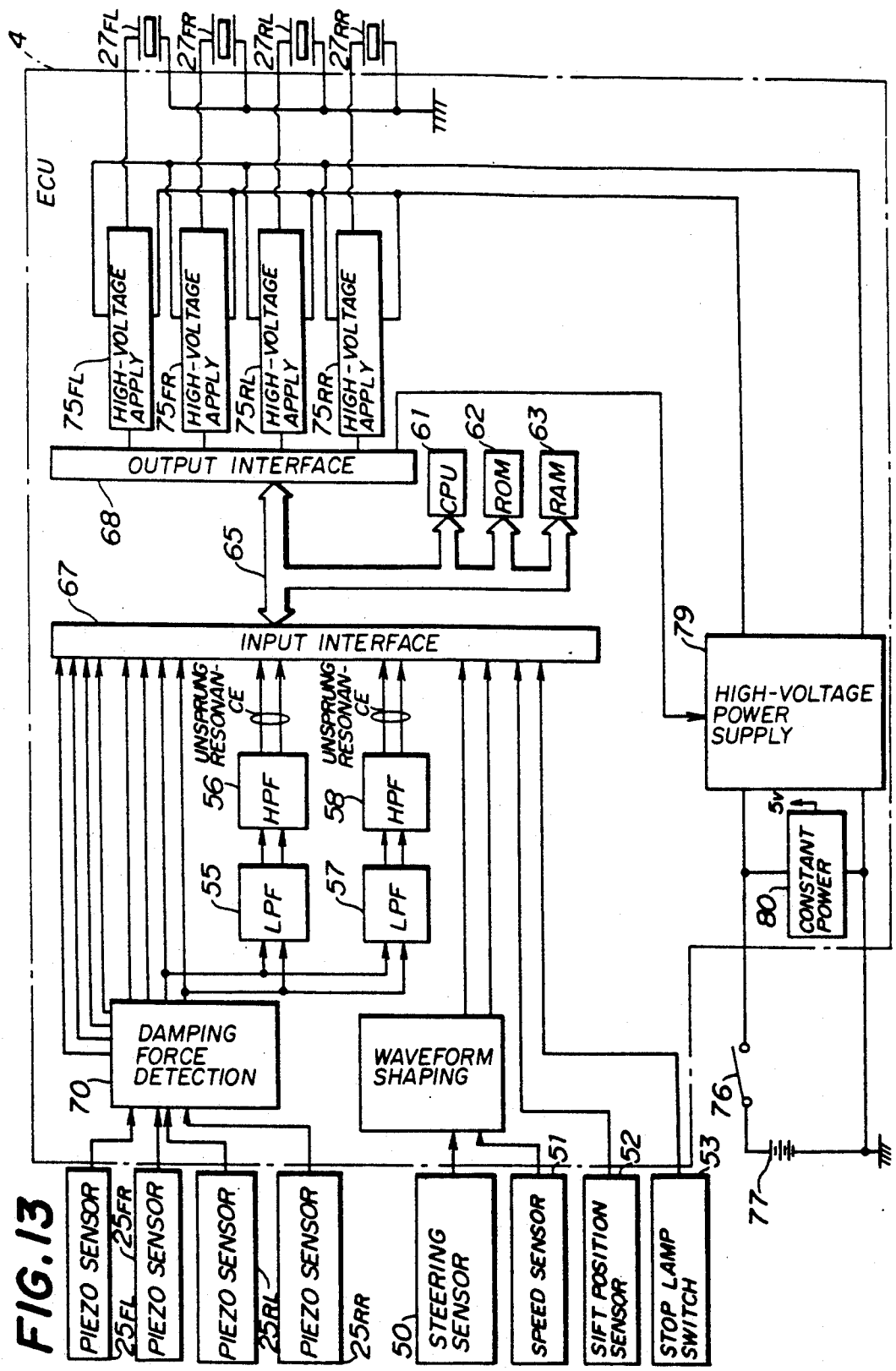
FIG. 13 is a block diagram illustrating a more detailed structure of the suspension control system shown in FIG. 12.

FIG. 13 is a block diagram illustrating a more detailed electronic configuration of the suspension control system shown in FIG. 12. In FIG. 13, those parts which are the same as those shown in FIG. 4 are given the same reference numerals. The configuration shown in FIG. 13 is obtained by adding a lowpass filter 57 and a highpass filter 58 to the configuration shown in FIG. 4. The lowpass filter 57 is designed to pass components having frequencies equal to or lower than about 15 [Hz]. The highpass filter 58 is designed to pass components having frequencies equal to or higher than about 10 [Hz]. The damping force detection signals related to the shock absorbers 2RL and 2RR provided for the left and right rear wheels 5RL and 5RR are input to the lowpass filter 57. The highpass filter 58 outputs components having frequencies between 10 [Hz] and 15 [Hz] of the damping force detection signal related to the shock absorber 2RL and components having frequencies between 10 [Hz] and 15 [Hz] of the damping force detection signal related to the shock absorber 2RR. These components are sent, as the unsprung resonance component signals, to the CPU 61 through the input interface circuit 67.

The CPU 61 makes a decision on the road surface condition and the vehicle running status on the basis of the damping force change rate signals, the damping force detection signals, the sprung resonance component signals, the unsprung resonance component signals, and the detection signals output from the steering sensor 50, the vehicle speed sensor 51, the shift position sensor 52 and the stop lamp switch 53. It will be noted that all of the above signals are not needed to detect the road surface condition and the vehicle running status, but some of them may be selectively used. The CPU 61 outputs control signals from the above-mentioned signals to the high-voltage application circuits 58 so that the damping forces of the shock absorbers 2 are controlled.

The long-term vehicle vibration preventing control is realized by executing a damping force control procedure (routine) which is the same as that shown in FIG. 6 and a long-term vehicle vibration preventing control interrupt procedure (sub-routine), which will be described below with reference to FIGS. 14A and 14B. The procedures shown in FIGS. 14A and 14B are carried out separately for the shock absorbers 2RL and 2RR.

Figure 14A:
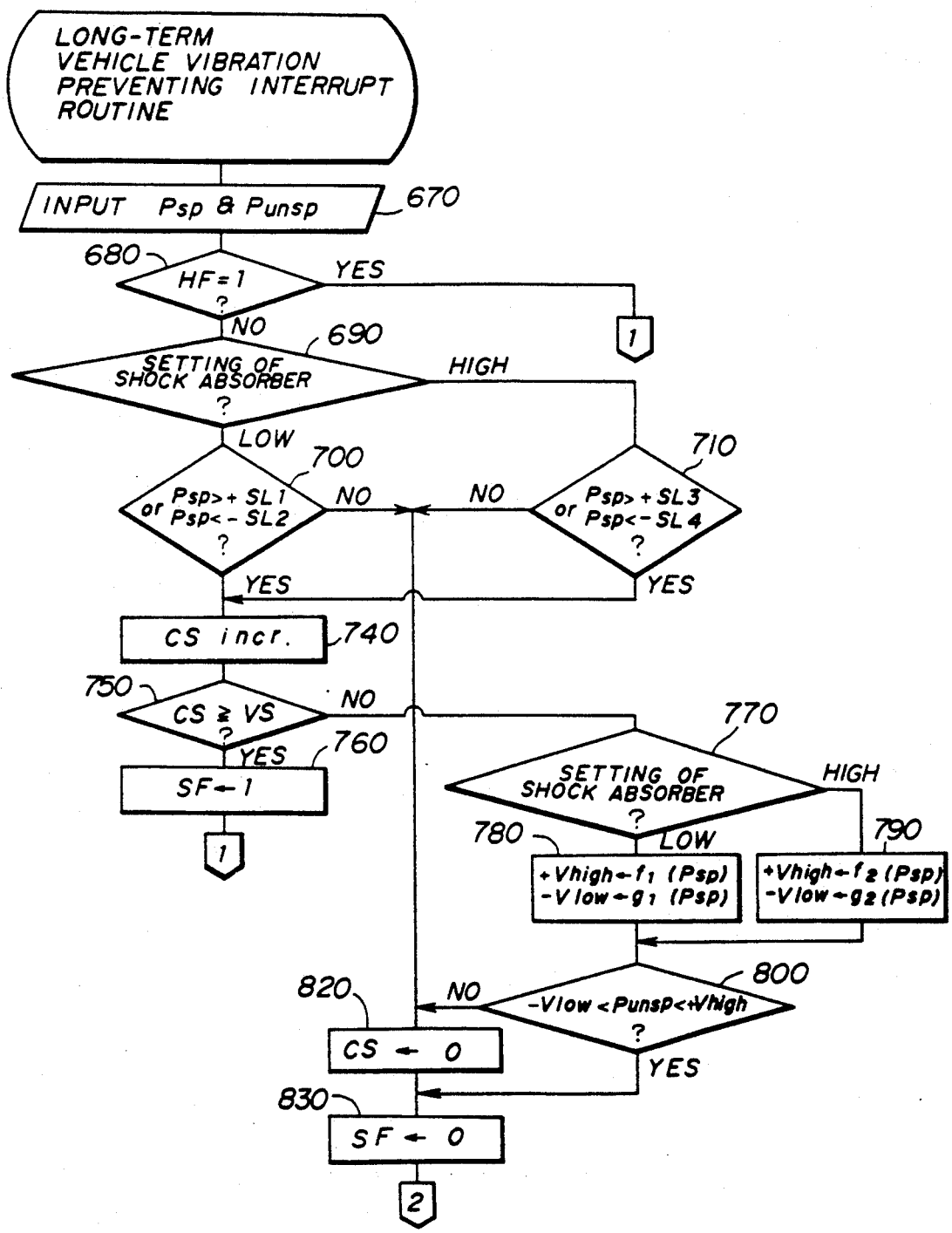
FIGS. 14A and 14B are flowcharts illustrating the operation of the suspension control system shown in FIGS. 12 and 13.
Figure 14B:
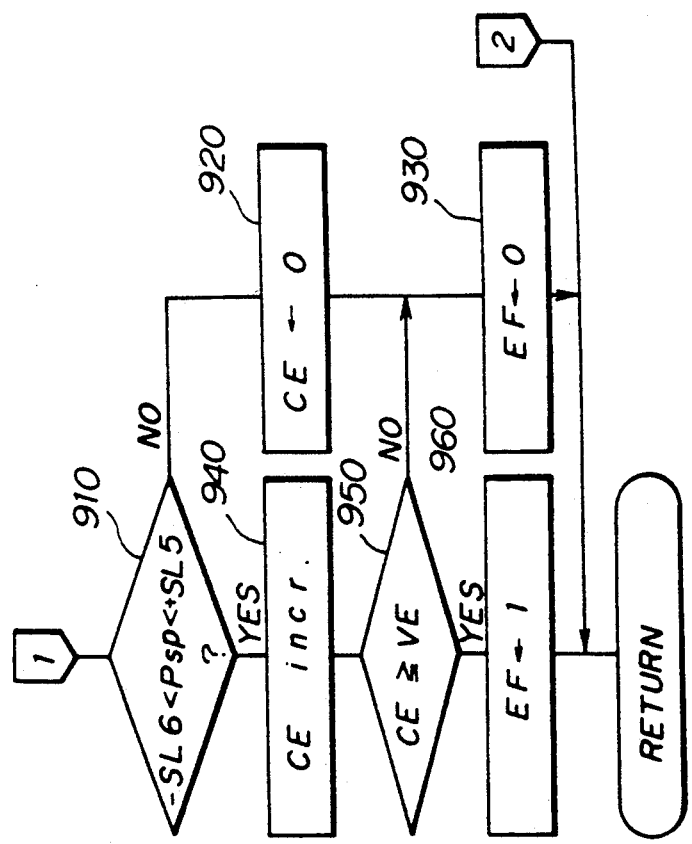

The procedure shown in FIG. 14A commences with step 670, at which step the CPU 61 shown in FIG. 13 inputs a damping force data signal Psp corresponding to the sprung resonance component signal and a damping force data signal Punsp corresponding to the unsprung resonance component signal. At step 680, the CPU 61 determines whether or not HF=1. When the result at step 680 is NO, the CPU 61 executes a procedure which starts from step 690 and which judges a control starting condition to start a long-term vehicle vibration preventing control. On the other hand, when the result at step 680 is YES, the CPU 61 executes a procedure which starts from step 910 (FIG. 14B) and which judges a control ending condition to end the long-term vehicle vibration preventing control.

Figure 15:
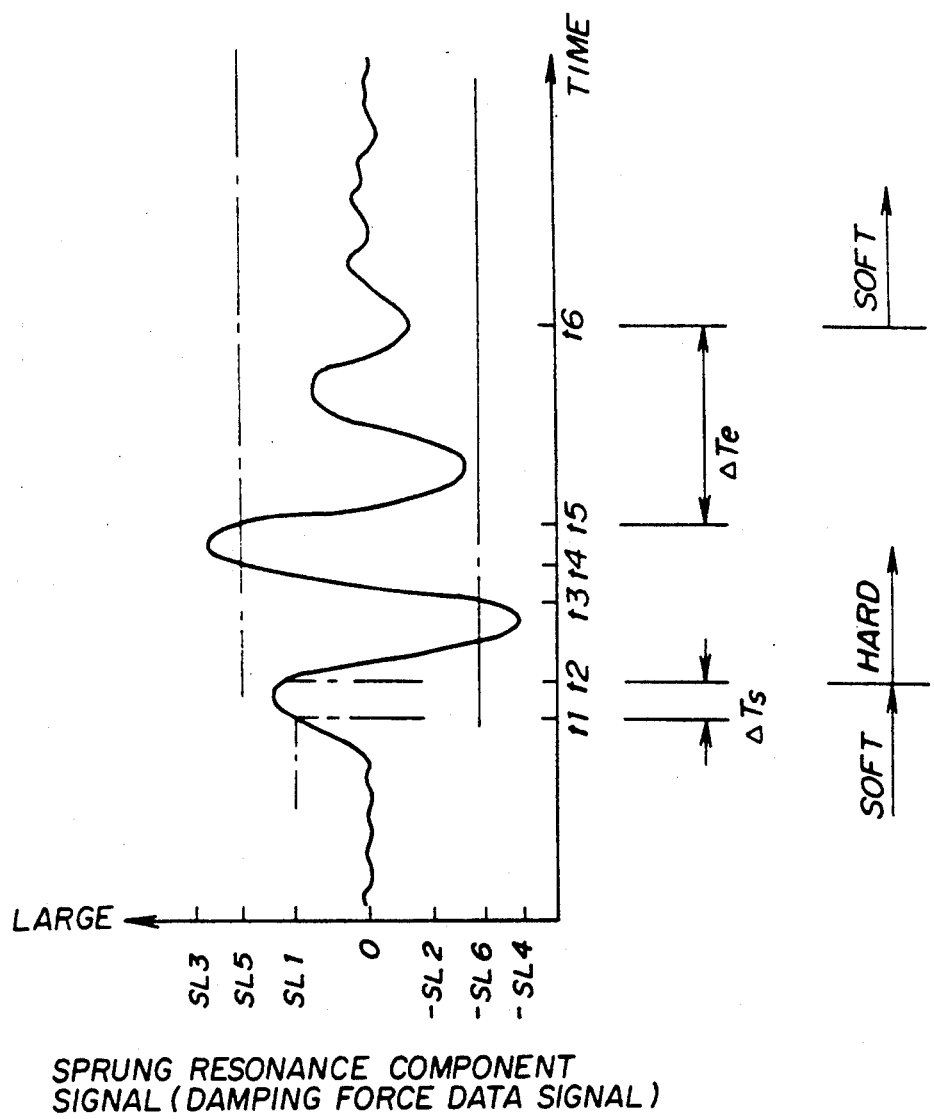
FIG. 15 is a graph illustrating how to control the suspension according to the third embodiment of the present invention.

At the commencement of the procedure for judging the control starting condition, the CPU 61 determines, at step 690, whether or not the setting of the corresponding shock absorber 2 is soft or hard. When it is determined that the setting of the shock absorber 2 is soft, the CPU 61 discerns, at step 700, whether or not Psp $> +SL1$ or whether or not Psp $< -SL2$ where $+SL1$ and $-SL2$ are threshold levels provided for a low-level side damping force. FIG. 15 illustrates the relationship between the sprung resonance component signal Psp and time. When the sprung resonance component signal Psp is within an allowable range between $-SL2$ and $+SL1$, the result at step 700 is NO.

On the other hand, when it is determined, at step 690, that the setting of the shock absorber 2 is hard, the CPU 61 determines whether or not Psp $> +SL3$ or whether or not Psp $< -SL4$ where $+SL3$ and $-SL4$ are threshold levels provided a high-level side damping force. When the sprung resonance component signal Psp is within an allowable range between $-SL4$ and $+SL3$, the result at step 710 is NO.

As shown in FIG. 15, the threshold level $+SL3$ for the high-level side damping force is greater than the threshold level $+SL1$ for the low-level side damping force, and the threshold level $-SL4$ for the high-level side damping force is smaller than the threshold level $-SL2$ for the low-level side damping force. The absolute values of the positive threshold levels $+SL1$ and $+SL3$ are greater than the absolute values of the negative threshold levels $-SL2$ and $-SL4$, respectively. This compensates for the fact that the damping force of the shock absorber 2 has different levels due to differences in the setting of the damping force patterns of the shock absorbers 2 and/or differences in movement on the contraction and expansion sides of the shock absorbers 2 even if the vehicle is running on the same road surface.

When the result at step 700 or step 710 is NO, the CPU 61 executes step 820, at which step the counter CS for measuring the judgment period ΔTs is cleared. At subsequent step 830, the CPU 61 resets the control starting flag SF to zero and ends the procedure.

On the other hand, when the result at step 700 or step 710 is YES, the CPU 61 executes step 740, at which step the CPU 61 concludes that there is a sign of the occurrence of a long-term vehicle vibration and increments the counter CS at step 740. At subsequent step 750, the CPU 61 judges whether or not the count value in the counter CS is equal to or greater than the judgment value VS.

When the count value in the counter CS has not yet been increased to the judgment value VS and thus the result at step 750 is NO, the CPU 61 executes a procedure which starts from step 770 and judges whether or not the unsprung resonance component signal Punsp is within a predetermined allowable range. At step 770, the CPU 61 judges whether or not the setting of the damping force of the corresponding shock absorber 2 is sort or hard. When it is determined that the setting of the shock absorber 2 is soft, the CPU 61 executes step 780, at which step the CPU 61 calculates an upper limit level +Vhigh and a lower limit level −Vlow defined for the unsprung resonance component signal. The upper limit level +Vhigh and the lower limit level −Vlow defined for the unsprung resonance component signal are functions of the sprung resonance component signal Psp, $f_1(Psp)$ and $g_1(Psp)$, respectively. On the other hand, when it is determined that the setting of the shock absorber 2 is hard, the CPU 61 calculates the upper limit level +Vhigh and the lower limit level −Vlow, both of which are also functions of the sprung resonance component signal Psp, $f_2(Psp)$ and $g_2(Psp)$, respectively.

The upper limit level +Vhigh and the lower limit level −Vlow define a range of the unsprung resonance component signal, in which even when the long-term vehicle vibration preventing control directing to setting the shock absorber 2 to the hard state is executed, no vibration of the vehicle will occur and riding comfort will not be deteriorated.

Figure 16A:
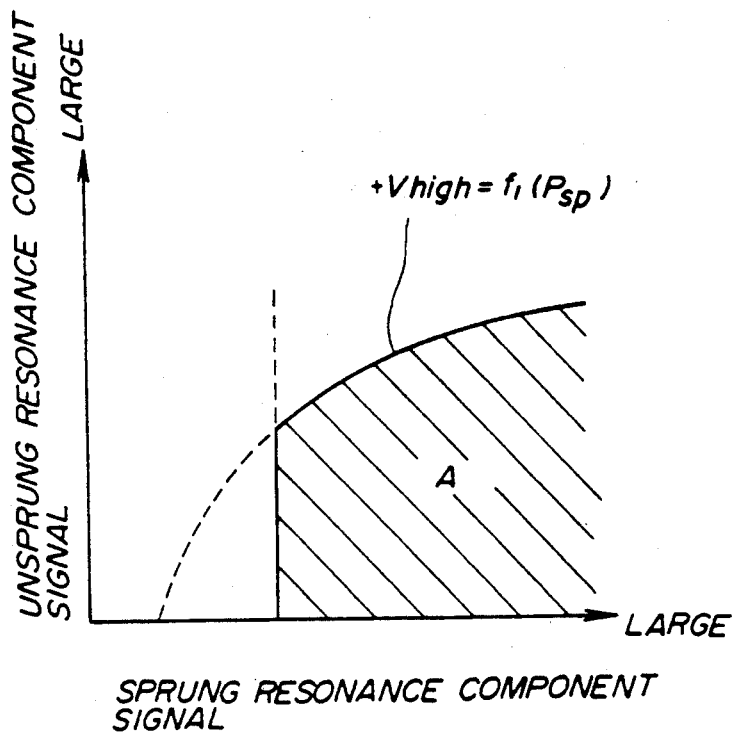
FIGS. 16A and 16B are graphs illustrating the relationship between a sprung resonance component signal and an unsprung resonance component signal.

FIG. 16A is a graph illustrating the relationship between the unsprung resonance component signal and the sprung resonance component signal which is obtained when the setting of the shock absorber 2 is soft. As shown in FIG. 16A, the threshold level +Vhigh defined for the unsprung resonance component signal is the function of the sprung resonance component signal, $f_1(Psp)$. The level of the function $f_1(Psp)$ increases with an increase of the sprung resonance component signal Psp. When the unsprung resonance component signal Punsp is within hatched area A shown in FIG. 16A, riding comfort will not be deteriorated even when the long-term vehicle vibration preventing control is executed.

Figure 16B:
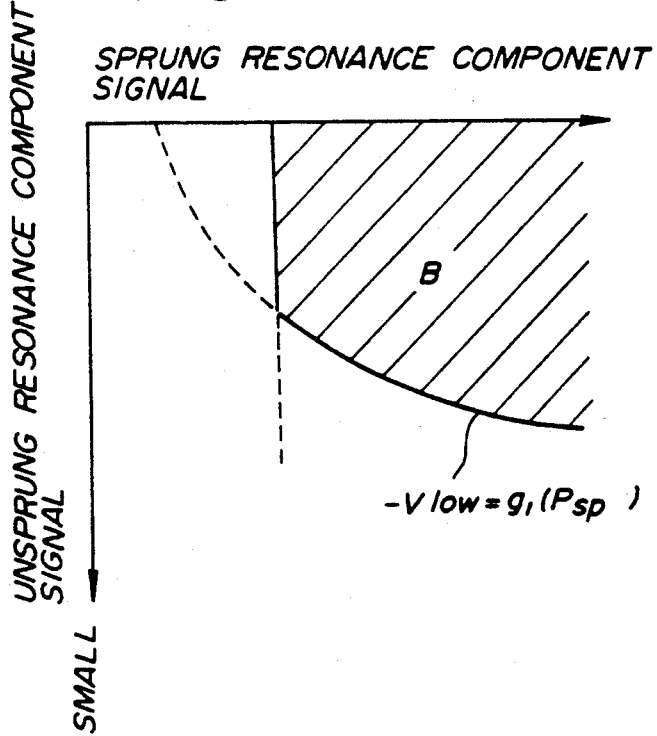

As shown in FIG. 16B, the negative threshold level −Vlow decreases with an increase of the sprung resonance component signal Psp. When the unsprung resonance component signal Punsp is within hatched area B shown in FIG. 16B, riding comfort will not be deteriorated even when the long-term vehicle vibration preventing control is executed. The threshold levels $f_2(Psp)$ and $g_2(Psp)$ are defined in a similar way as the threshold levels $f_1(Psp)$ and $g_1(Psp)$. The absolute values of the threshold levels $f_1(Psp)$ and $g_1(Psp)$ are smaller than the threshold levels $f_2(Psp)$ and $g_2(Psp)$, respectively.

Turning now to FIG. 14A, at step 800, the CPU 61 judges whether or not −Vlow < Punsp < +Vhigh, that is, the unsprung resonance component signal Punsp is within the range between −Vlow and +Vhigh. When it is determined that the unsprung resonance component signal is out of the range between −Vlow and +Vhigh and thus the result at step 800 is NO, it is concluded that the riding comfort will be deteriorated when the long-term vehicle vibration preventing control is executed. In this case, the CPU 61 clears the counter CS at step 820 and resets the control starting flag SF to zero at step 830. On the other hand, when it is determined that the unsprung resonance component signal is within the range between −Vlow and +Vhigh and thus the result at step 800 is YES, only step 830 is executed. In this case, the count value in the counter CS is maintained. In the above-mentioned manner, when the result at step 700 or step 710 is YES and the result at step 800 is NO, the counter CS is incremented at step 820 toward the judgment value VS.

When the count value in the counter CS has become equal to or greater than the judgment value VS at step 750, the CPU 61 concludes that the control starting condition is satisfied and sets the control starting flag SF to 1 at step 760. In this case, the sprung resonance component signal Psp is continuously out of the allowable range defined at step 700 or 710 during the judgment period ΔTs and the unsprung resonance component signal Punsp is continuously within the allowable range between −Vlow and +Vhigh. The judgment period ΔTs is extremely shorter than the period of the unsprung resonance component frequency (which is approximately equal to one second) and much greater than half the period of the unsprung resonance component frequency (which is approximately equal to 0.5 second).

When the control starting flag SF is set to 1 in the above-mentioned way, the HARD priority alteration flag HF is set to 1 at step 130 shown in FIG. 6, so that all the four shock absorbers 2 are set to the hard state at step 140. Since the judgment period ΔTs is longer than half the period of the unsprung resonance component signal Punsp, as described previously, it is confirmed that the amplitude of the unsprung resonance component signal Punsp becomes much small when the judgment period ΔTs expires. Thus, even if the long-term vehicle vibration preventing control is executed, no vehicle vibration will occur.

When the result at step 800 is NO, it is considered that the unsprung resonance signal Punsp is large and a long-term vehicle vibration will take place. This will occur when the vehicle is running on a so-called composite road surface where there is a small roughness on a gentle rise and fall road surface. In such a situation, the count value in the counter CS will not reach the judgment period ΔTs. Thus, the control starting flag SF is not set to 1 and the long-term vehicle vibration preventing control is not performed. If necessary, the setting of each shock absorber 2 will be altered to the soft state at step 110 shown in FIG. 6, so that an improved riding comfort is obtained.

A description will further be given of the start condition judging procedure with reference to FIG. 15. Initially, the damping force of the shock absorber 2 is set to the low level so that the shock absorber 2 is maintained in the soft state. The damping force data signal (sprung resonance component signal) Psp is continuously in excess of the threshold level SL1. Thus, each time the procedure shown in FIGS. 14A and 14B is repeatedly carried out, it is continuously determined that the sprung resonance component signal Psp is greater than the threshold level SL1. In this case, if the unsprung resonance component signal is within the allowable range between $-$Vlow and $+$Vhigh, the counter CS is incremented without being reset. On the other hand, if the unsprung resonance component signal Punsp is out of the allowable range between -Vlow and Vhigh, the counter CS is cleared. Even if the counter CS is cleared, the counter CS is incremented again when the unsprung resonance component signal Punsp is within the allowable range between $-$Vlow and $+$Vhigh and the sprung resonance component signal Psp is greater than the threshold level SL1.

When the counting of the judgment period $\Delta$Ts is completed, the long-term vehicle vibration preventing control is executed because the riding comfort will not be deteriorated even when the control is performed.

The procedure shown in FIG. 14B is the same as shown in FIG. 7B or FIG. 9B except that step 910 is substituted for step 270 or 510. At step 910, the CPU 61 determines whether or not $-$SL6 $<$Psp $<$ $+$SL5. That is, it is determined that the amplitude of the sprung resonance component signal Psp is within a range between $-$SL6 and $+$SL5. The threshold levels $+$SL5 and $-$SL6 are illustrated in FIG. 15. The threshold level $+$SL5 is between $+$SLI and $+$SL3, and the threshold level -SL6 is between -SL4 and $-$SL2. When the level of the sprung resonance component signal Psp is within the range between $-$SL6 and $+$SL3, the control proceeds to step 940. On the other hand, when the result at step 910 is NO, the control proceeds to step 920.

Referring to FIG. 15, the sprung resonance component signal Psp is within the range between $-$SL6 and $+$SL5 after time $t_3$ or $t_5$, the counter $\Delta$Te provided for measuring the aforementioned judgment period $\Delta$Te is incremented at step 800, and it is determined, at step 910, whether or not the measurement of the judgment period $\Delta$Te is completed. Each time it is determined, at step 910, that the sprung resonance component signal Psp is within the range between $-$SL6 and $+$SL5, the counter CE is continuously incremented at step 940 and increases toward the judgment value VE. For example, as shown in FIG. 15, the counter CE is continuously increased by the process after time $t_3$ because the sprung resonance component signal Psp is within the range between $-$SL6 and $+$SL5. However, the sprung resonance component signal Psp becomes out of the range at time $t_4$. At this time, the counter CE is reset at step 930 before it reaches the judgment value VE. In this case, it is concluded that a long-term vehicle vibration will occur if the long-term vehicle vibration preventing control is stopped, and the control ending flag EF is reset to zero at step 930. The damping force control routine shown in FIG. 6 continuously executes the step 140.

On the other hand, during the procedure which is executed after time $t_5$, the sprung resonance component signal Psp is within the range between $-$SL6 and $+$SL5, and the counter CE has become equal to the judgment value VE at time $t_6$. At time $t_6$, it is determined that Ce $\geq$VE at step 950 and thus the control ending flag EF is set to 1 at step 960.

When the control ending flags EF in the procedures related to the shock absorbers 5RL and 5RR are both set to 1, the HARD priority alteration flag HF is reset to zero at step 160 of the damping force control procedure shown in FIG. 6. Then, at step 110, the normal damping force control is carried out on the basis of the road surface condition. If the road surface is rough, each shock absorber 2 is individually altered to the soft state and, on the other hand, if the road surface is flat, each shock absorber 2 is individually is altered to the hard state. In the case shown in FIG. 15, when the judgment period $\Delta$Te elapses at time $t_6$, each shock absorber 2 is altered to the soft state. As has been described previously, the judgment period $\Delta$Te is set to be longer the period of the sprung resonance component signal Psp.

According to the above-mentioned third preferred embodiment of the present invention, the following advantages are presented. The suspensions 2 are set to the hard state when the sprung resonance component signal Psp is out of the corresponding allowable range and when the unsprung resonance component signal Punsp is within the corresponding allowable range. As a result, it becomes possible to appropriately prevent the occurrence of long-term vehicle vibrations. For example, when the vehicle is running on the aforementioned composite road surface, the suspensions are allowed to be altered to the hard state, so that the occurrence of vehicle vibrations due to the presence of a small roughness on a smooth rise and fall road can be prevented.

Since the upper limit level $+$Vhigh and the lower limit level $-$Vlow for the unsprung resonance component signal Punsp are changed in accordance with the level of the sprung resonance component signal Psp, the judgment of determining whether or not the control should be carried out is performed, taking into account the balance between the magnitude of a predicted long-term vehicle vibration and a vehicle vibration about the unsprung resonance component frequency. As a result, optimum riding comfort can be obtained. In addition, a set of $+$Vhigh and $-$Vlow is individually provided for each of the high-level setting and the low-level setting of the damping force of the shock absorber 2. Thus, a precise judgment can be realized.

The functions $f_1$(Psp) and $g_1$(Psp) are not limited to those shown in FIGS. 16A and 16B. For example, the functions $f_1$(Psp) and $g_1$(Psp) change linearly. It is also possible to determine plural discrete areas defined by the unsprung and sprung resonance components signals Punsp and Psp. The above holds true for the functions $f_2$(Psp) and $g_2$(Psp). The functions $f_1$(Psp), $g_1$(Psp), $f_2$(Psp) and $g_2$(Psp) may be determined by, for example, a sensory inspection. The control ending condition is not limited to the specifically described condition. For example, it is possible to end the long-term vehicle vibration preventing control without waiting for the elapse of the judgment period $\Delta$Te when the unsprung resonance component signal becomes greater than a predetermined threshold level. The relationship among the threshold levels SLl, $-$SL2, SL3, $-$SL4, SL5 and $-$SL6 are limited to the relationship shown in FIG. 15. For example, a specific vehicle vibration characteristic will require a condition where SL5 and −SL6 are equal to SL3 and −SL4, respectively.

Figure 17:
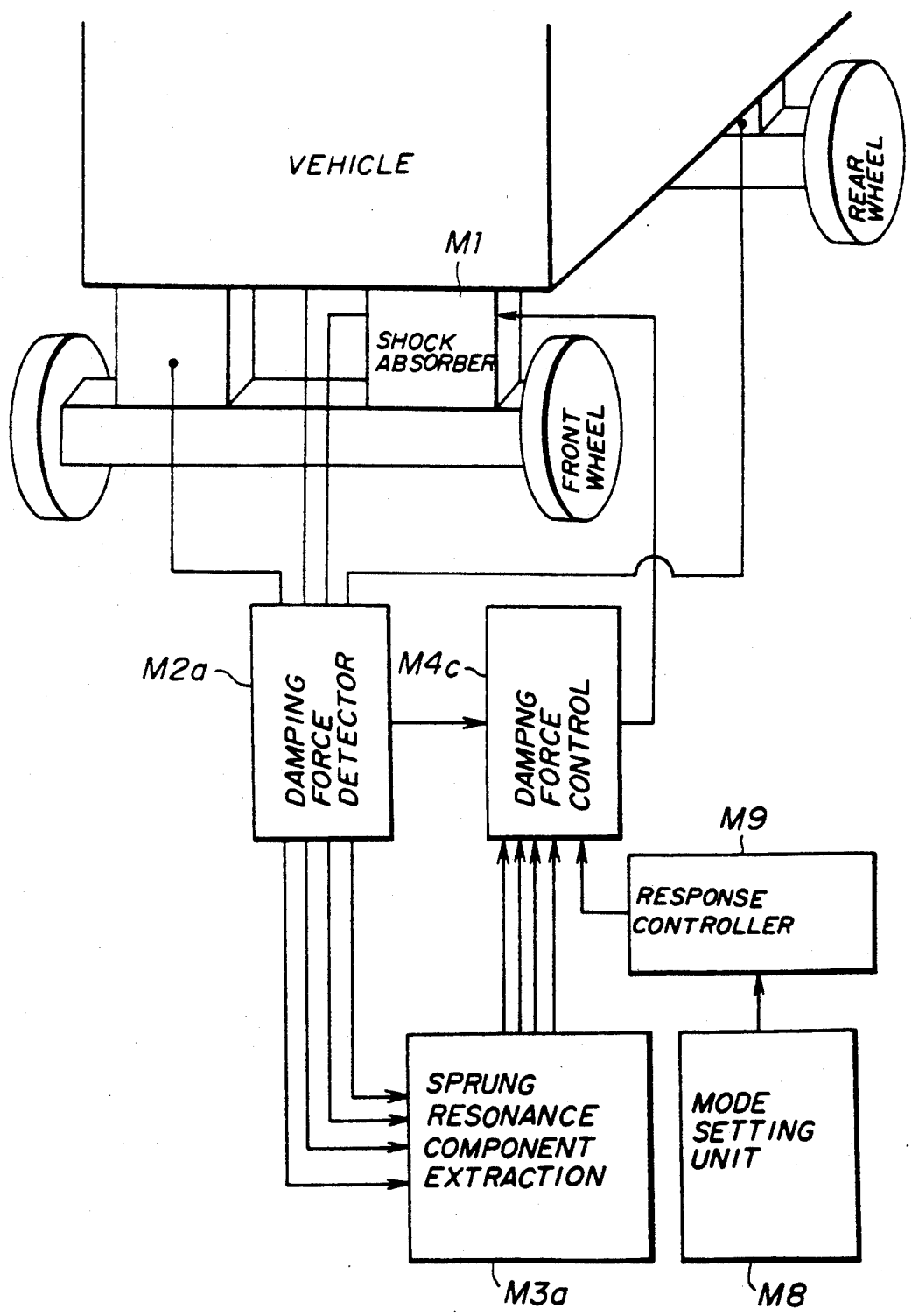
FIG. 17 is a block diagram illustrating the principle of a suspension control system according to a fourth embodiment of the present invention.

A description will now be given of a suspension control system according to a fourth preferred embodiment of the present invention. Referring to FIG. 17, there is illustrated the suspension control system according to the fourth preferred embodiment of the present invention. The suspension control system shown in FIG. 17 is composed of a damping force detector M2a, a sprung resonance component extraction unit M3a, a damping force controller M4c, a mode setting unit M8 and a response controller M9.

The damping force detector M2a respectively detect changes of the damping forces of the four shock absorbers M1 separately and outputs damping force detection signals which reflect changes of the damping forces of the shock absorbers M1. The sprung response component extraction unit M3a extracts only frequency components around the sprung resonance frequency from each of the damping force detection signals. The sprung resonance component signals related to the four shock absorbers M1 are sent to the damping force controller M4c. A mode setting unit M8 is manipulated by the driver and switches the setting (mode) of the damping characteristics of the shock absorbers M1. For example, each shock absorber M1 has two modes of first and second modes. In the first mode, each shock absorber M1 is set to the hard state. In the second mode, each shock absorber M1 is set to the soft state. The response controller M9 controls the damping force controller M4c in accordance with the damping characteristic of the shock absorbers M1 set by the mode setting unit M8 so that the response characteristic of a long-term vehicle vibration preventing control is changed. For example, the control starting or ending timing of the long-term vehicle vibration preventing control is changed in accordance with the mode setting by the mode setting unit M8. More specifically, there are four typical procedures. First, the allowable range defined by the threshold levels SL1 or SL3 as described before is changed in accordance with the mode setting by the mode setting unit M8. When the allowable range becomes wider, the response characteristic of the control decreases. Second, the selection of the sprung resonance signal used for judging the control starting condition is changed. The response speed obtained when the sprung resonance signal related to one of the rear wheels is used is designed to be less than that obtained when the sprung response signal related to one of the front wheels. Third, the aforementioned judgment period ΔTs is varied in accordance with the mode setting by the mode setting unit M8. As the judgment period ΔTs is lengthened, the response speed decreases. Fourth, the aforementioned judgment period ΔTe is varied in accordance with the mode setting by the mode setting unit M8. As the judgment period ΔTe is lengthened, the response speed decreases. According to the fourth preferred embodiment of the present invention, it becomes possible to perform the long-term vehicle vibration preventing control suitable for the suspension characteristic set by the driver.

Figure 18:
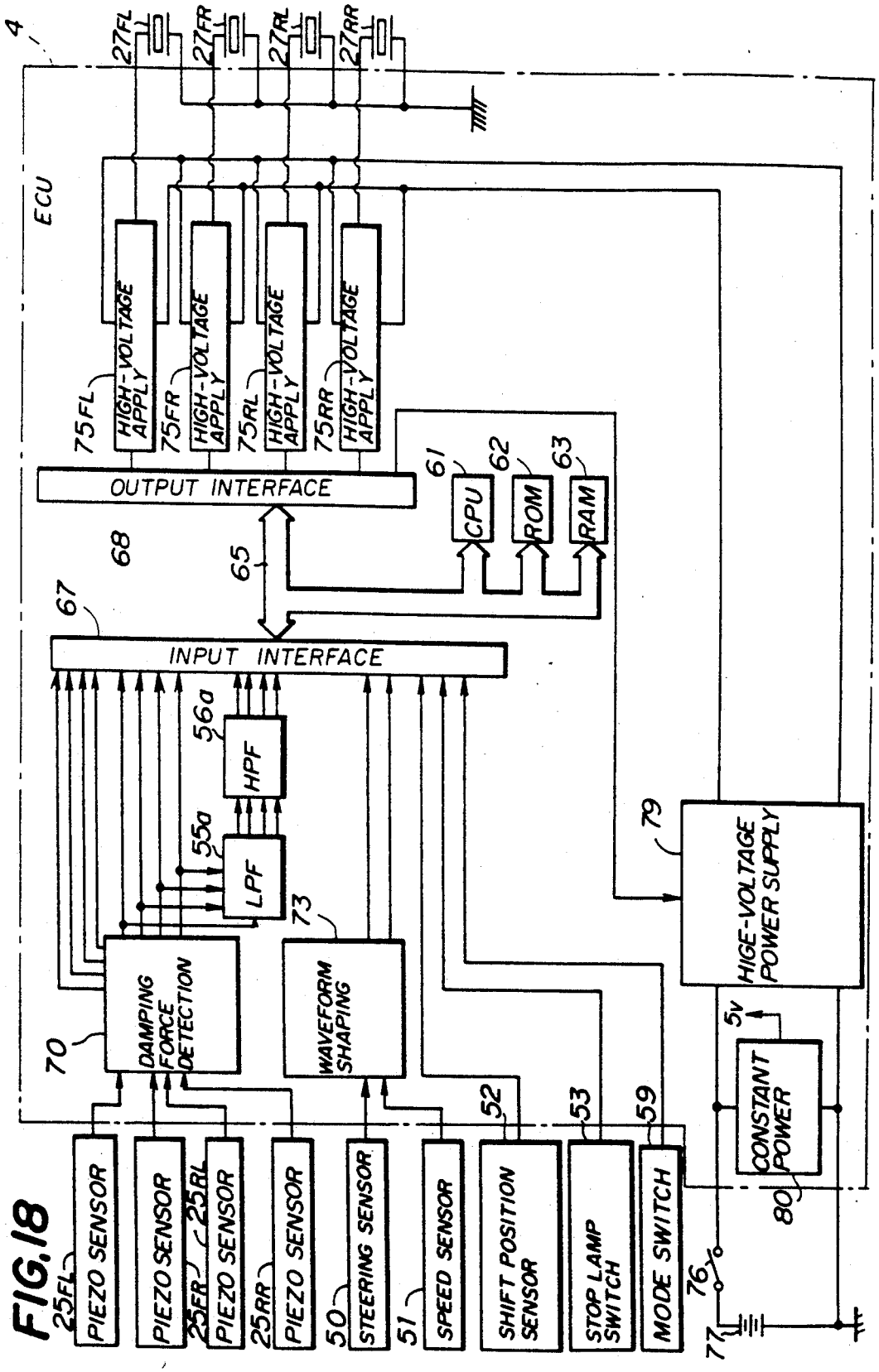
FIG. 18 is a block diagram illustrating a more detailed structure of the suspension control system shown in FIG. 17.

Referring to FIG. 18, there is illustrated a detailed configuration of the suspension control system shown in FIG. 17. In FIG. 18, those parts which are the same as those shown in FIG. 4 are given the same reference numerals. A lowpass filter 55a and a highpass filter 56a are respectively substituted for the lowpass filter 55 and the highpass filter 56 shown in FIG. 4. A mode setting switch 59 is connected to the input interface circuit 67 of the ECU 4.

The lowpass filter 55a receives the four damping force detection signals generated and output by the damping force detection circuit 70 and respectively outputs components having frequencies equal to or lower than about 1.3 [Hz]. The highpass filter 56a respectively receives frequency components from the lowpass filter 55a and outputs components having frequencies equal to or higher than about 1.0 [Hz]. Thus, the highpass filter 56a outputs four sprung resonance component signals related to the four shock absorbers 2. The mode setting switch 59 outputs a mode setting signal which indicates whether the shock absorbers should be set to the soft state (NORMAL) or the hard state (SPORT).

Figure 19:
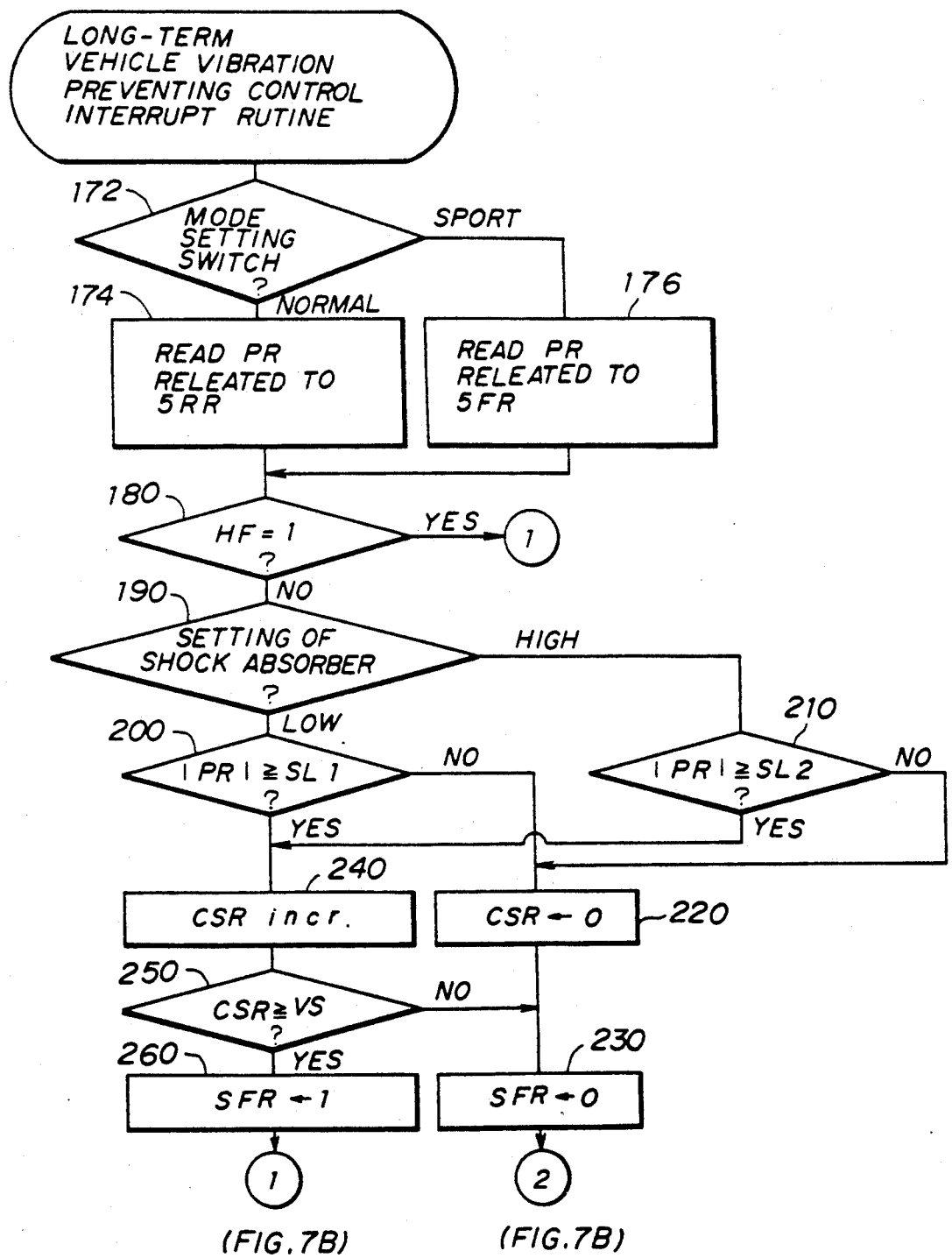
FIG. 19 is a flowchart illustrating the operation of the suspension control systems shown in FIGS. 17 and 18.

A damping force control procedure executed by the ECU 4 shown in FIG. 18 is the same as that shown in FIG. 6, and a long-term vehicle vibration preventing control interrupt procedure is obtained by modifying the procedure shown in FIGS. 7A and 7B, as shown in FIG. 19. In FIG. 19, those steps which are the same as those shown in FIG. 7A are given the same reference numerals. The procedure shown in FIG. 7B is applied, as it is, to the fourth embodiment of the present invention. The procedure shown in FIG. 19 and FIG. 7B are separately carried out for the right wheels 2RL and 2RR and the left wheels 2FL and 2FR in the same way. The procedure shown in FIG.19 is related to each of the right wheels 2FR and 2RR.

Steps 172, 174 and 176 shown in FIG.19 are substituted for step 170 shown in FIG. 7A. At step 172, the CPU 61 determines whether the mode setting switch 59 indicates the SPORT mode or the NORMAL mode. When it is determined that the current mode setting is NORMAL, at step 174, the CPU 61 inputs the sprung resonance component signal (damping force data signal) PR related to the shock absorber 2RR provided for the right rear wheel 5RR. On the other hand, when it is determined that the current mode setting is SPORT, at step 176, the CPU 61 inputs the sprung resonance component signal (damping force data signal) PR related to the shock absorber 5FR provided for the right front wheel 5FR.

It will be noted that even if the vehicle is running on the same portion of the same road surface, different results of the long-term vehicle vibration preventing interrupt control will be obtained. Since the damping force control procedure shown in FIG. 6 uses the results of the long-term vehicle vibration preventing interrupt control, different damping controls are carried out in accordance with the mode setting of the suspension characteristic.

FIG. 20-(A) illustrates an example of the waveform of the sprung resonance component signal PR related to the shock absorber 2FR provided for the right front wheel 5FR, and FIG. 20-(B) illustrates an example of the waveform of the sprung resonance component signal PR which is related to the shock absorber 2RR provided for the right rear wheel 5RR and which is obtained when the vehicle is running on the same road surface as in the case shown in FIG. 20-(A). The waveform shown in FIG. 20-(B) related to the rear wheel corresponds to that shown in FIG. 5 related to the rear wheel. There is a time delay between the waveform shown in FIG. 20-(A) and the waveform shown in FIG. 20-(B). When the mode setting is NORMAL, the control starting flag SFR related to the right rear wheel 5RR is set or reset at step 260 or 230 on the basis of the sprung resonance component signal PR related to the shock absorber 2RR provided for the right rear wheel 5RR. On the other hand, when the mode setting is SPORT, the control starting flag SFR related to the right rear wheel 5RR is set or reset at step 260 or 230 on the basis of the sprung resonance component signal PR related to the shock absorber 2FR provided for the right front wheel 5FR. In the same way, the control starting flag SFL related to the left wheels 5FL and 5RL is set or reset by one of the sprung resonance component signals PL which is selected on the basis of the current mode setting.

The sprung resonance component signal used for judging the control ending condition is also based on the current mode setting because the sprung resonance component signal used at step 270 shown in FIG. 7B is based on the judgment result at step 172 shown in FIG. 19.

Figure 21A:
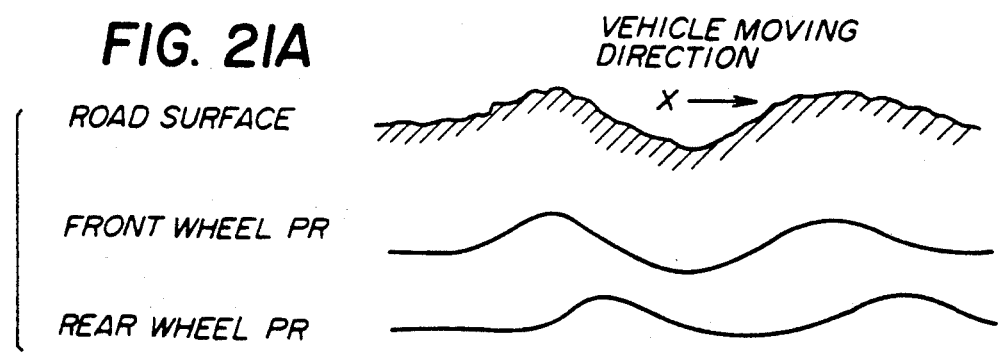
FIGS. 21A-21C are a diagram illustrating how the suspensions are controlled by the fourth embodiment of the present invention.
Figure 21B:
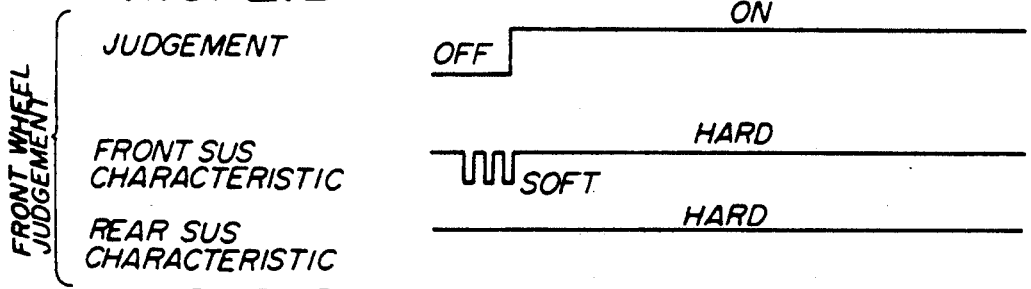
Figure 21C:
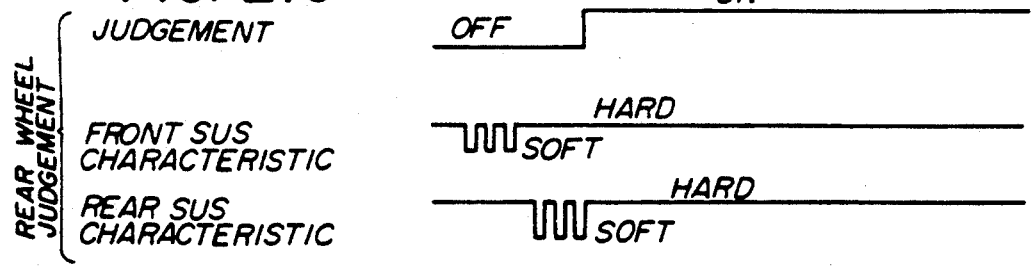

Referring to FIG. 21, there are illustrated advantages presented by the fourth embodiment of the present invention. As shown in FIG. 21-(A), when the vehicle indicated by symbol X is running in the direction X, the sprung resonance component signals related to the shock absorbers 2FR (2FL) and 2RR (2RL) change. FIG. 21-(B) shows the case where the mode setting switch 59 selects the SPORT mode, and FIG. 21-(C) shows the case where the mode setting switch 59 selects the NORMAL mode.

When the SPORT mode is selected, the damping force control procedure shown in FIG. 6 uses the flags SFR, SFL EFR and EFL which are set or reset on the basis of the sprung resonance component signal related to each of the front wheels 5FL and 5FR. As shown in FIG. 21-(B), the suspension provided for the front wheel 5FR starts to be frequently altered to the soft state (by the process at step 110 shown in FIG. 6). When it is determined that the long-term vehicle vibration preventing control is needed on the basis of the sprung resonance component signal related to, for example, the front wheel 5FR, all the shock absorbers are altered to and maintained in the hard state (by the process at step 140 shown in FIG. 6). As a result, the occurrence of long-term vehicle vibrations is prevented and the setting of the shock absorbers 2 improves the driving stability and controllability.

On the other hand, when the mode setting switch 59 selects the NORMAL mode, the damping force control procedure shown in FIG. 6 uses the flags SFR, SFL EFR and EFL which are set or reset on the basis of the sprung resonance component signal related to each of the rear wheels 5RL and 5RR. As shown in FIG. 21-(C), the suspension provided for the front wheel 5FR starts to be frequently altered to the soft state (by the process at step 110 shown in FIG. 6), and after that the suspension provided for the rear wheel 5RR starts to be frequently altered to the soft state. When it is determined that the long-term vehicle vibration preventing control is needed on the basis of the sprung resonance component signal related to the rear wheel 5RR, all the shock absorbers are altered to and maintained in the hard state (by the process at step 140 shown in FIG. 6). It can be seen from FIG. 21-(B) and FIG. 21-(C) that when the entire suspension characteristics which are to be set when the NORMAL mode is selected are soft, compared with those which are to be set when the SPORT mode is selected. Thus, when the NORMAL mode is selected, good riding comfort is obtained. In the above-mentioned way, the suspension control system according to the fourth embodiment of the present invention, the driver can definitely feel the difference between the suspension characteristics of the NORMAL mode and the SPORT mode.

A description will not be given of a variation of the suspension control system according to the fourth embodiment of the present invention. In the variation, the sprung resonance component signals related to the shock absorbers 2FR and 2FL are always referred to (alternatively, it is possible to always refer to the sprung resonance component signals related to the shock absorbers 2RL and 2RR), and the judgment value VS referred to at step 250 (FIG.19) is changed in accordance with the mode setting by the mode setting switch 59. More specifically, when the NORMAL mode is selected, the judgment value VS is set equal to a value Vsb which is greater than a value Vss used when the SPORT mode is selected. When the NORMAL mode is selected, it is relatively difficult to start the long-term vehicle vibration preventing control, so that the entire suspension characteristics are soft and good riding comfort is obtained. On the other hand, when the SPORT mode is selected, it is relatively easy to start the long-term vehicle vibration preventing control, so that the entire suspension characteristics are hard and good driving stability and controllability are obtained. The above-mentioned variation presents the same advantages as the fourth embodiment of the present invention.

In the suspension control system according to the fourth embodiment of the present invention or its variation, it is preferable that the following shock absorber control be employed in order to much more emphasize the difference between the suspension characteristics of the NORMAL mode and the SPORT mode.

Figure 22:
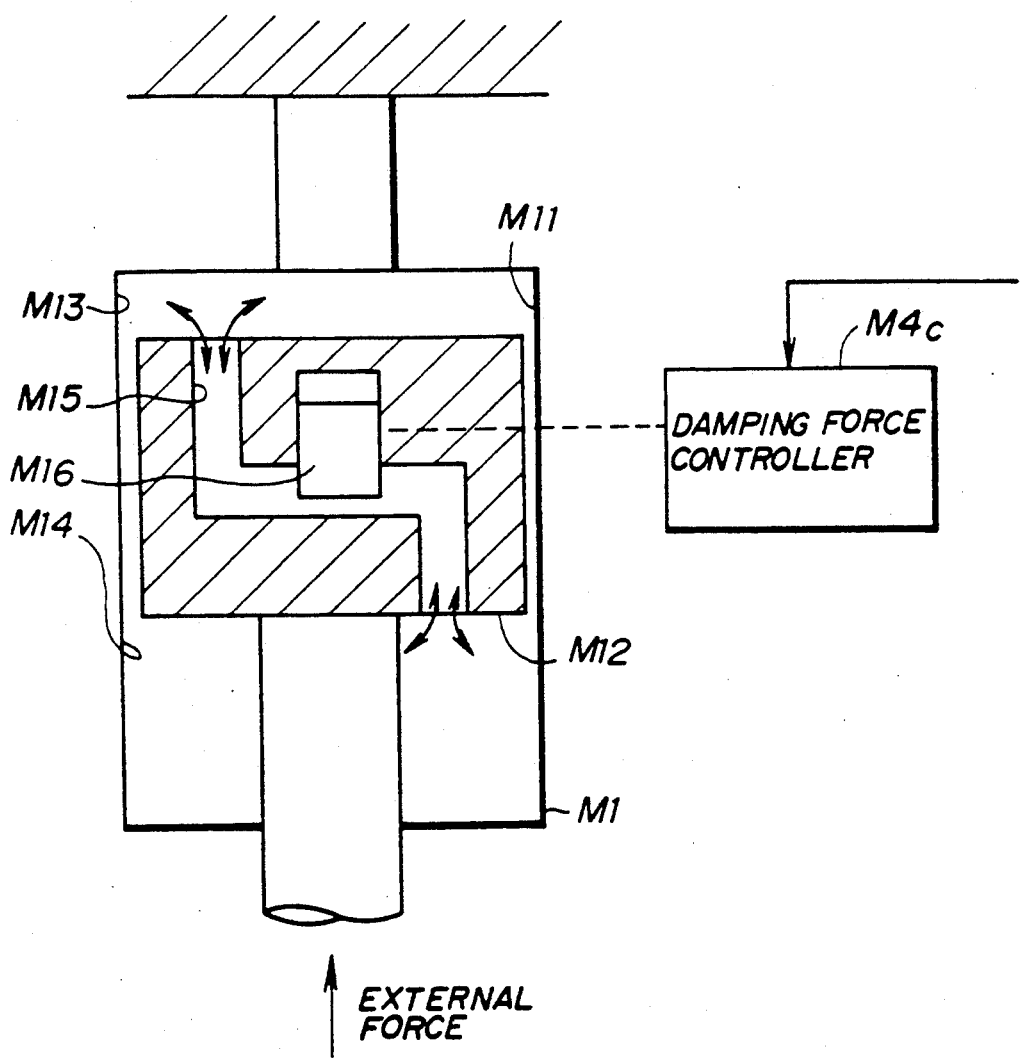
FIG. 22 is a block diagram illustrating the principle of a shock absorber used in the suspension control system according to the present invention.

Referring to FIG. 22, there is illustrated a general structure of the shock absorber shown in FIG. 17. The shock absorber Ml shown in FIG. 22 has a cylinder M11, a piston M12 moving in the cylinder M11 due to the function of an external force, two rooms M13 and M14 provided in the piston M12, a fluid path M15 connecting the two rooms M13 and M14 to each other, and a valve member M16 which increases or decreases a fluid resistance to a fluid flowing in the fluid path M15. The structure of the shock absorber Ml shown in FIG. 22 is realized by the structure shown in FIGS. 3A and 3B.

The piston M12 in the cylinder M11 is moved due to the function of the external force and the fluid flows in the fluid path M15 which couples the rooms M13 and M14. During this operation, the shock absorber Ml produces a damping force based on the fluid resistance to the flow of the fluid. The level of the damping force is changed in accordance with the position of the valve member M16. The damping force controller M4c receives an instruction supplied from the response controller M9 (FIG. 17) or directly from the mode setting unit M8 (FIG. 17), and changes the moving velocity of the valve member M16. Thus, the speed of a change of the damping force caused by the movement of the valve M16 is controlled, so that various damping force characteristics are obtained.

Figure 23:
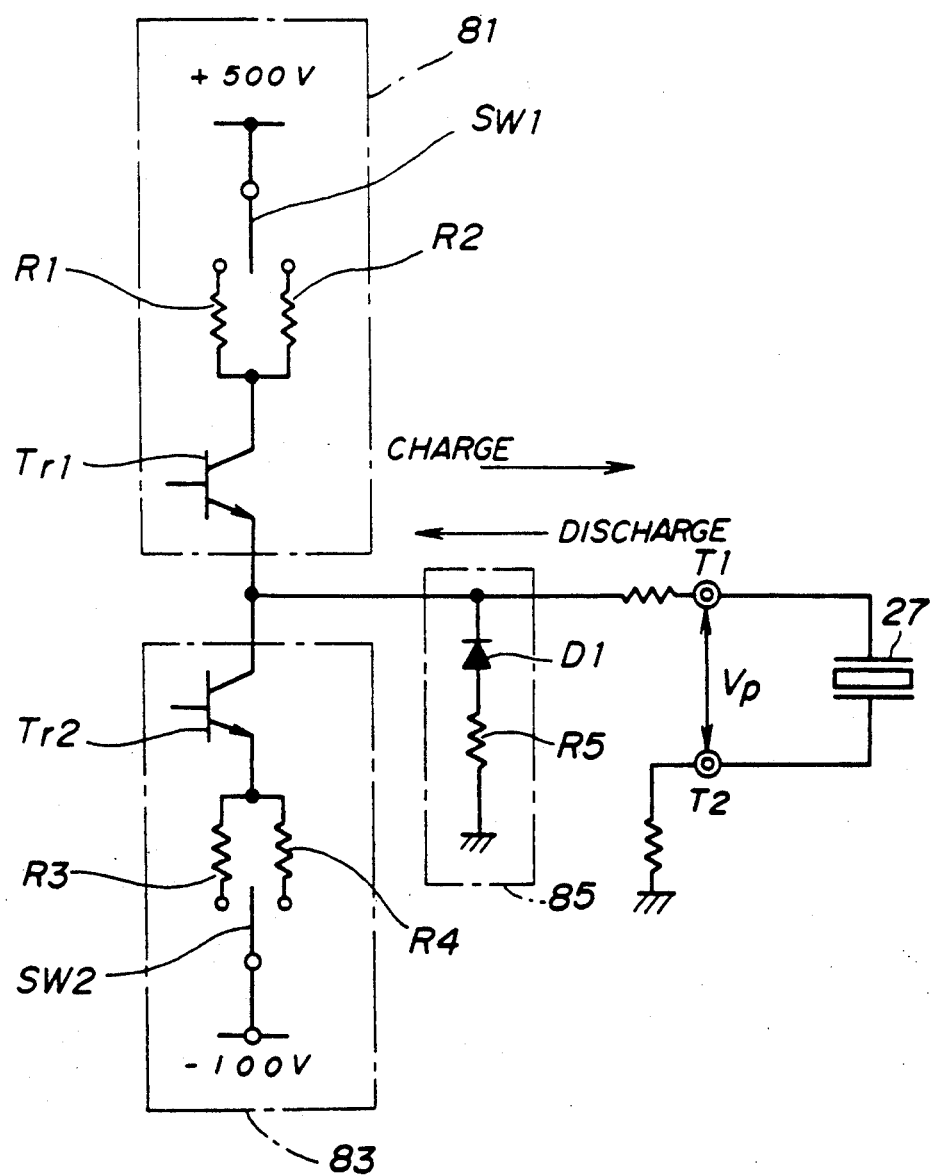
FIG. 23 is a circuit diagram of a high-voltage application circuit shown in FIG. 18.
Figure 24A:
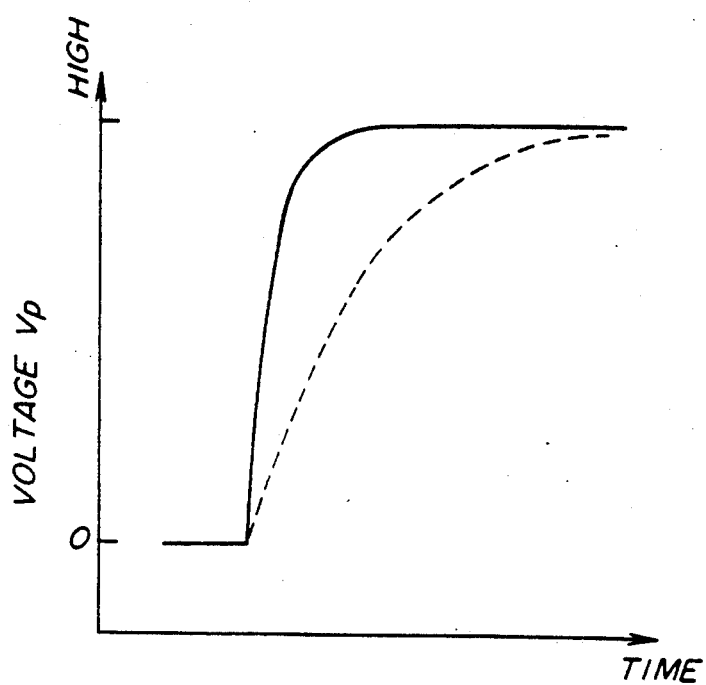
FIGS. 24A and 24B are respectively graphs illustrating the relationships between a terminal voltage of a piezoelectric actuator and time.

FIG. 23 is a circuit diagram of each of the high-voltage application circuits 75FL, 75FR, 75RL and 75RR shown in FIG. 18. The high-voltage application circuit is made up of a positive high-voltage application circuit 81, a negative high-voltage application circuit 83 and a discharge circuit 85. The positive high-voltage application circuit 81 is made up of a switching transistor Tr1, two resistors R1 and R2 provided for changing the charge speed at which the piezoelectric actuator 27 is charged, and a switch SWI which selects either the resistor R1 or the resistor R2. When the transistor Tr1 is turned ON in response to a control signal generated and output by the CPU 61 shown in FIG. 18, a positive high-voltage of +500 volts is applied to the piezoelectric actuator 27 via the transistor Tr1. The transient characteristic of an increase in a voltage across terminals T1 and T2 of the piezoelectric actuator 27 is determined based on the resistance values of the resistors R1 and R2. For example, the resistor R1 has a resistance value smaller than that of the resistor R2. As a result, when the switch SWI selects the resistor R1, the voltage labeled Vp across the terminals T1 and T2 increases rapidly, as shown by the solid line in FIG. 24A. Thus, the piezoelectric actuator 27 expands at high speeds and the damping force of the shock absorber 2 (Ml) is rapidly decreased, that is, the shock absorber (suspension) is rapidly altered to the soft state. On the other hand, when the resistor R2 is selected, as shown by the broken line shown in FIG. 24A, the voltage Vp across the terminals T1 and T2 increases gradually. As a result, the piezoelectric actuator 27 expands gradually and thus the damping force of the shock absorber 2 is decreased to the low level (soft) at a speed less than that obtained when the resistor R1 is selected.

Figure 24B:
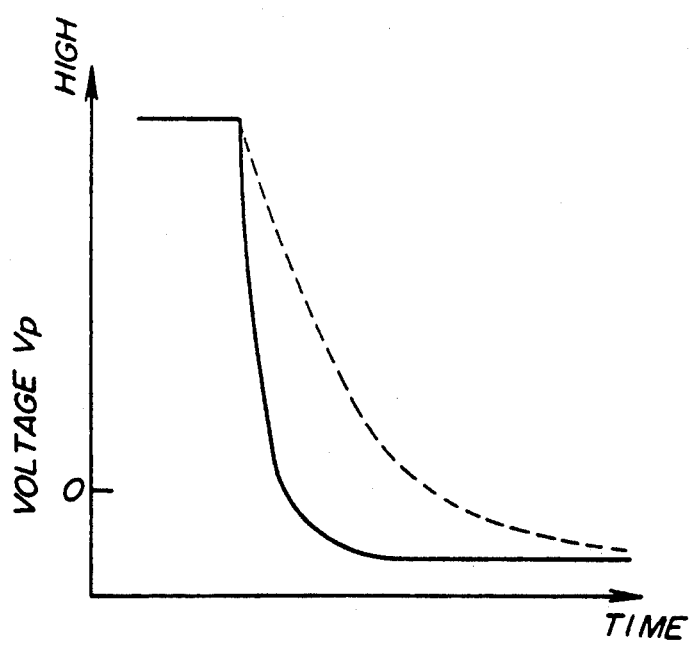

The negative high-voltage application circuit 83 is made up of a switching transistor Tr2, two resistors R3 and R4 provided for changing the discharge speed at which the piezoelectric actuator 27 is discharged, and a switch SW2 for selecting either the resistor R3 or R4. When the switching transistor Tr2 is turned ON in response to a control signal produced and output by the CPU 61 (FIG. 18), a negative high-voltage of −100 volts is applied to the piezoelectric actuator 27. The transient characteristic of a decrease in the voltage across the terminals T1 and T2 is determined based on the resistance values of the resistors R3 and R4. For example, the resistor R3 has a resistance value smaller than that of the resistor R4. When the switch SW2 selects the resistor R3, the voltage Vp across the terminals T1 and T2 decreases rapidly so that the piezoelectric actuator 27 expand at high speeds, as shown by the solid line in FIG. 24B. Thus, the damping force of the shock absorber 2 is rapidly altered to the high level, that is, the shock absorber 2 is rapidly set to the hard state. On the other hand, when the switch SW2 selects the resistor R4, the voltage Vp across the terminals T1 and T2 decreases gradually, as shown by the broken line in FIG. 24B, so that the piezoelectric actuator 72 expands gradually. Thus, the damping force of the shock absorber 2 is altered to the high level at a speed less than that obtained when the resistor R3 is selected.

The discharge circuit 85 is composed of a diode D1 and a resistor R5. When the transistor Tr2 of the negative high-voltage application circuit 83 is switched from ON to OFF, a charge stored in the piezoelectric actuator 27 is allowed to pass through the discharge circuit 85. As a result, the voltage Vp across the terminals T1 and T2 of the piezoelectric actuator 27 becomes zero, so that the piezoelectric actuator 27 returns to the original length.

Figure 26:
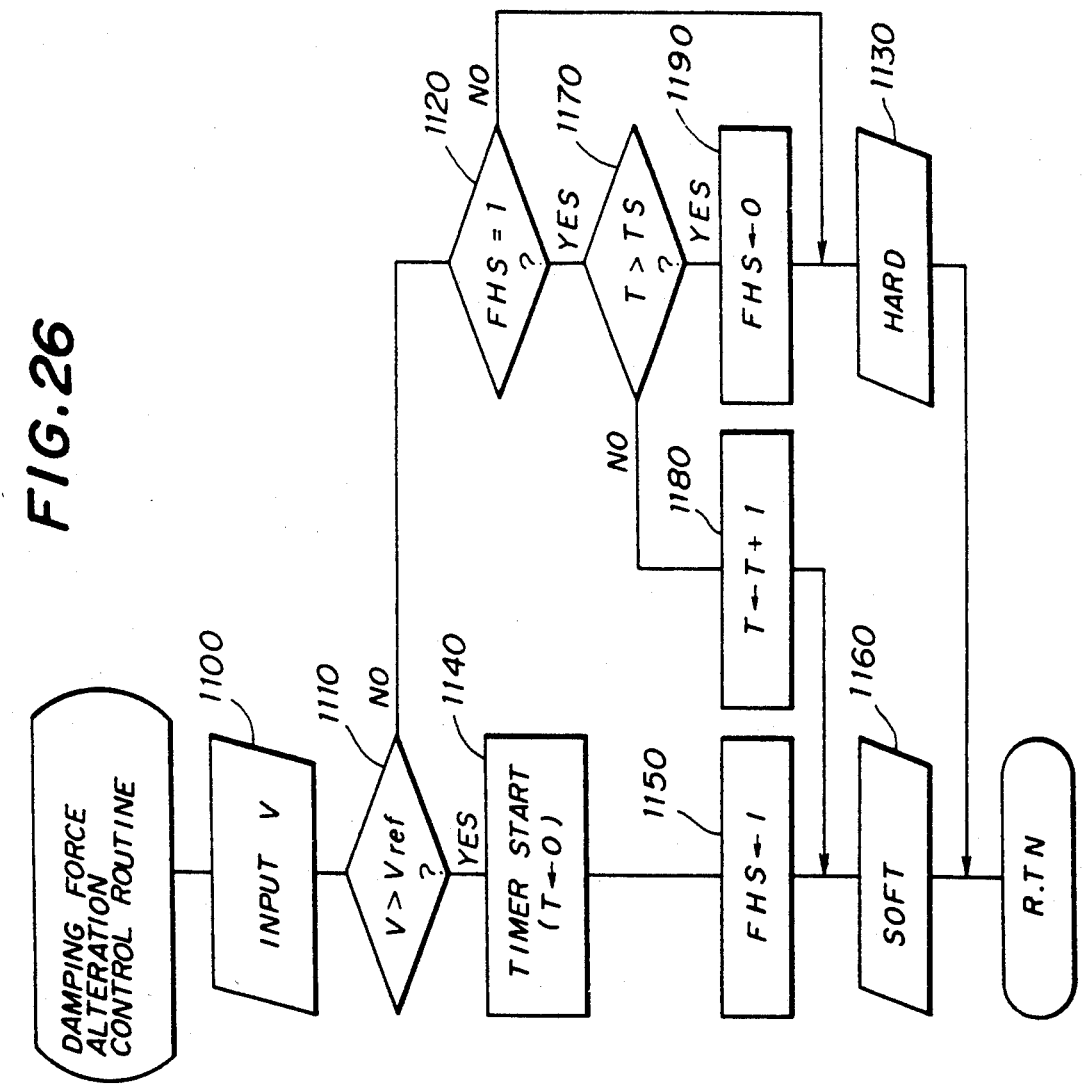
Figure 27:
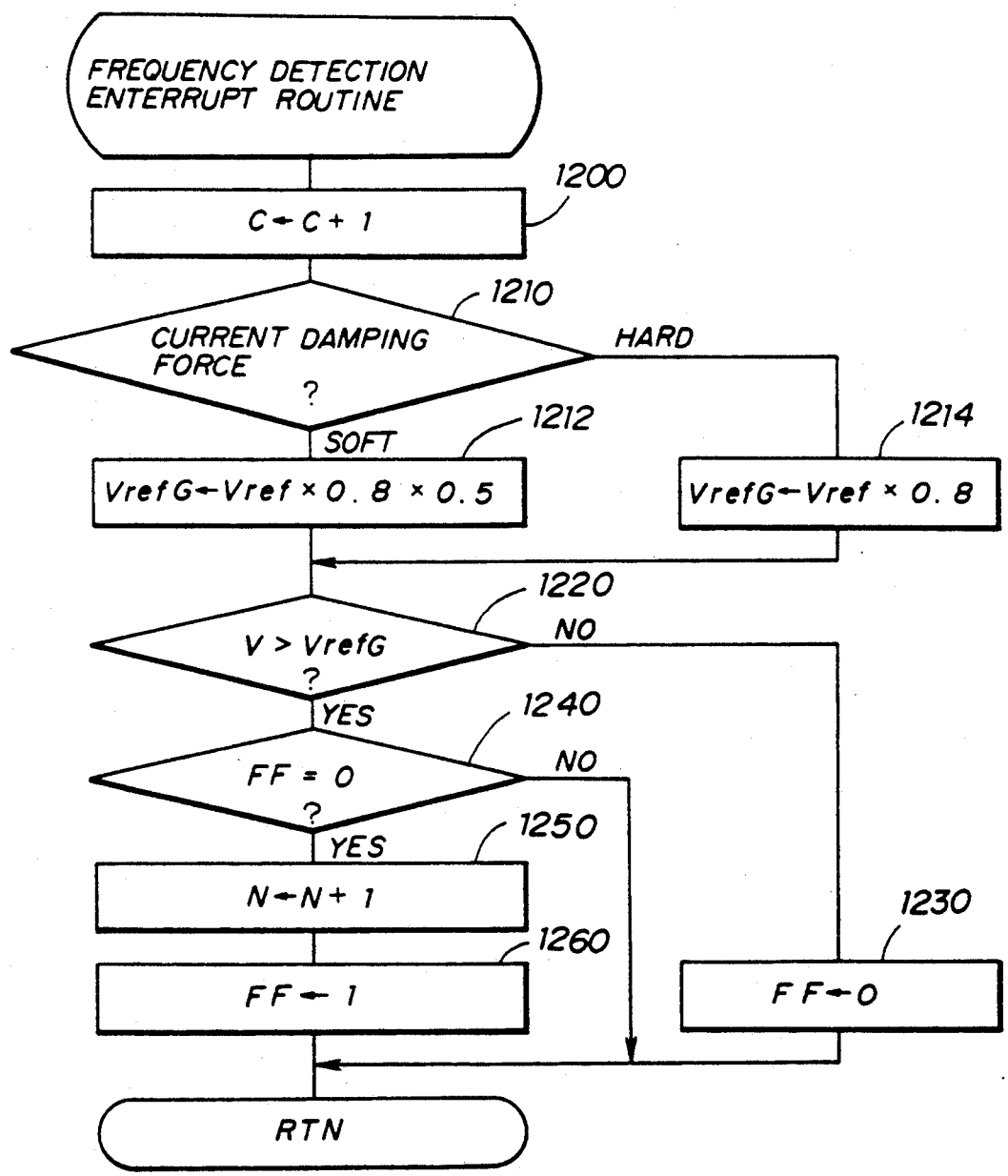
Figure 28:
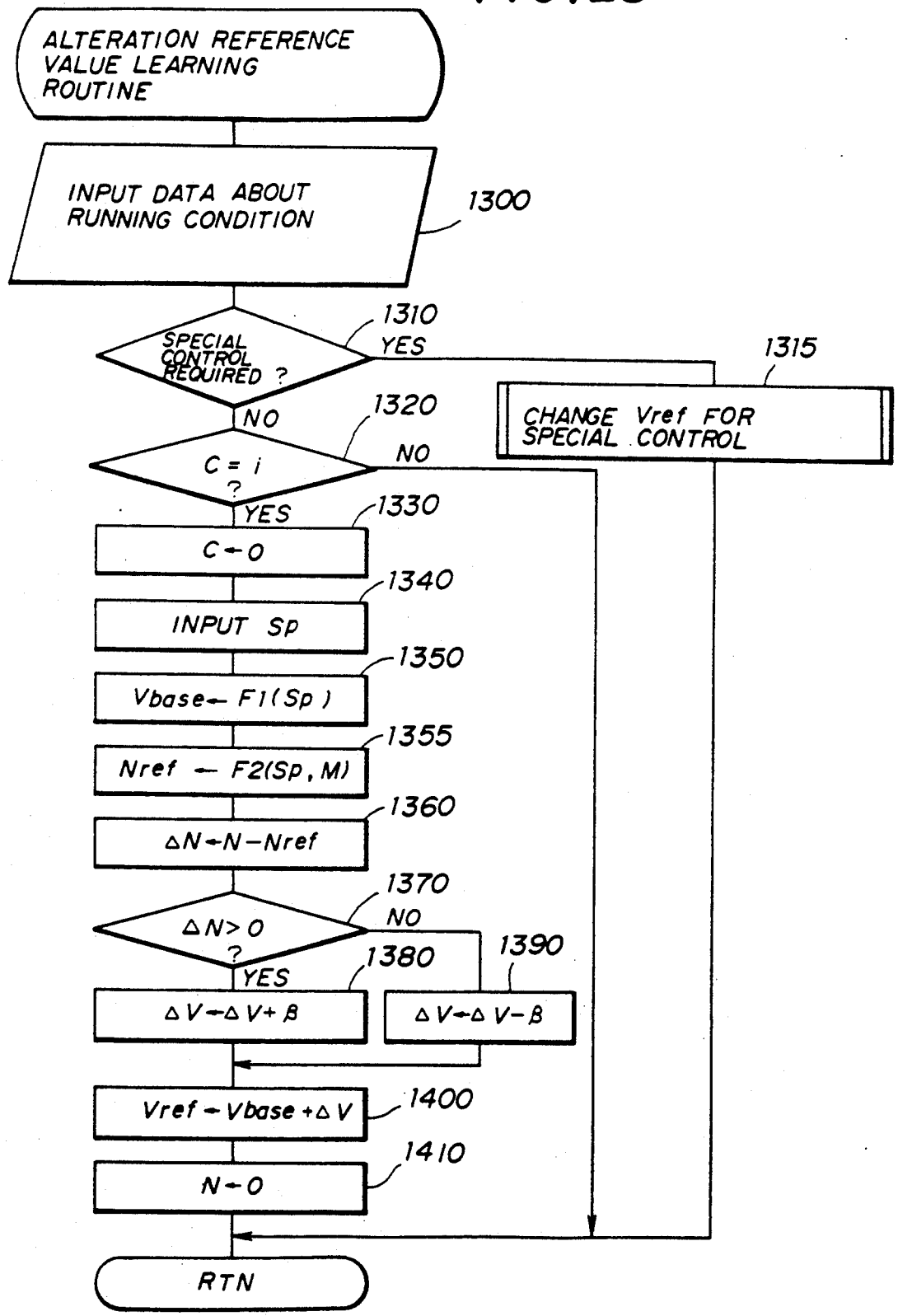

The CPU 61 executes the procedures shown in FIGS. 25, 26, 27 and 28. The FIG. 25 is a flowchart illustrating a mode setting procedure (routine), which determines, on the basis of the setting status of the mode setting switch 59 shown in FIG. 18, whether the driver wishes the SPORT mode or the NORMAL mode, and controls the switches SWI and SW2 shown in FIG. 23 on the basis of the determination result. FIG. 26 illustrates a damping pattern alteration control procedure (routine) which is executed at step 110 shown in FIG. 6. The procedure shown in FIG. 26 controls the piezoelectric actuator 27 on the basis of the rate of change of the damping force, V, which varies depending on the road surface condition. FIG. 27 illustrates a frequency detection interrupt procedure (routine), which calculates the number of times that the damping force change rate V exceeds a learning reference value VrefG for a predetermined period, and outputs a frequency N representative of the calculated number of times. FIG. 28 illustrates an alteration reference value Vref learning procedure (routine), which learns an alteration reference Vref on the basis of the degree of the frequency N. The procedures shown in FIGS. 26 through 28 serve as subroutines of the procedure shown in FIG.25.

Referring to FIG.25, the CPU 61 inputs the signal output from the mode setting switch 59 at step 1000, and determines whether the current setting indicates the NORMAL mode or SPORT mode at step 1010. When it is determined that the current setting indicates the SPORT mode, the CPU 61 executes a SPORT mode setting process at step 1020. On the other hand, when it is determined that the current setting indicates the NORMAL mode, the CPU 61 executes a NORMAL mode setting process at step 1030. In the SPORT mode setting process, under the control of the CPU 61, the switch SW1 selects the resistor R2 having a resistance value greater than that of the resistor R1, and the switch SW2 selects the resistor R3 having a resistance value smaller than that of the resistor R4. When the positive high-voltage is being applied to the piezoelectric actuator 27, it takes a long time to charge the piezoelectric actuator 27, as shown by the broken line shown in FIG. 24A, and the speed of the movement of the spool valve 41 in the direction B (shown in FIG. 3B) is low. As a result, the corresponding shock absorber 2 is gradually altered to the soft state from the hard state while leaving an entirely hard suspension characteristic. When the negative high-voltage is being applied to the piezoelectric actuator 27, it is rapidly discharged through the discharge circuit 85, as shown by the solid line in FIG. 24B, and the speed of the movement of the spool valve 41 in the direction A (shown in FIG. 3B) is increased. As a result, the setting of the shock absorber 2 is altered to the hard state from the soft state while leaving an entirely hard suspension characteristic.

In the NORMAL mode setting process at step 1030 is as follows. Under the control of the CPU 61, the switch SWI selects the resistor R1 having a resistance value less than that of the resistor R2, and the switch SW2 selects the resistor R4 having a resistance value greater than that of the resistor R3. Thus, as shown by the solid line in FIG. 24A, when the positive high-voltage is being applied to the piezoelectric actuator 27, it is rapidly charged so that the speed of movement of the spool valve 41 in the direction B is increased and thus the shock absorber is rapidly altered to the soft state from the hard state. When the negative high-voltage is being applied to the piezoelectric actuator 27, it is gradually discharged, as shown by the broken line in FIG. 24B and the speed of movement of the spool valve 41 in the direction A is decreased. As a result, the shock absorber 2 is gradually altered from the soft state to the hard state while leaving an entirely soft suspension characteristic.

Referring to FIG. 26, the procedure commences with step 1100, at which step the CPU 61 (FIG. 18) inputs the damping force change rate V regarding each shock absorber 2 from the damping force detection circuit 70 via the input interface circuit 67. Next, at step 1110, the CPU 61 discerns whether or not the damping force change rate V is greater than the alteration reference value Vref which is learned by the procedure shown in FIG. 28. When the result at step 1110 is NO, that is, when the damping force change rate V is equal to or less than the alteration reference value Vref, the CPU 61 determines, at step 1120, whether or not a flag FHS indicating that the suspension is set to the soft state is equal to 1. When the result obtained at step 1120 is NO, at step 1130, the CPU 61 controls the suspension so that it is altered to the hard state, and ends the procedure. It will be noted that immediately after the damping force of the shock absorber 2 is altered from the low level (soft state) to the high level (hard state), the output interface circuit 68 controls the corresponding high-voltage application circuit 75 under the control of the CPU 61 so that a voltage of -100 volts is applied to the corresponding piezoelectric actuator 27 so that it is contracted. If the corresponding piezoelectric actuator 27 is in the contracted state, the piezoelectric actuator 27 is maintained in this state.

On the other hand, when it is determined, at step 1110, that the damping force change rate V is greater than the alteration reference value Vref, the CPU 61 resets a timer variable T to zero at step 1140. At step 1150 subsequent to step 1140, the CPU 61 sets the flag FHS to 1, which represents that the suspension should be set to the soft state. At step 1160, under the control of the CPU 61, the output interface circuit 68 controls the corresponding high-voltage application circuit 75 so that it applies a voltage of +500 volts to the corresponding piezoelectric actuator 27 so that the damping force of the shock absorber 2 is set to the low level (soft). Then, the procedure is terminated.

If the damping force change rate V is greater than the alteration reference value Vref after the damping force of the shock absorber 2 is altered to the low level, a sequence of steps 1140, 1150 and 1160 is repeatedly carried out. When it is determined, at step 1110, that the damping force change rate V has become equal to or less than the alteration reference value Vref, the CPU 61 checks the status of the flag FHS at step 1120, and determines, at step 1170, whether or not the timer variable T exceeds a predetermined reference value Ts. The reference value Ts is provided for maintaining the shock absorber 2 at the low level for a predetermined time after it is altered to the low level. If the timer variable T is equal to or less than the reference value Ts, the CPU 61 increments the timer variable T by +1 at ste]1170 and executes step 1160. Thus, the suspension is maintained in the soft state.

If the damping force change rate V is always equal to or less than the alteration reference value Vref for the predetermined time (which corresponds to Ts) after the damping force change rate V becomes equal to or less than the alteration reference value Vref, the determination result obtained at step 1170 becomes YES. Then, the CPU 61 resets the flag FHS to zero at step 1190, and controls the shock absorber 2 so that it provides the high-level damping force (hard state) at step 1130.

While the procedure shown in FIG. 26 is repeatedly carried out, the damping force of the shock absorber 2 is altered to the low level immediately after the damping force change rate V exceeds the alteration reference value Vref, and maintained at the low level for the predetermined time corresponding to Ts. When the predetermined time Ts elapses in the state where the damping force change rate V is equal to or less than the alteration reference value Vref, the damping force is altered to the high level.

A description will now be given of the interrupt procedure (FIG. 27) for detecting the frequency N used for determining the alteration reference value Vref which is referred to during the procedure shown in FIG. 26. The procedure shown in FIG. 27 commences with step 1200, at which step the CPU 61 increments the aforementioned variable C by +1. The variable C indicates the number of times that the procedure shown in FIG. 27 is activated. At subsequent step 1210, the CPU 61 discerns whether the suspension is in the soft state or hard state. It will be noted that the setting of the damping force of the shock absorber 2 is controlled by the aforementioned procedure shown in FIG. 26. When it is determined, at step 1210, that the current status of the shock absorber 2 is in the low level (soft state), at step 1212, the CPU 61 multiplies the current alteration reference value Vref by 0.8×0.5 and inserts Vref ×0.8×0.5 into the learning reference value VrefG. On the other hand, when it is determined, at step 1210, that the current status of the shock absorber 2 is in the high level (hard state), at step 1214, the CPU 61 multiplies the current alteration reference value Vref by 0.8 and inserts Vref ×0.8 into the learning reference value VrefG. The above-mentioned coefficients to be multiplied by the alteration reference values are not limited to 0.8×0.5 and 0.8, but arbitrarily selected on the basis of experimental results.

After the learning reference value VrefG is obtained for each of the hard and soft states in the above-mentioned way, the CPU 61 determines, at step 1220, whether or not the current damping force change rate V is greater than the learning reference value VrefG. If the current damping force change rate V is equal to or lower than the learning reference value VrefG, the CPU 61 resets a flag FF to zero at step 1230, and then ends the procedure shown in FIG. 27. The flag FF indicates whether or not the current damping force change rate V is greater than the alteration reference value Vref.

On the other hand, when it is determined, at step 1220, that the current damping force change rate V is greater than the learning reference value VrefG, the CPU 61 checks the value of the flag FF at step 1240. When it is determined, at step 1240, that the flag FF is equal to zero, that is, immediately after the current damping force change rate V has become greater than the learning reference value VrefG, the CPU 61 increments the frequency N by +1 at step 1250, and the sets the flag FF to 1 at step 1260. Then, the procedure shown in FIG. 27 is ended. In this manner, the frequency N is incremented by +1 only immediately after the damping force change rate V has become greater than the learning reference value VrefG. That is, the frequency N is not increased until the damping force change rate V becomes equal to or less than the alteration reference value VrefG and then becomes greater than the alteration reference value VrefG again.

The procedure shown in FIG. 27 is repeatedly carried out so that the learning reference value VrefG is renewed on the basis of the alteration reference value Vref, and the frequency N at which the damping force change rate V becomes greater than the learning reference value VrefG within the predetermined period is obtained.

The alteration reference value learning procedure (routine) will now be explained with reference to FIG. 28. The procedure shown in FIG. 28 commences with step 1300, at which step the CPU 61 inputs the signals from the steering sensor 50, the speed sensor 51 and the stop lamp switch 53 via the input interface circuit 67. At subsequent step 1310, the CPU 61 obtains the current driving condition from the input signals, and determines, from the obtained current driving condition, whether or not a special control, such as an anti-dive control or an anti-roll control, should be carried out. For example, when the vehicle is being braked or rapidly steered, the CPU 61 concludes that the special control should be carried out. In this case, the CPU 61 changes the alteration reference value Vref to an optimum value suitable for the special control at step 1315. After that, the procedure shown in FIG. 28 is ended.

On the other hand, when it is determined, at step 1310, that the above-mentioned special control is not needed, the CPU 61 determines, at step 1320, whether or not the variable C has become equal to a value i. The variable C is incremented by +1 each time the procedure shown in FIG. 27 is executed. The variable C is provided for determining whether or not the (predetermined) time necessary to obtain the frequency N has elapsed. The procedure shown in FIG. 28 is ended if the number of times that the procedure shown in FIG. 27 has repeatedly been carried out is small (C <i) so that the time necessary to obtain the frequency N has not yet elapsed.

Figure 29:
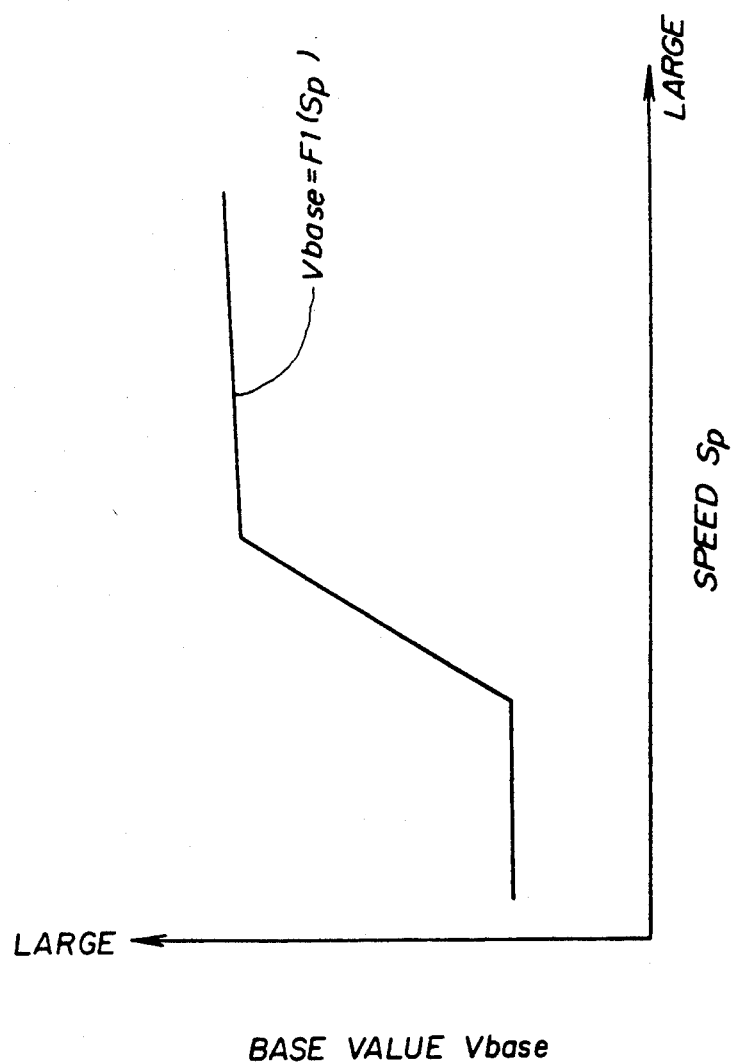
FIG. 29 is a graph illustrating the relationship between a base value of an alteration reference value and vehicle speed.

The determination result at step 1320 becomes YES each time the procedure shown in FIG. 27 is carried out i times. When the result at step 1320 is YES, the CPU 61 resets the variable C to zero at step 1330, and inputs a current vehicle speed Sp at step 1340 via the input interface circuit 67. At step 1350, the CPU 61 calculates a base value Vbase from the vehicle speed Sp. The base value Vbase is used for adjusting the alteration reference value Vref in accordance with the vehicle speed Sp. As shown in FIG. 29, the base value Vbase is a function of the vehicle speed Sp, $F_1(Sp)$. As shown in FIG. 29, the base value Vbase is increased with an increase in the vehicle speed Sp.

Figure 30:
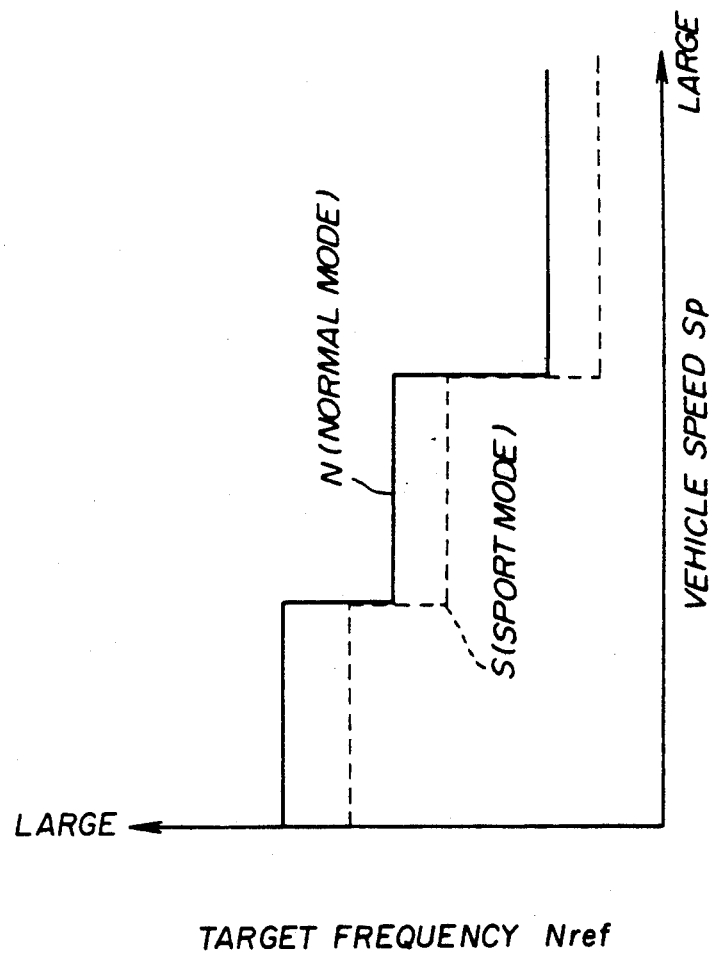
FIG. 30 is a graph illustrating the relationship between a target and a vehicle speed.

Turning to FIG. 28, at step 1355, the CPU 61 calculates a target frequency Nref on the basis of the current vehicle speed Sp and the current setting mode labeled M. That is, as shown in FIG. 30, the target frequency Nref is defined as a function, $F_2(Sp, M)$. In general, the target frequency Nref used when the NORMAL mode is selected is greater than that used when the SPORT mode is selected. In addition, the target frequency Nref decreases with an increase of the vehicle speed Sp.

At step 1360, the CPU 61 calculates a frequency deviation $\Delta N$ between the frequency N obtained by the procedure shown in FIG. 27 and a target frequency Nref. At step 1370, the CPU 61 discerns whether or not the frequency deviation $\Delta N$ is greater than 0. When the frequency deviation $\Delta N$ is greater than 0, a learning correction value $\Delta V$ is incremented by $\beta$ at step 1380. On the other hand, when the frequency deviation $\Delta N$ is equal to or less than 0, the learning correction value $\Delta V$ is decremented by $\beta$ at step 1390. The learning correction value $\Delta V$ thus calculated is added to the base value Vbase at step 1400 so that the alteration reference value Vref is obtained. In this way, the alteration reference value Vref is learned and adjusted on the basis of the vehicle speed Sp. It will be noted that the learning correction value $\Delta V$ is also learned (page 27) and the learning correction value $\Delta V$ obtained by the learning is stored in the RAM 64, for example, and used in the future control. At step 1410 subsequent to step 1400, the CPU 61 resets the frequency N to 0 so that it is ready for the next frequency calculation procedure. After that, the procedure shown in FIG. 28 is ended.

By executing the procedures shown in FIGS. 26, 27 and 28, the setting of the damping force of each shock absorber 2 is controlled as follows.

As will be described in more detail later, during the time when the suspension characteristic is switched between the soft state and the hard state, in the SPORT mode, it takes a long time to charge each piezoelectric actuator 27, so that the spool valve 41 moves at a low speed in the direction B shown in FIG. 3B is small. Thus, as shown in FIGS. 13A and 13B, the suspension characteristic is gradually altered from the hard state to the soft state while leaving an entirely hard suspension characteristic. On the other hand, the piezoelectric actuator 27 is rapidly discharged, and thus the spool valve 41 moves in the direction A at a high speed. As a result, as shown in FIG. 13A and 13B, the switching from the soft state to the hard state is carried out rapidly. By the above-mentioned altering control in the SPORT mode, a suspension characteristic which makes an impression that the suspensions are rather hard.

On the other hand, in the NORMAL mode, the piezoelectric actuator 27 is rapidly charged and thus the spool valve 41 rapidly moves in the direction B (FIG. 3B), so that the mode setting is rapidly changed from the hard state to the soft state. In contract, it takes a long time to discharge the piezoelectric actuator 27, and thus the spool valve 41 gradually moves in the direction A (FIG. 3B). Thus, the suspension characteristic is changed from the soft state to the hard state while leaving an entirely soft suspension characteristic. As a result, it becomes possible to realize the NORMAL mode suspension characteristic which makes an impression that the suspensions are rather soft.

The suspensions are controlled on the basis of the road surface condition as follows. Referring to FIG. 31A, there is illustrated an example of the damping force control while the vehicle is continuously running on a flat road surface. In this case, the damping force change rate V does not change greatly, and the damping force of the shock absorber 2 is maintained at the high level (hard state). At this time, the learning reference value VrefG is equal to 80% of the alteration reference value Vref at step 1214 shown in FIG. 27. Thus, the frequency N at which the damping force change rate V exceeds the learning reference value VrefG within the predetermined period (which corresponds to the count value i) is low. Thus, the alteration reference value Vref is learned at step 1390 so that it is decremented by $\beta$ each time it is determined that $\Delta N \leq 0$ at step 1370 shown in FIG. 28. As a result, it becomes easy for the damping force change rate V to exceed the alteration reference value Vref. Thus, the damping force of the shock absorber 2 is altered to the low level due to the presence of a small road surface roughness at times $t_1$ and $t_2$ shown in FIG. 31A, even when the vehicle is running on the flat road surface. As the alteration reference value Vref becomes small at step 1212 (FIG. 27), the learning reference value VrefG also becomes small, so that the frequency N at which the damping force change value V exceeds the learning reference value VrefG within the predetermined period becomes high. As a result, the alteration reference value Vref is incremented by $+\beta$. As the above-mentioned procedure is repeatedly carried out, the alteration reference value Vref is learned so that it becomes equal to an appropriate value at which the frequency deviation $\Delta N$ becomes approximately zero.

Thus, when the vehicle is running on the flat road surface and the damping force change rate V is low so that the suspension has a tendency to be set to the hard state, the alteration reference value Vref is gradually decreased by the detection of the frequency N, the renewal of the alteration reference value Vref and the learning of the learning reference value VrefG. As a result, it becomes easy to alter the damping force of the shock absorber 2 to the low level, that is, alter the suspension to the soft state. Thus, it becomes possible to absorb the occurrence of a vibration caused by a small roughness on a continuously flat road surface, so that riding comfort is improved.

On the other hand, when the vehicle is running on a rough road surface, as shown in FIG. 31B, the damping force change rate V changes greatly and the suspension is maintained in the soft state. During this time, the learning reference value VrefG is set equal to 40% of the alteration reference value Vref at step 1212 shown in FIG. 27. Thus, the frequency N at which the damping force change rate V exceeds the alteration reference value Vref within the predetermined period (which corresponds to the count value i) is high. As a result, the alteration reference value Vref is incremented by $\beta$ at step 1380 each time it is determined that $\Delta N > 0$. Thus, it gradually becomes difficult for the damping force change rate V to exceed the alteration reference value Vref, so that the damping force is altered to the high level (hard state) at times $t_{11}$ and $t_{12}$ shown in FIG. 31B, even when the vehicle is running on the rough road surface. As the alteration reference value Vref is increased in the above-mentioned way, the learning reference value VrefG is also increased. Thus, the frequency N at which the damping force change rate V exceeds the learning reference value VrefG becomes low. As a result, the alteration reference value Vref is renewed so that it is decreased by $\beta$. As the above-mentioned procedure is repeatedly carried out, the alteration reference value Vref is learned so that it becomes equal to an appropriate value at which the frequency deviation $\Delta N$ is approximately zero.

Thus, even the vehicle is running on the rough road surface and the damping force change rage V is high so that the suspension has a tendency to be set to the hard state, the alteration reference value Vref is gradually increased in accordance with the detection of the frequency N, the renewal of the alteration reference value Vref and learning of the learning reference value VrefG. As a result, it becomes easy to alter the damping force of the shock absorber 2 to the high level, that is, alter the suspension to the hard state. Thus, it becomes possible to suppress deterioration of the road holding characteristic caused by a continuously rough road surface, so that the driving stability and controllability can be improved.

The target frequency Nref in the SPORT mode is less than that in the NORMAL mode. Thus, the alteration reference value Vref in the SPORT mode is learned so that the frequency deviation $\Delta N$ becomes zero and it becomes greater than that in the NORMAL mode. Thus, the suspension characteristic in the SPORT mode makes an impression that the suspensions are hard. On the there hand, the target frequency Nref in the NORMAL mode is greater than that in the NORMAL mode. Thus, the alteration reference value Vref in the NORMAL mode is learned so that the frequency deviation $\Delta N$ becomes zero and it becomes less than that in the SPORT mode. Thus, the suspension characteristic in the NORMAL mode made an impression that the suspensions are soft.

Several variations of the arrangement described with reference to FIGS. 22 through 31 can be made. For example, variable resistors may be substituted for the resistors R1 through R4 shown in 23. The use of the variable resistors makes it possible to continuously change the altering speed at which the damping force is switched between the soft and hard states.

It will be noted that the configurations and procedures shown in FIGS. 22 through 30 can be applied to the first, second and third preferred embodiment of the present invention by modifying them if necessary.

In the above-mentioned embodiments, the lowpass filter and the highpass filter may be replaced by a bandpass filter. In place of the use of the damping force detection signal, it is possible to use a stroke sensor which senses a relative vehicle height between an upper portion and a lower portion of the shock absorber. It is possible to implement the aforementioned procedure by means of discrete circuit elements instead of the CPU 61. The present invention is applied to a shock absorber which is switchable between three or more discrete damping force levels or a shock absorber which provides a continuously variable damping force level.

The present invention is not limited to the specifically described embodiments, and variations and modifications may be made without departing from the scope of the present invention.

What is claimed is:

1. A suspension control system for controlling a suspension having a shock absorber provided for a wheel of a vehicle, said suspension control system comprising:

damping force detecting means for generating a damping force detection signal which indicates a change of a damping force of the shock absorber based on a condition of a road surface on which the vehicle is running;

sprung resonance component extracting means, coupled to said damping force detecting means, for extracting a sprung resonance component signal from said damping force detection signal, said sprung resonance component signal including components having frequencies around a sprung resonance frequency of the shock absorber;

determining means, coupled to said sprung resonance component extracting means, for determining whether or not said sprung resonance component signal exceeds a first level range provided for detecting a sign of the occurrence of a long-term vehicle vibration and for outputting a determination result; and damping force controlling means, coupled to said determining means, for controlling said shock absorber so that when said determining means determines that said sprung resonance component signal exceeds said first level range, the damping force of said shock absorber is altered to and maintained at an increased level and thus said suspension is maintained at a state which corresponds to said increased level and which is harder than before.

2. A suspension control system as claimed in claim 1, further comprising:
vehicle speed sensor means for measuring a vehicle speed of the vehicle; and
change means, coupled to said vehicle speed sensor means, for changing said first level range in accordance with the vehicle speed measured by said vehicle speed sensor means.

3. A suspension control system as claimed in claim 2, wherein said change means changes said first level range so that said first level range becomes narrow as the vehicle speed increases.

4. A suspension control system as claimed in claim 1, further comprising:
unsprung resonance component extracting means, coupled to said damping force detecting means, for extracting an unsprung resonance component signal from said damping force detection signal, said unsprung resonance component signal including components having frequencies around an unsprung resonance frequency of said shock absorber; and
discerning means, coupled to said unsprung resonance component extracting means, for discerning whether or not said unsprung resonance component signal is within a second level range for detecting a sign of the occurrence of a vibration of the vehicle around said unsprung resonance frequency and for outputting a discernment result;
wherein said damping force controlling means controls said shock absorber in accordance with said discernment result in addition to said determination result output by said determining means.

5. A suspension control system as claimed in claim 4, further comprising means for preventing the damping force of said shock absorber from being altered to said increased level irrespective of said determination result output by said determining means when said discerning means discerns that said unsprung resonance component signal is out of said second level range.

6. A suspension control system as claimed in claim 4, wherein said second level range is a function of said sprung resonance component signal.

7. A suspension control system as claimed in claim 6, wherein said second level range becomes wider as the level of said spring resonance component increases.

8. A suspension control system as claimed in claim 4, wherein said unsprung resonance component extracting means comprises filter means for extracting said unsprung resonance component signal from said damping force detection signal.

9. A suspension control system as claimed in claim 8, wherein said filter means comprises a filter which passes frequency components of said damping force detection signal which have frequencies between about 10 [Hz] and about 15 [Hz], and said frequency components form said unsprung resonance component signal.

10. A suspension control system as claimed in claim 8, wherein said filter means comprises:
a lowpass filter which passes frequency components of said damping force detection signal which have frequencies equal to or lower than about 15 [Hz]; and
a highpass filter which passes frequency components having frequencies equal to or higher than about 10 [Hz] from among said frequency components passing through said lowpass filter 11. A suspension control system as claimed in claim 1, wherein said determining means comprises means for determining whether or not said sprung resonance component signal is continuously out of said first level range for a judgment period and for outputting said determination result when it is determined that said sprung resonance component signal is continuously out of said first level range for said judgment period.

12. A suspension control system as claimed in claim 11, wherein said judgment period is a fixed period.

13. A suspension control system as claimed in claim 1, wherein said shock absorber has plural modes which define the switchable levels of damping force, and wherein said suspension control system further comprises:
mode setting means for specifying one of said plural modes and for outputting a control signal indicative of a specified one of the plural modes; and
response controlling means, coupled to said mode setting means and said damping force controlling means, for controlling said damping force controlling means in accordance with said specified one of the plural modes so as to change a response characteristic between a first time when said determining means determines that said sprung resonance component signal exceeds said first level range and a second time when said damping force controlling means actually controls said shock absorber.

14. A suspension control system as claimed in claim 13, wherein:
said determining means comprises means for determining whether or not said sprung resonance component signal is continuously out of said first level range for a judgment period and for outputting said determination result when it is determined that said sprung resonance component signal is continuously out of said first level range for said judgment period; and
said response controlling means comprises means for changing said judgment period in accordance with said specified one of the plural modes.

15. A suspension control system as claimed in claim 13, wherein said response controlling means comprises means for adjusting said first level range in accordance with said specified one of the plural modes.

16. A suspension control system as claimed in claim 13, wherein:
said vehicle has four shock absorbers provided for four wheels including two front wheels and two rear wheels;
said sprung resonance component extracting means extracts said sprung resonance component signal from said damping force detection signal with respect to one of said four shock absorbers; and
said response controlling means comprises means for selecting said one of said four shock absorbers provided for said sprung resonance component extracting means in accordance with said specified one of the plural modes.

17. A suspension control system as claimed in claim 16, wherein:

said plural modes includes a first mode in which each of the shock absorbers is maintained in a hard state, and a second mode in which each of the shock absorbers is maintained in a soft state;

said means of the response controlling means selects one of the two shock absorbers provided for said two front wheels when said mode setting means selects the first mode; and said means of the response controlling means selects one of the two shock absorbers provided for said two rear wheels when said mode setting means selects the second mode.

18. A suspension control system as claimed in claim 13, wherein said shock absorber comprises:

a cylinder filled with a fluid;

a piston movable in said cylinder due to the function of an external force;

two rooms provided in said cylinder and separated by said piston;

a fluid path provided in said piston and mutually coupling said two rooms; and a valve member movably provided in said fluid path and providing a fluid resistance to the fluid passing through said fluid path, said fluid resistance varying in accordance with a position of said valve member, and wherein:

said suspension control system further comprises speed controlling means for varying a speed of a movement of said valve member in accordance with said specified one of the plural modes.

19. A suspension control system as claimed in claim 18, wherein:

said plural modes includes a first mode in which the shock absorber is maintained in a hard state, and a second mode in which the shock absorber is maintained in a soft state;

said speed controlling means adjusts said speed of the movement of said valve member so that the speed of the movement of said valve member which is to be set when said mode setting means selects said first mode is less than that which is to be set when said mode setting means selects said second mode.

20. A suspension control system as claimed in claim 1, further comprising releasing means for determining whether or not said sprung resonance component signal satisfies a predetermined ending condition and for releasing said shock absorber from the setting of said increased level when it is determined that said sprung response component signal satisfies said predetermined ending condition.

21. A suspension control system as claimed in claim 20, wherein:

said releasing means comprises means for determining whether or not said sprung resonance component signal is continuously within a third level range for an ending judgment period; and said releasing means releases said shock absorber from the setting of said increased level when said means of the releasing means determines that said sprung resonance component signal is continuously within said third level range for said ending judgment period.

22. A suspension control system as claimed in claim 21, wherein said third level range is identical to or wider than said first level range.

23. A suspension control system as claimed in claim 21, wherein said shock absorber has plural modes which define the switchable levels of damping force, and wherein said suspension control system further comprises:

mode setting means for specifying one of said plural modes and for outputting a control signal indicative of a specified one of the plural modes; and response controlling means, coupled to said mode setting means and said releasing means, for controlling said releasing means so that said predetermined ending condition is changed in accordance with said specified one of the plural modes.

24. A suspension control system as claimed in claim 23, wherein said response controlling means comprises means for changing said ending judgment period in accordance with said specified one of the plural modes.

25. A suspension control system as claimed in claim 23, wherein said response controlling means comprises means for adjusting said third level range in accordance with said specified one of the plural modes.

26. A suspension control system as claimed in claim 23, wherein:

said vehicle has four shock absorbers provided for four wheels including two front wheels and two rear wheels;

said sprung resonance component extracting means extracts said sprung resonance component signal from damping force detection signal with respect to one of said four shock absorbers; and said response controlling means comprises means for selecting said one of said four shock absorbers provided for said sprung resonance component extracting detecting means in accordance with said specified one of the plural modes 27. A suspension control system as claimed in claim 20, wherein said releasing means releases said shock absorber provided for each wheel from the setting of said increased level at the same time.

28. A suspension control system as claimed in claim 1, wherein said sprung resonance component extracting means comprises filter means for extracting said sprung resonance component signal from said damping force detection signal.

29. A suspension control system as claimed in claim 28, wherein said filter means comprises a filter which passes frequency components of said damping force detection signal which have frequencies between about 1.0 [Hz] and about 1.3 [Hz], and said frequency components form said sprung resonance component signal.

30. A suspension control system as claimed in claim 28, wherein said filter means comprises:

a lowpass filter which passes frequency components of said damping force detection signal which have frequencies equal to or lower than about 1.3 [Hz]; and a highpass filter which passes frequency components having frequencies equal to or higher than about 1.3 [Hz] from among said frequency components passing through said lowpass filter.

31. A suspension control system as claimed in claim 1, wherein:

said shock absorber switchably provides plural levels of damping force; and.

said first level range is defined for each of said plural levels.

32. A suspension control system as claimed in claim 1, wherein:

said sprung resonance component signal has a positive level component and a negative level component;

said first level range is defined by a positive level and a negative level; and an absolute value of said positive level is substantially equal to that of said negative level.

33. A suspension control system as claimed in claim 1, wherein:

said sprung resonance component signal has a positive level component and a negative level component;

said first level range is defined by a positive level and a negative level; and an absolute value of said positive level is greater than that of said negative level.

34. A suspension control system as claimed in claim 1, wherein said damping force controlling means comprises:

first means for comparing a rate of change of said damping force with a reference value and for outputting a comparison result; and second means for altering the damping force of said shock absorber on the basis of said comparison result when said determining means determines that said sprung resonance component signal is within said first level range.

35. A suspension control system as claimed in claim 1, wherein said long-term vehicle vibration has a period which is approximately equal to one second.

* * * * *

UNITED STATES PATENT AND TRADEMARK OFFICE
CERTIFICATE OF CORRECTION

PATENT NO. : 5,175,687
DATED : DECEMBER 29, 1992
INVENTOR(S) : Yasuhiro TSUTSUMI et al It is certified that error appears in the above-identified patent and that said Letters Patent is hereby corrected as shown below:

ON THE TITLE PAGE:

Please change

"(73) Assignees: TOYOTA JIDOSHA KAISHA; NIPPONDENSO CO. LTD., Both. . ."

to

--(73) Assignees: TOYOTA JIDOSHA KABUSHIKI KAISHA; NIPPONDENSO CO. LTD., Both . . . ---

Signed and Sealed this

Fourth Day of January, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,175,687
DATED : December 29, 1992
INVENTOR(S) : Tsutsumi, et. al.

It is certified that error appears in the above-indentified patent and that said Letters Patent is hereby corrected as shown below:

On the Title page, item [73], Assignee: TOYOTA JIDOSHA KAISHA; NIPPONDENSO CO. LTD". should read--TOYOTA JIDOSHA KABUSHIKI KAISHA; NIPPONDENSO CO. LTD.--.

Signed and Sealed this

Fifth Day of April, 1994

BRUCE LEHMAN

*Attest:*

*Attesting Officer*  *Commissioner of Patents and Trademarks*